United States Patent
Kariv et al.

(10) Patent No.: US 11,070,374 B2
(45) Date of Patent: Jul. 20, 2021

(54) METHODS AND SYSTEMS THAT EFFICIENTLY AND SECURELY STORE ENCRYPTION KEYS

(71) Applicant: VMware, Inc., Palo Alto, CA (US)

(72) Inventors: Asaf Kariv, Herzliya (IL); Ittai Abraham, Herzliya (IL); Yotam Harchol, Berkeley, CA (US)

(73) Assignee: VMware, Inc., Palo Alto, CA (US)

( * ) Notice: Subject to any disclaimer, the term of this patent is extended or adjusted under 35 U.S.C. 154(b) by 554 days.

(21) Appl. No.: 15/908,349

(22) Filed: Feb. 28, 2018

(65) Prior Publication Data

US 2019/0268149 A1 Aug. 29, 2019

(51) Int. Cl.
*H04L 9/08* (2006.01)
*H04L 29/06* (2006.01)
*H04L 9/30* (2006.01)

(52) U.S. Cl.
CPC ............ *H04L 9/0894* (2013.01); *H04L 9/085* (2013.01); *H04L 9/0825* (2013.01); *H04L 9/0861* (2013.01); *H04L 9/30* (2013.01); *H04L 63/12* (2013.01); *H04L 63/20* (2013.01)

(58) Field of Classification Search
CPC ..... H04L 9/0825; H04L 9/085; H04L 9/0861; H04L 9/0891; H04L 9/0894; H04L 9/302; H04L 9/3026; H04L 9/3255
See application file for complete search history.

(56) References Cited

U.S. PATENT DOCUMENTS 6,035,041 A * 3/2000 Frankel .................. H04L 9/302
380/28

OTHER PUBLICATIONS

Herzerg et al., Proactive Public Key and Signature Systems, ACM, 1997.*
Herzberg et al., Proactive Secret Sharing Or: How to Cope With Perpetual Leakage, Springer-Verlag, 1995.*
Gennaro et al., Robust Threshold DSS Signature, 2001.*
Jarecki, Proactive Secret Sharing and Public Key Cryptosystems, 1995.*
Shamir, Adi, How to Share a Secret, ACM, vol. 22, No. 11, Nov. 1979, pp. 612-613.

(Continued)

*Primary Examiner* — Minh Dinh

(57) ABSTRACT

The current document is directed to distributed-secure-storage systems, and processes carried out within the distributed-secure-storage systems, that provide for secure storage and retrieval of secrets within distributed computer systems, including private encryption keys used for client authentication during establishment of secure communications channels. The secret-storage systems partition an input secret into multiple secret shares and distribute the secret shares among multiple secret-share-storing node subsystems, without persistently storing the secret itself. An agent within a client device subsequently requests a secret share corresponding to a secret, or a share of data derived from the secret share, from each of the multiple secret-share-storing nodes. Each secret-share-storing node transmits the requested secret share or derived-data share to the agent, which reconstructs the secret from all or a portion of the secret shares or a data value from all or a portion of the derived-data shares transmitted to the agent.

20 Claims, 51 Drawing Sheets

(56) References Cited

OTHER PUBLICATIONS

Feldman, Paul, "A Practical Scheme for Non-interactive Verifiable Secret Sharing," IEEE, 1987, pp. 427-437.
Desmedt, Yvo., et al., "Threshold cryptosytems," University of Wisconsin—Milwaukee, 1998.
Rabin, Tel., "A Simplified Approach to Threshold and Proactive RSA," Crypto '98, LNCS 1462, 1998, pp. 89-104.
Shoup, Victor, "Practical Threshold Signatures," Eurocrypt 2000, LNCS 1807, 2000, pp. 207-220.
Gennaro, Rosario, et al., "Robust and Efficient Sharing of RSA," Journal of Cryptology, Mar. 2000, vol. 13, Issue 2, pp. 273-300.
Gennaro, Rosario, et. al., "Threshold RSA for Dynamic and Ad-Hoc Groups," Eurocrypt 2008, LNCS 4965, 2008, pp. 88-107.
Hazay, Carmit., et. al, "Efficient RSA Key Generation and Threshold Paillier in the Two-Party Setting," CT-RSA 2012, pp. 1-51.

\* cited by examiner

S = 124 — 2002
N = 1739 — 2004
P = 1656 — 2006
I = 6
k = 4
f(x) = (124 + 1260x + 903x² + 326x³) mod 1656 — 2008
f(1) = 957 = $S_1$
f(2) = 584 = $S_2$
f(3) = 961 = $S_3$  } — 2010
f(4) = 732 = $S_4$
f(5) = 197 = $S_5$
f(6) = 1312 = $S_6$
K = {$S_2$, $S_4$, $S_5$, $S_6$} — 2012
index(K,1) = 2
index(K,2) = 4  } — 2014
index(K,3) = 5
index(K,4) = 6

$$C_1 = \frac{4 \cdot 5 \cdot 6 \cdot \Delta}{(4-2)(5-2)(6-2)} = \frac{4 \cdot 5 \cdot 6 \cdot \Delta}{2 \cdot 3 \cdot 4} = 5\Delta$$

$$C_2 = \frac{2 \cdot 5 \cdot 6 \cdot \Delta}{(2-4)(5-4)(6-4)} = \frac{2 \cdot 5 \cdot 6 \cdot \Delta}{(-2) \cdot 2} = -15\Delta$$

$$C_3 = \frac{2 \cdot 4 \cdot 6 \cdot \Delta}{(2-5)(4-5)(6-5)} = \frac{2 \cdot 4 \cdot 6 \cdot \Delta}{(-3)(-1)} = 16\Delta$$

$$C_4 = \frac{2 \cdot 4 \cdot 5 \cdot \Delta}{(2-6)(4-6)(5-6)} = \frac{2 \cdot 4 \cdot 5 \cdot \Delta}{(-4)(-2)(-1)} = -5\Delta$$

} — 2016

FIG. 20A $S'_0 = F(k) = [(5\Delta) 584 - (15\Delta)732 + (16\Delta)197 - (5\Delta)1312] \dfrac{1}{\Delta}$ —— 2018

$= -11468$ $3^{S_0} = 3^{-11468} \mod(N = 1739)$ —— 2019

$[3^{-11468} \; 3^{11468}] \mod 1739 = 3^0 \mod 1739 = 1$ $3^{11468} = (3^4)^{11468/4} = (3^4)^{2867} = 81 \cdot (81)^{2866} = 81 \cdot (81^2)^{1433}$ $81^2 \mod 1739 = 1344$ $81 \cdot (81^2)^{1938} \mod 1739 = 81 \cdot 1344 \cdot (1344)^{1432} = 81 \cdot 1344 \cdot (1344^8)^{179}$ $1344^8 \mod 1739 = 1181$ $81 \cdot 1344 \cdot (1344^8)^{179} \mod 1739 = 81 \cdot 1344 \cdot 1181 \cdot (1181)^{178} = 81 \cdot 1344 \cdot 1181 \cdot (1181^2)^{89}$ $1181^2 \mod 1739 = 83$ $81 \cdot 1344 \cdot 1181 \cdot (1181^2)^{89} \mod 1739 = 81 \cdot 1344 \cdot 1181 \cdot 83 \cdot (83)^{88} = 81 \cdot 1344 \cdot 1181 \cdot 83 \cdot (83^8)^{11}$ $83^8 \mod 1739 = 1328$ $81 \cdot 1344 \cdot 1181 \cdot 83 \cdot (83^8)^{11} \mod 1739 = 81 \cdot 1344 \cdot 1181 \cdot 83 \cdot (1328)^{11}$ $1328^{11} \mod 1739 = 1459$ $81 \cdot 1344 \cdot 1181 \cdot 83 \cdot (1328)^{11} \mod 1739 = (81 \cdot 1344 \cdot 1181 \cdot 83 \cdot 1459) \mod 1739 = 860$ $3^{11468} \mod 1739 = 860$ $\left(\dfrac{1}{3^{11468}} \cdot 860\right) \mod 1739 = 1$ ⎬ 2020

$3^{S'_0} \mod 1739 = 366$ $3^{124} \mod 1739 = 366$ $s'_0 = 124$

FIG. 20B $G = \{2^{124} \bmod 1739, 2^{1260} \bmod 1739, 2^{903} \bmod 1739, 2^{326} \bmod 1739\}$
$G = \{1452, 260, 1192, 1003\}$ } 2022

$S_1 = 957$ $2^{957} \bmod 1739 = 1250$ $(1452 \cdot 260^{1^2} \cdot 1192^{1^2} \cdot 1003^{1^3}) \bmod 1739 = 1250$ } 2024

$S_2 = 584$ $2^{584} \bmod 1739 = 700$ $(1452 \cdot 260^{2} \cdot 1192^{2^2} \cdot 1003^{2^3}) \bmod 1739 = 700$ } 2026

FIG. 20C public/private key encryption select two distinct prime numbers $p$ and $q$
$n = pq$
$\varphi(n) = (p-1)(q-1)$
select $e$: $1 < e < \varphi(n)$ and $gcd\ (e, \varphi(n)) = 1$
compute $d$: $(d*e) \mod \varphi(n) = 1$
$k_e = (e, n)$    (public key)
$K_d = (d, n, p, q)$, $(d, p, q)$, or $(d, n)$    (private key)

to encrypt $M$
    $M \rightarrow m$: $0 < m < n$
    $C \leftarrow (OAEP(m))^e (\mod n)$
to decrypt $C$
    $m = OAEP^{-1}(C^d (\mod n))$
    $M \leftarrow m$ digital signature to sign:
    $m\text{Hash} = hash(M)$
    $EM = transform\ (m\text{Hash})$
    $signature = EM^d \mod n = DEC(EM, k_d)$
to verify:
    $m\text{Hash} = hash(M)$
    $EM' = signature^e\ (\mod n) = ENC(signature, k_e)$
    $m\text{Hash}' = transform^{-1}(EM')$
    when $m\text{Hash} = m\text{Hash}'$, $signature$ is verified symmetric-key encryption
Symmetric key $k$
$C \leftarrow ENC(M, k)$
$M \rightarrow DEC(C, k)$

FIG. 28

METHODS AND SYSTEMS THAT EFFICIENTLY AND SECURELY STORE ENCRYPTION KEYS

TECHNICAL FIELD

The current document is directed to computer-system, networking, and data security and, in particular, to efficient, secure, distributed storage of encryption keys and other secret information.

BACKGROUND

Early computer systems were generally large, single-processor systems that sequentially executed jobs encoded on huge decks of Hollerith cards. Over time, the parallel evolution of computer hardware and software produced main-frame computers and minicomputers with multi-tasking operation systems, increasingly capable personal computers, workstations, and servers, and, in the current environment, multi-processor mobile computing devices, personal computers, and servers interconnected through global networking and communications systems with one another and with massive virtual data centers and virtualized cloud-computing facilities. This rapid evolution of computer systems has been accompanied with a rapid proliferation in security vulnerabilities and greatly expanded needs for technologies to secure computer-systems, electronic communications, and data storage. These needs have been, and continue to be, addressed by sophisticated encryption and decryption technologies, secure data-transfer protocols, sophisticated threat monitoring and threat detection, and many other technologies. However, the abilities of malicious individuals and organizations to circumvent security features have evolved in response to the evolution of security technologies. As a result, designers, developers, manufacturers, vendors, and users of computer systems, electronic communications, and data-storage devices continue to seek improved and more efficient security technologies.

SUMMARY

The current document is directed to distributed-secure-storage systems, and processes carried out within the distributed-secure-storage systems, that provide for secure storage and retrieval of confidential and critical data, referred to as "secrets," within distributed computer systems, including private encryption keys used for client authentication during establishment of secure communications channels. The secret-storage systems partition an input secret into multiple secret shares and distribute the secret shares among multiple secret-share-storing node subsystems, without persistently storing the secret itself. An agent within a client device subsequently requests a secret share corresponding to a secret, or a share of data derived from the secret share, from each of the multiple secret-share-storing nodes. Each secret-share-storing node transmits the requested secret share or derived-data share to the agent, which reconstructs the secret from all or a portion of the secret shares or a data value from all or a portion of the derived-data shares transmitted to the agent. The multiple secret-share-storing nodes additionally cooperate to periodically alter the stored secret shares corresponding to a secret in a way that allows agents to recover the original secret, or derived data, from all or a portion of the altered secret shares or derived-data shares. The secret-share refresh process is extended to provide for adding new secret-share-storing nodes to a distributed-secure-storage system and for recovering failed secret-share-storing nodes.

BRIEF DESCRIPTION OF THE DRAWINGS

FIGS. 20A-C provide numeric examples of a polynomial encoding of a secret, generation of secret shares, recovery of the secret from k secret shares, and secret-share verification.

FIG. 28 summarizes three basic encryption-based techniques.

DETAILED DESCRIPTION

Figure 1:
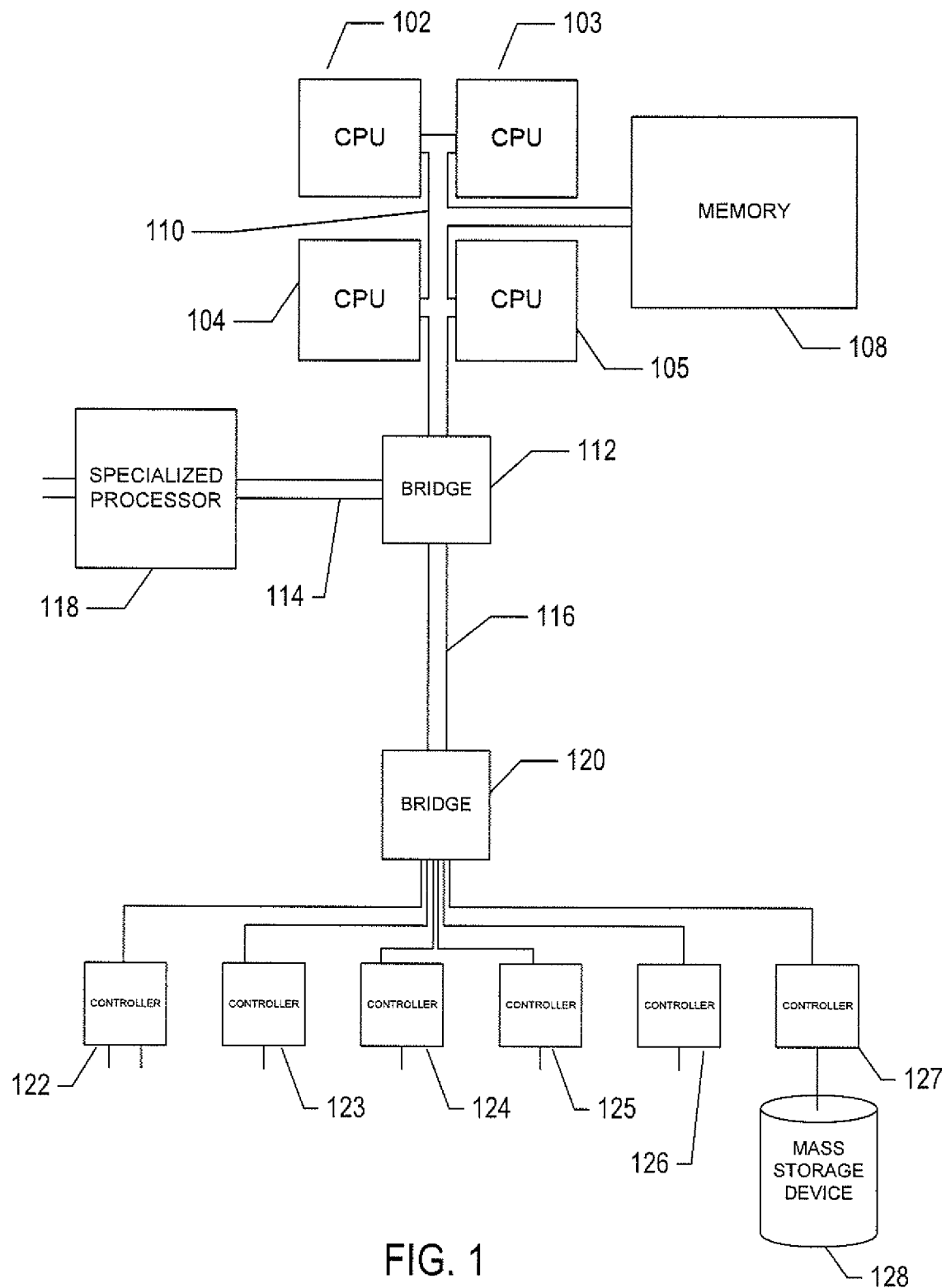
FIG. 1 provides a general architectural diagram for various types of computers.

The current document is directed to methods and systems that provide for secure storage and retrieval of confidential and critical data, referred to as "secrets," within distributed computer systems. In a first subsection, below, a detailed description of computer hardware, complex computational systems, and virtualization is provided with reference to FIGS. 1-10. In a second subsection, the currently disclosed distributed-secure-storage system "DSS system" is described in detail. In a third section, a description of secure storage of private keys used for authenticating clients during establishment of SSH secure-communications channels is described.

Computer Hardware, Complex Computational Systems. and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
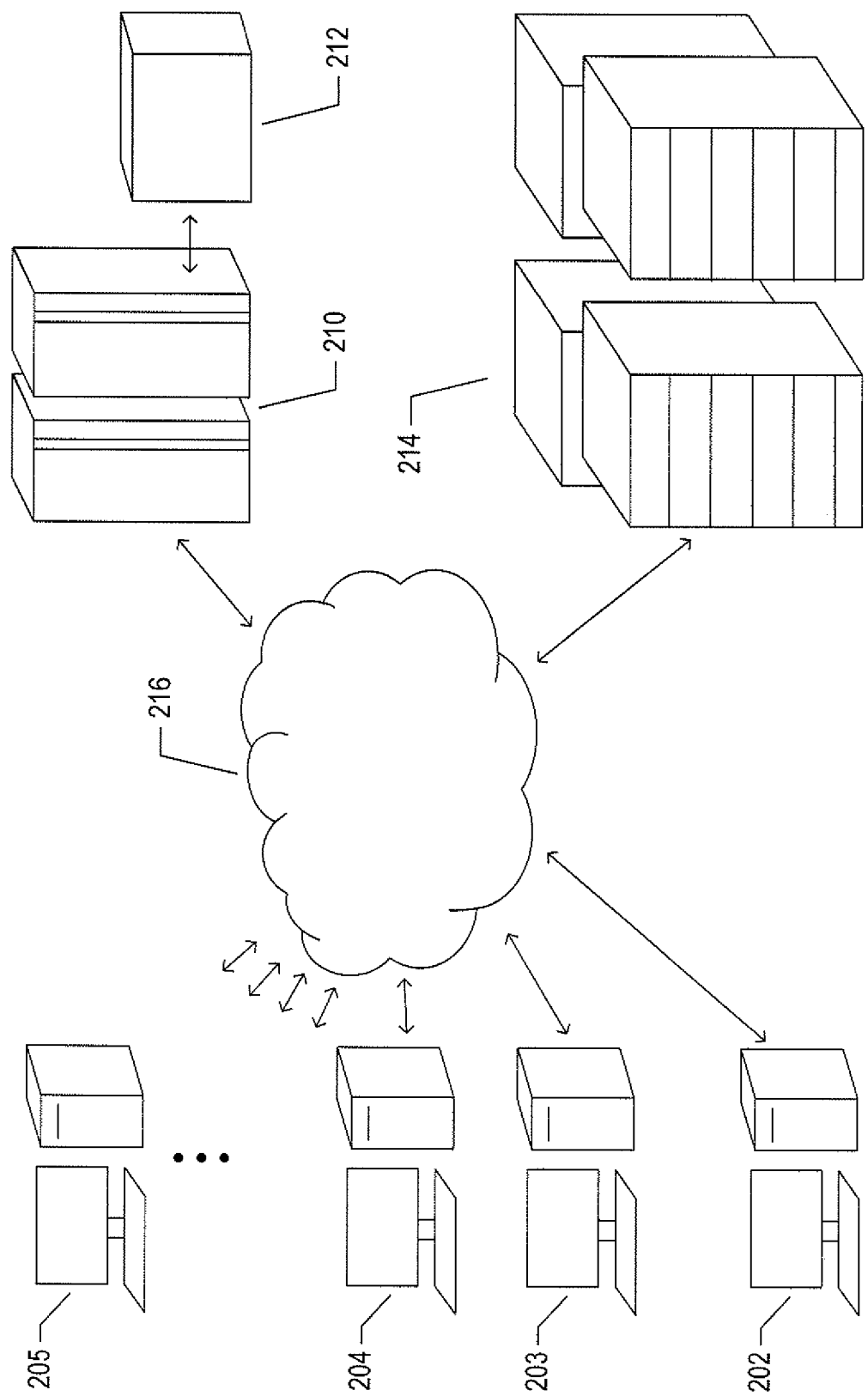
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
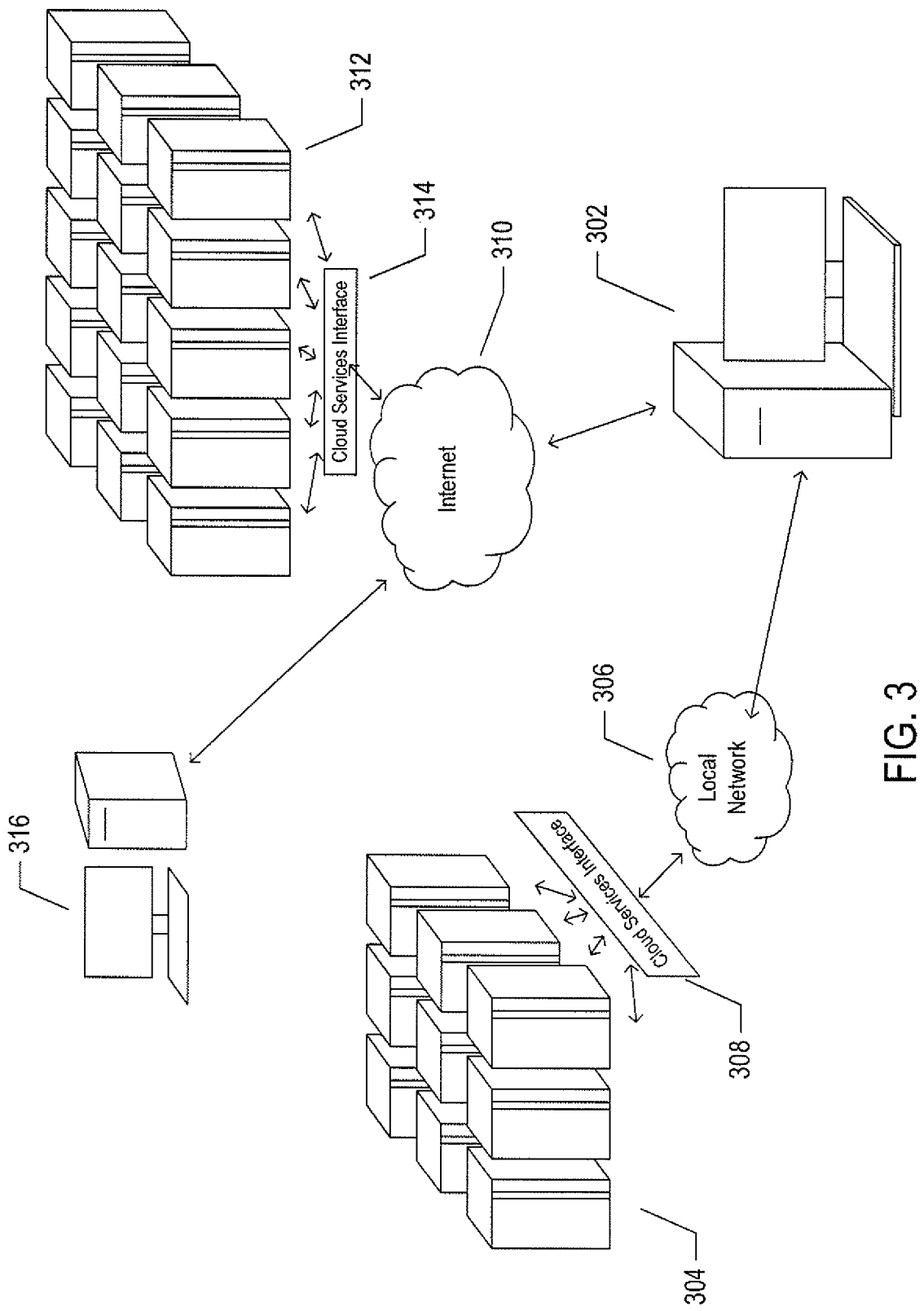
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
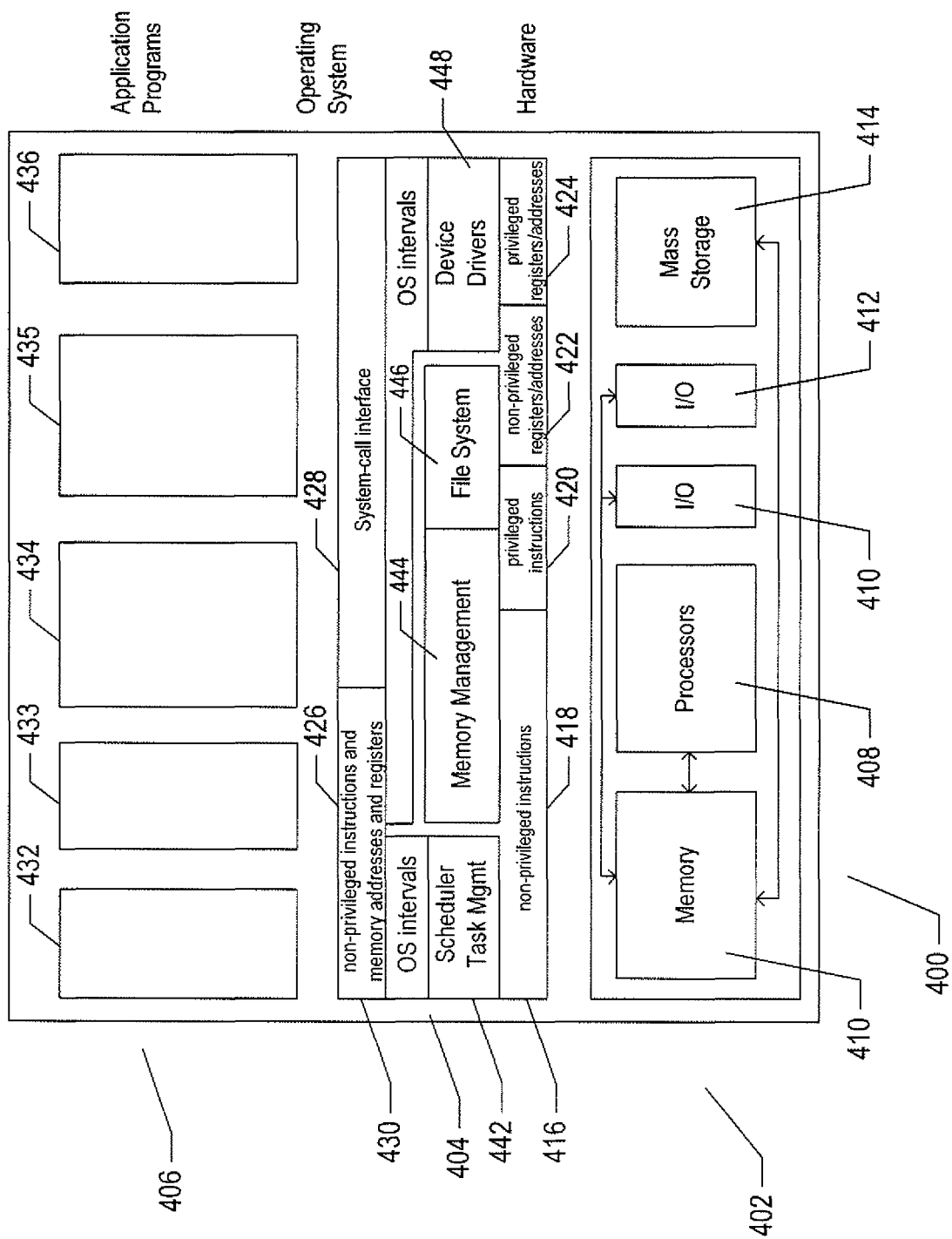
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other VO devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
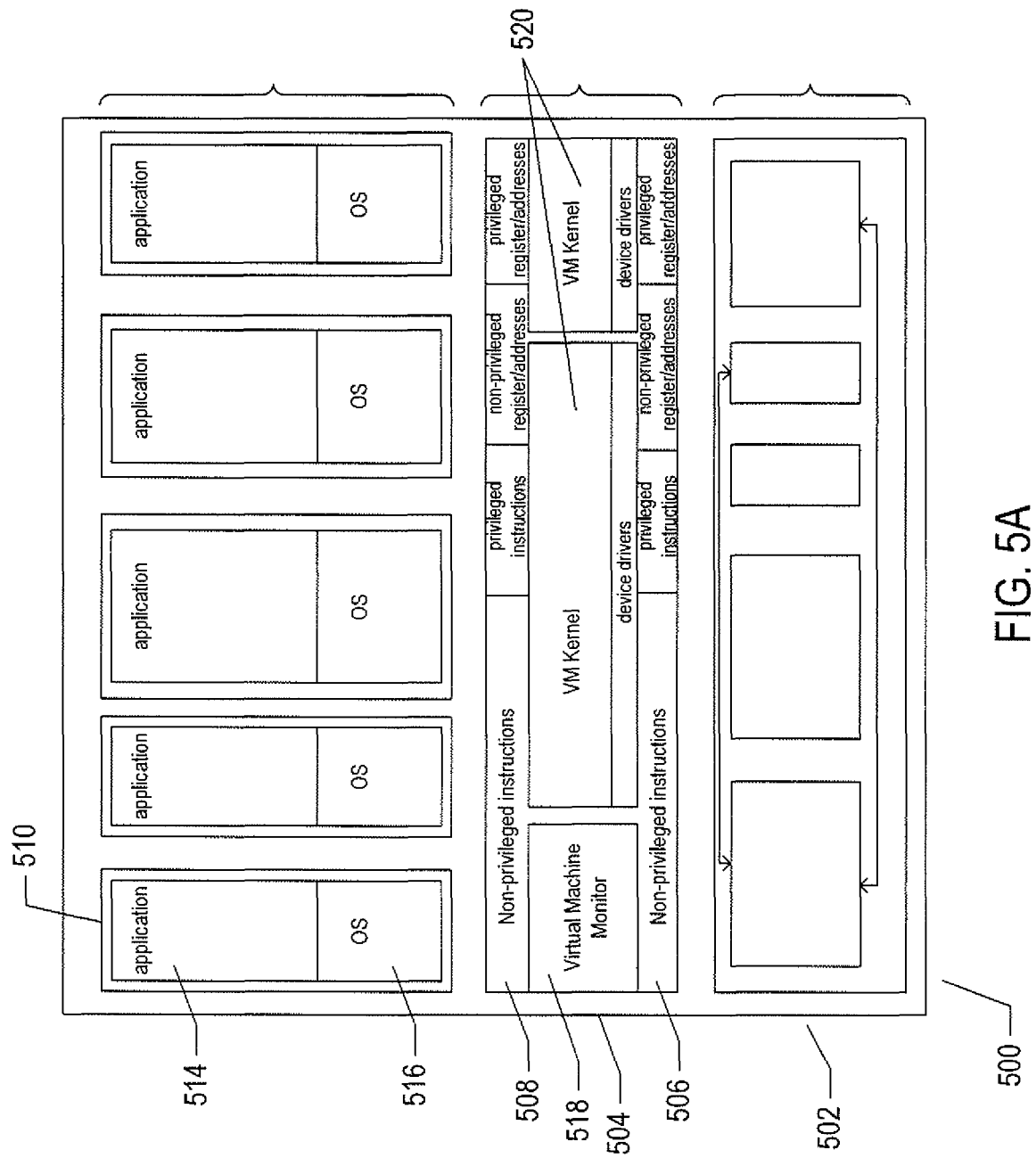
FIGS. 5A-D illustrate two types of virtual machine and virtual-machine execution environments.
Figure 5B:
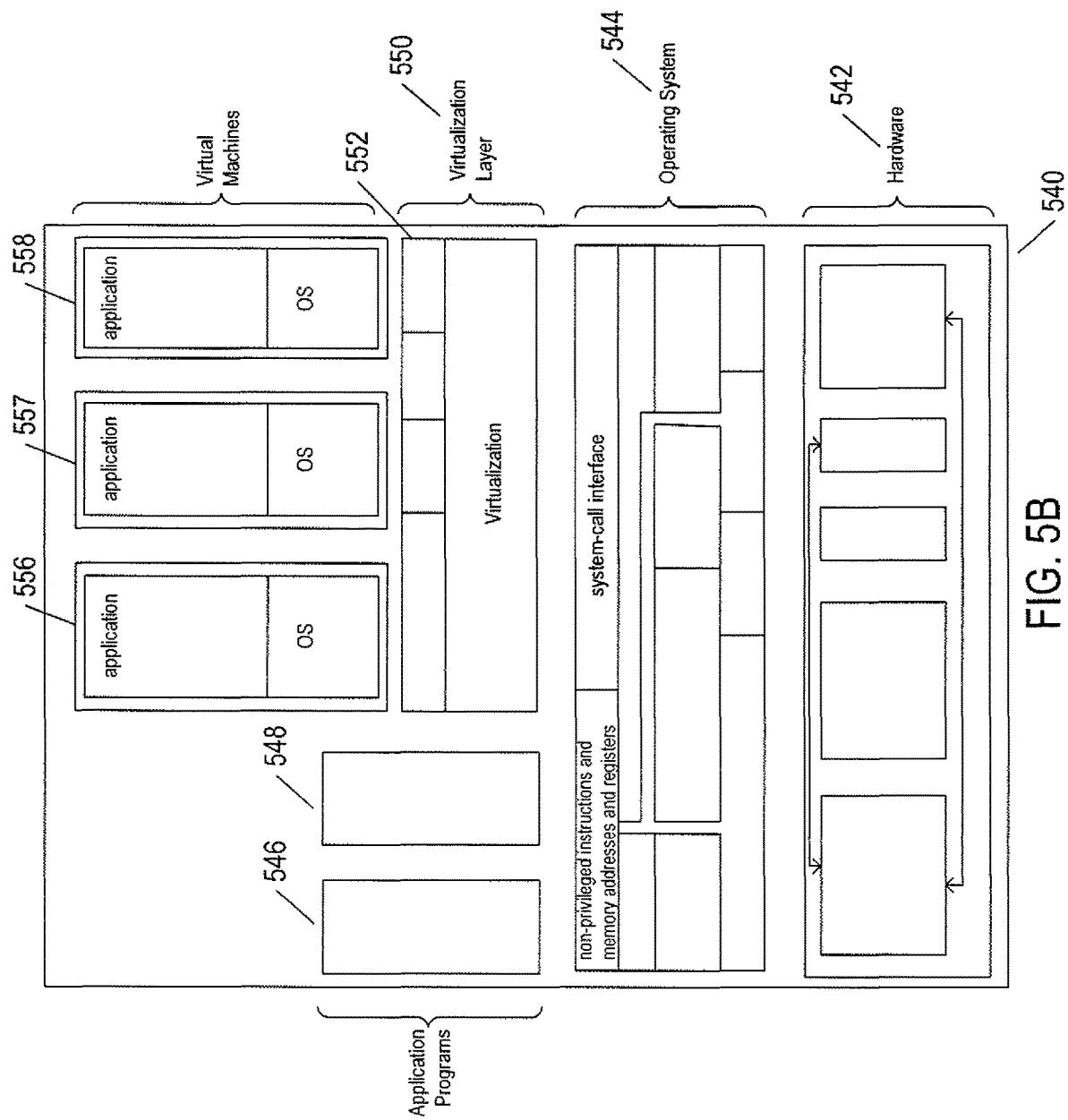

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
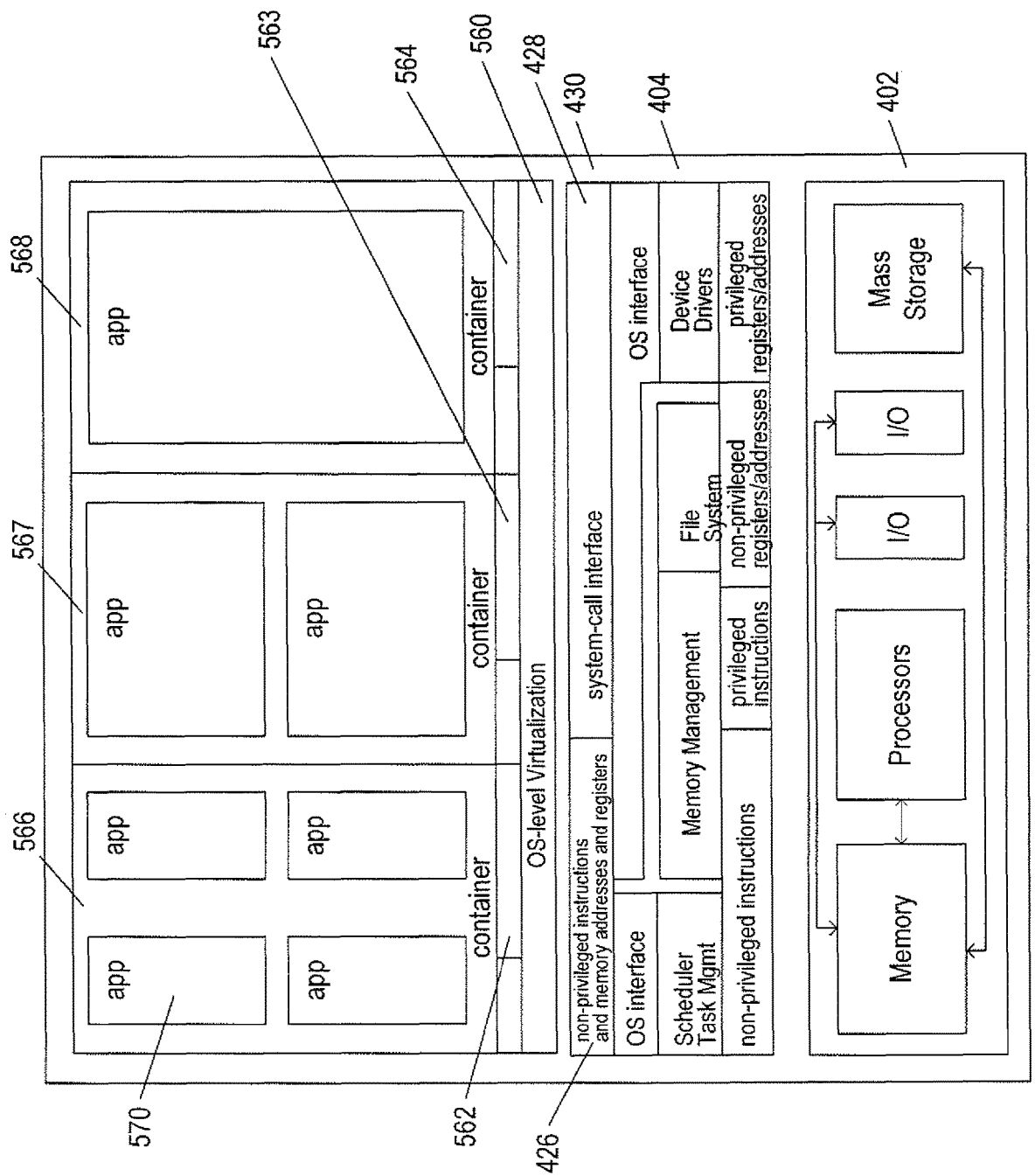

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
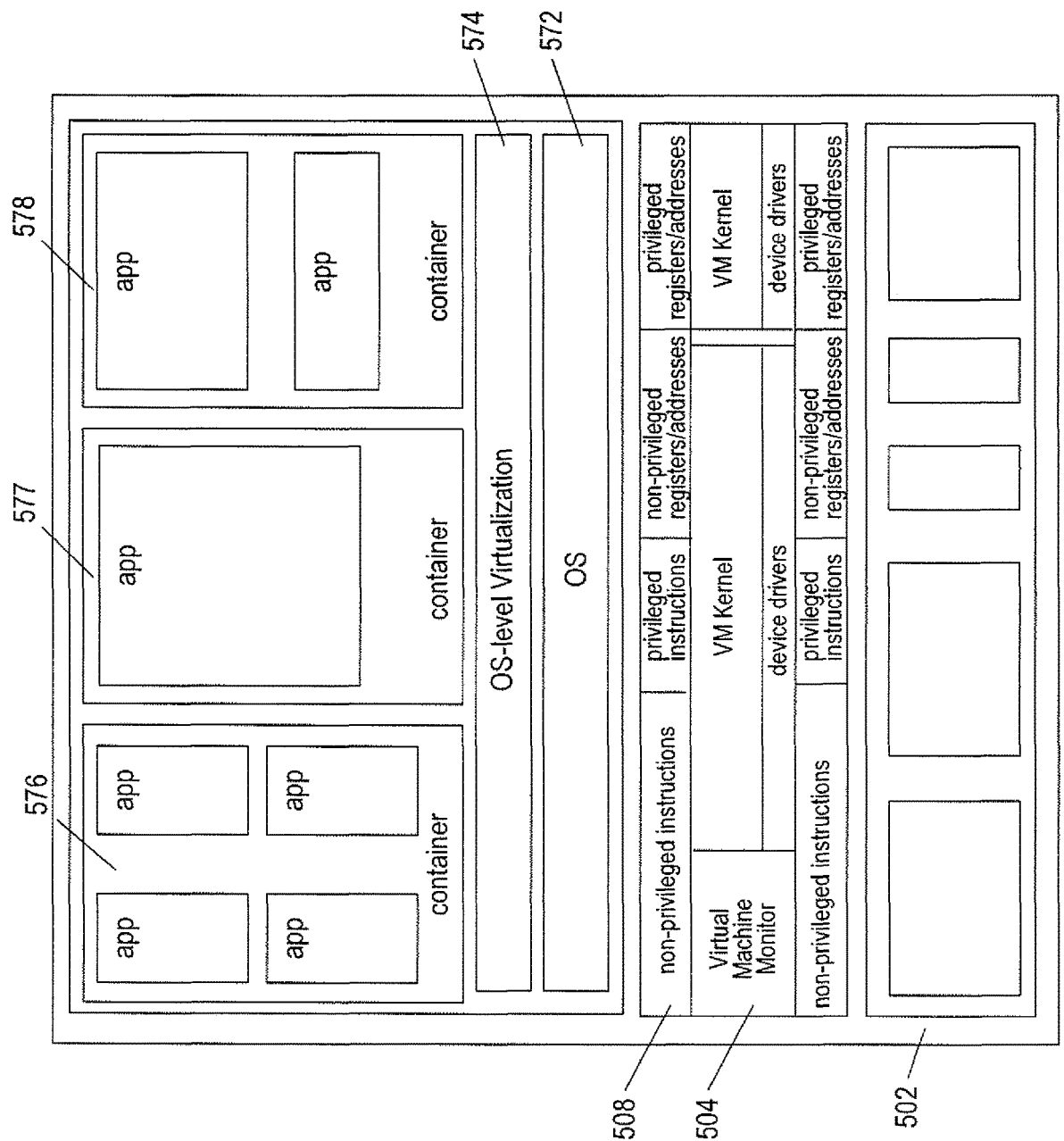

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
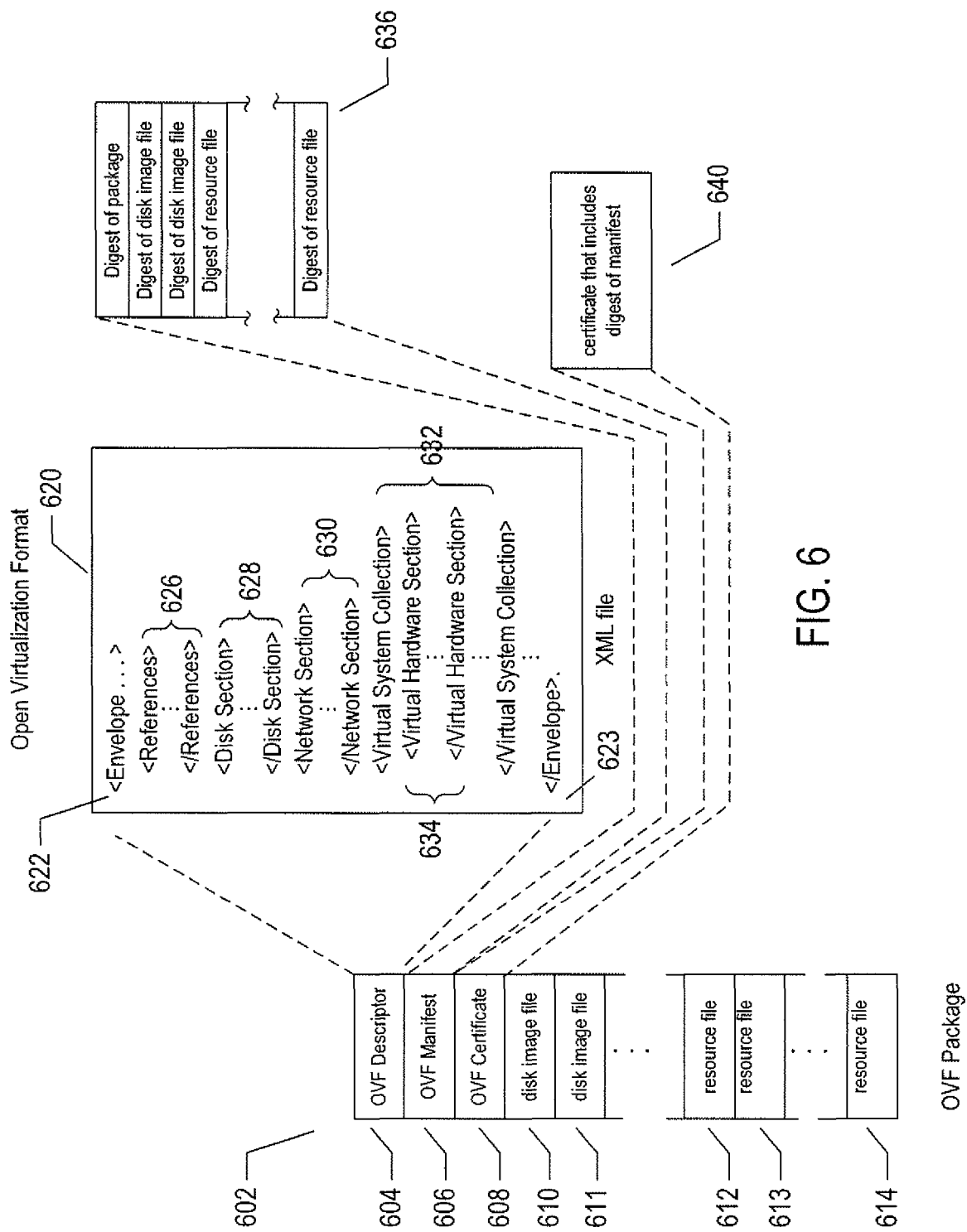
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
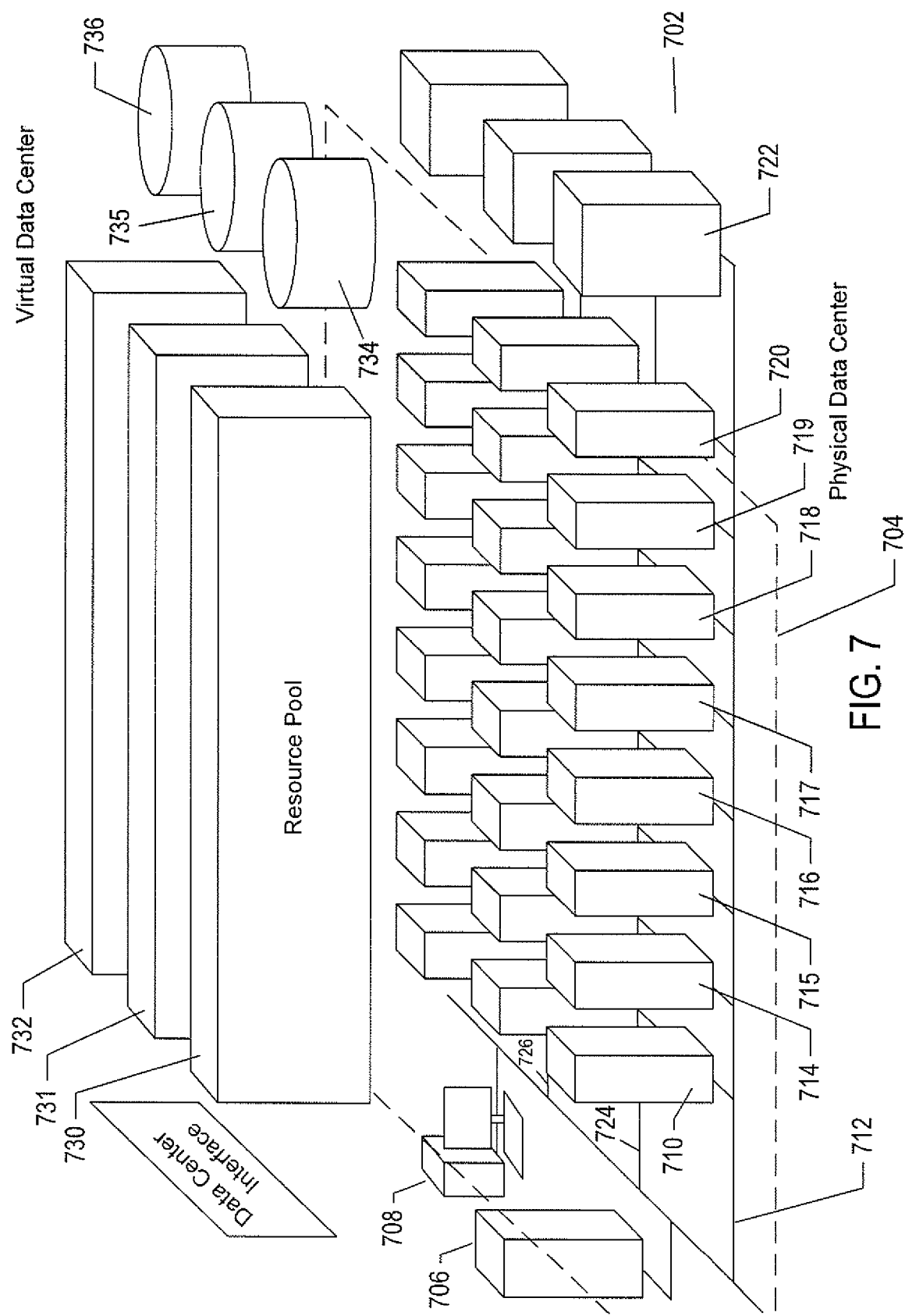
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
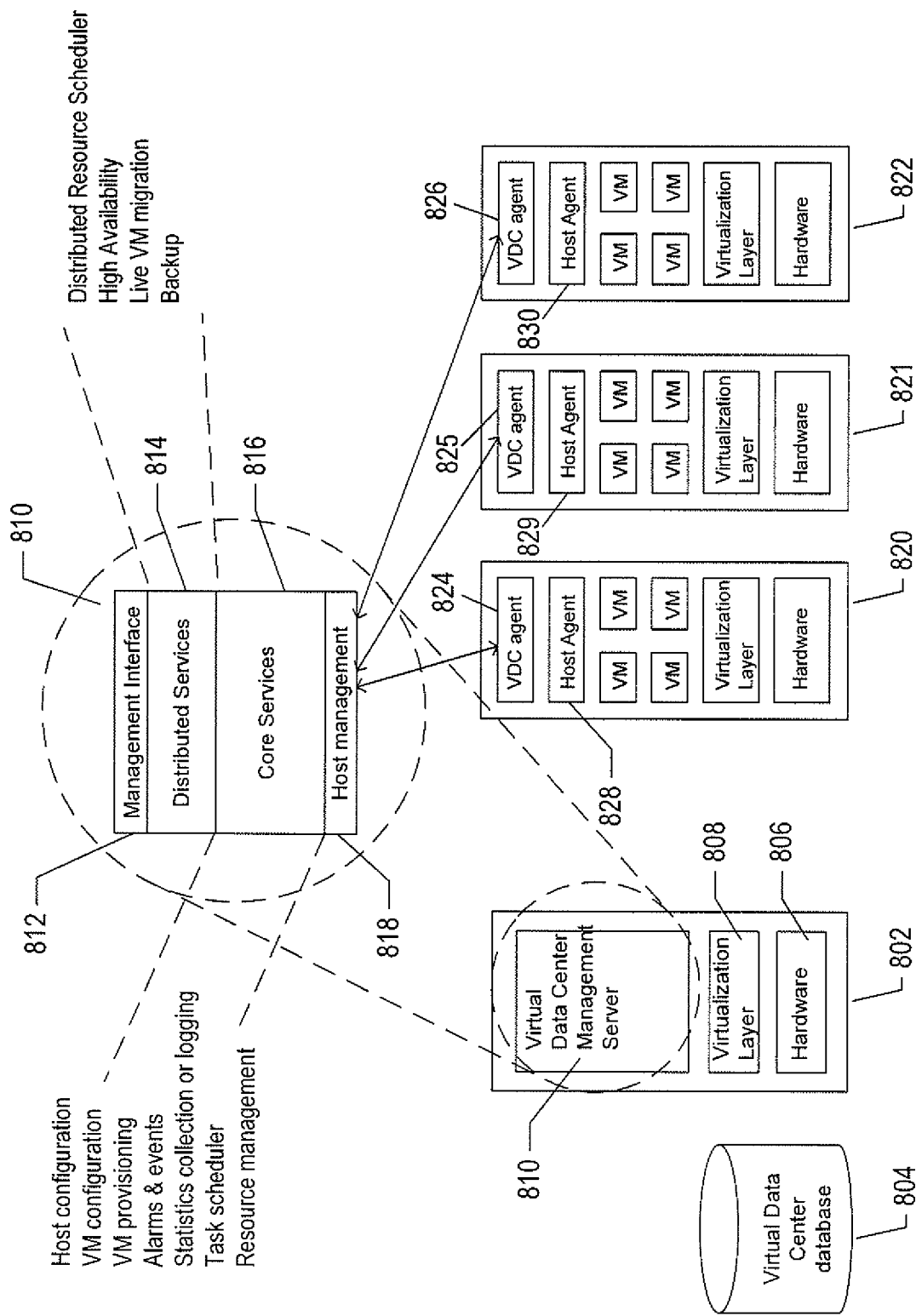
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
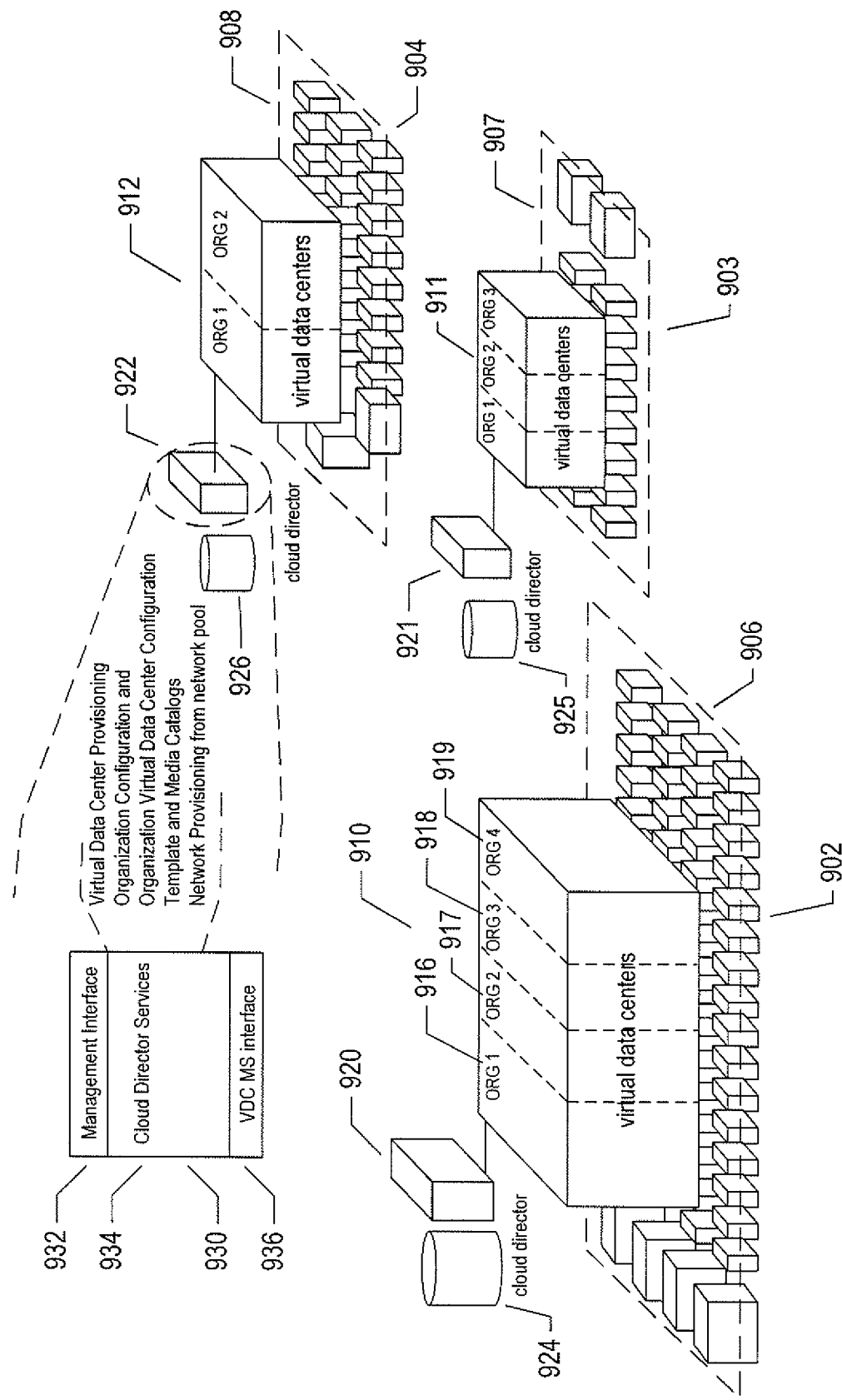
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
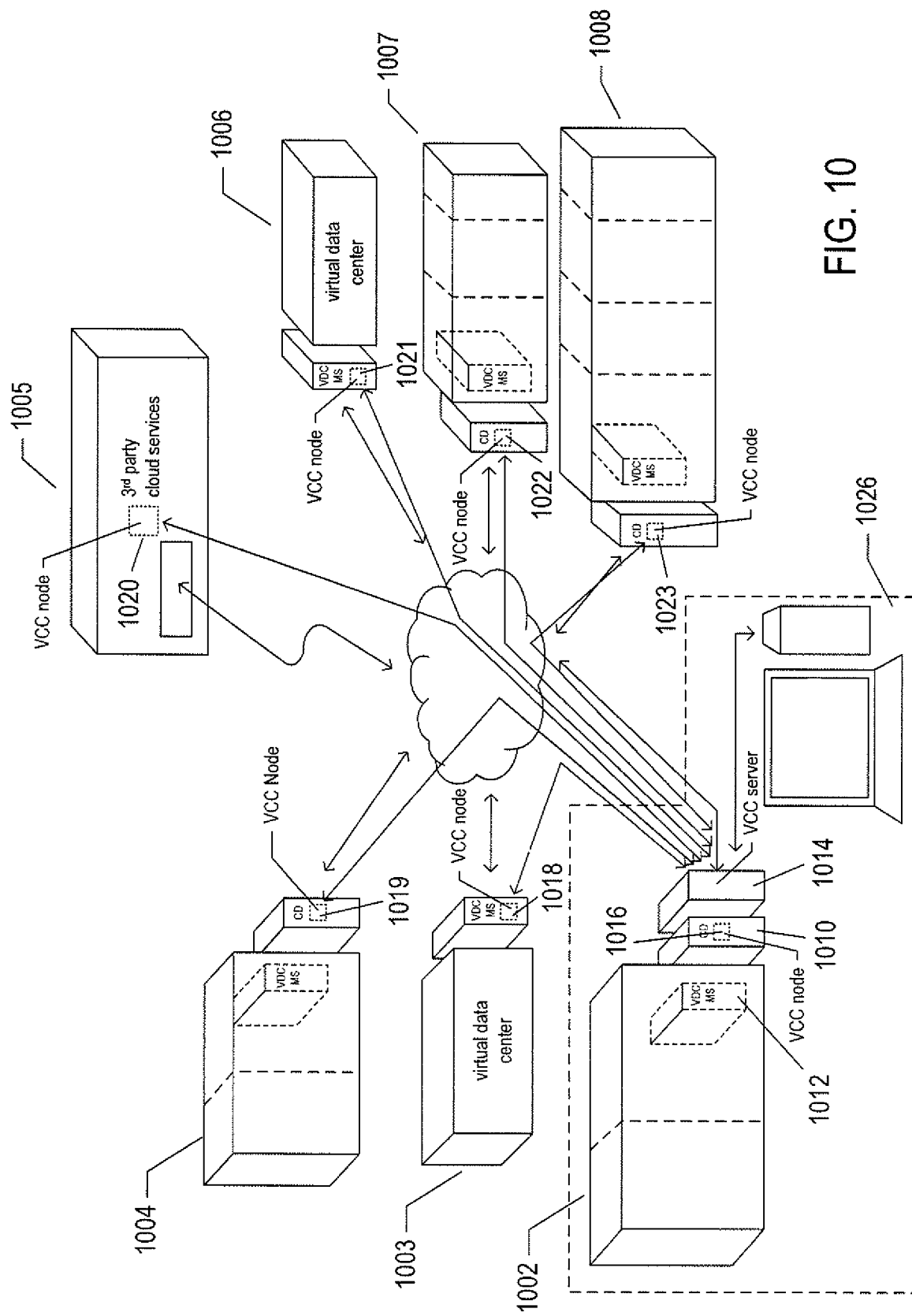
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCCserver-provided aggregate-cloud distributed services. In general, the cloud-computing facilities that together form a multiple-cloud-computing aggregation through distributed services provided by the VCC server and VCC nodes are geographically and operationally distinct.

Currently Disclosed DSS System

FIG. 1 illustrates an example secret and a traditional context for secure secret storage and retrieval. The example secret 1102 is numeric or alphanumeric data stored in a sequence of bytes 1104, 1105, and 1107. A secret may be a private encryption key, numeric or alphanumeric data from which cryptographic keys and other secondary secrets are automatically derived, and other types of data that, if revealed to, or discovered by, another system, device, or individual, could compromise the security of the computer system or other processor-controlled device that stores and uses the secret. In general, secrets represent a relatively small amount of the total stored data within the computer system or other processor-controlled device. For this reason, a computer system can expend significantly greater computational resources to secure secrets than can be expended for securing larger volumes of data, which can alternatively be secured by more efficient encryption techniques that employ one or more secret encryption keys. Similarly, private/public-encryption-key-based methods are often used for establishing secure communications channels, but once the secure communications channels are established, more efficient symmetric-encryption-key-based technologies are used to secure message data transferred through the secure communications channels.

Figure 11:
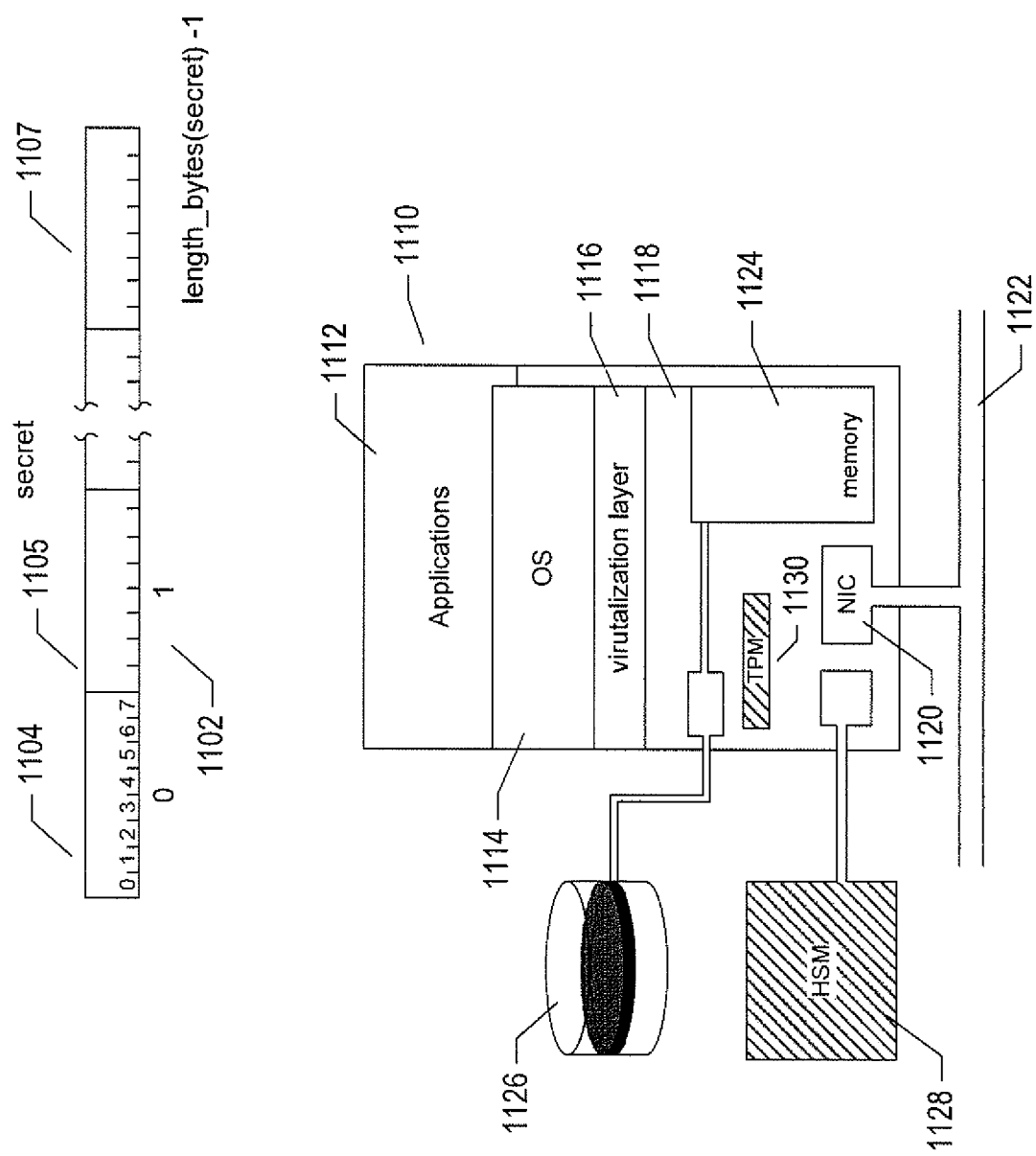
FIG. 11 illustrates an example secret and a traditional context for secure secret storage and retrieval.

In the lower portion of FIG. 11, a typical computer system 1110 is shown, including various secure data-storage devices that may be used to store secrets. The computer system 1110 includes applications 112, an operating system 114, a virtualization layer 116, and a hardware layer 1118. The computer system is connected through a network-interface controller 1120 to an electronic communications media 1122 through which the computer system transmits data to, and receives data from, remote computer systems. The hardware resources within the computer system, including memory 1124 and mass-storage devices 1126, may be accessed by remote computer systems, under various scenarios, which represents a significant vulnerability to exposure of confidential information and, ultimately, to loss of control of the computer system to remote entities. When private encryption keys are stored in the memory of the computer system, even temporarily, they may be revealed to malicious remote computer systems and devices through security breaches, in turn compromising the security of encrypted data stored in mass-storage devices 1126.

To address the above-described types of security problems, hardware security modules ("HSMs") 1128 and trusted platform modules ("TPMs") 1130 have been developed to provide secure secret storage. These secure-storage devices may include factory-installed hardware-level private encryption keys, encryption-key generators, and digital certificates, and may provide various types of services based on the hardware-level private encryption keys and internally generated encryption keys, including encryption and decryption of data stored within mass-storage devices. These devices are significantly more resilient to security breaches than the general hardware resources of the computer system. However, these devices involve additional hardware expenses and hardware-integration expenses and the security measures based on these devices may themselves be vulnerable to various types of attack.

Figure 12:
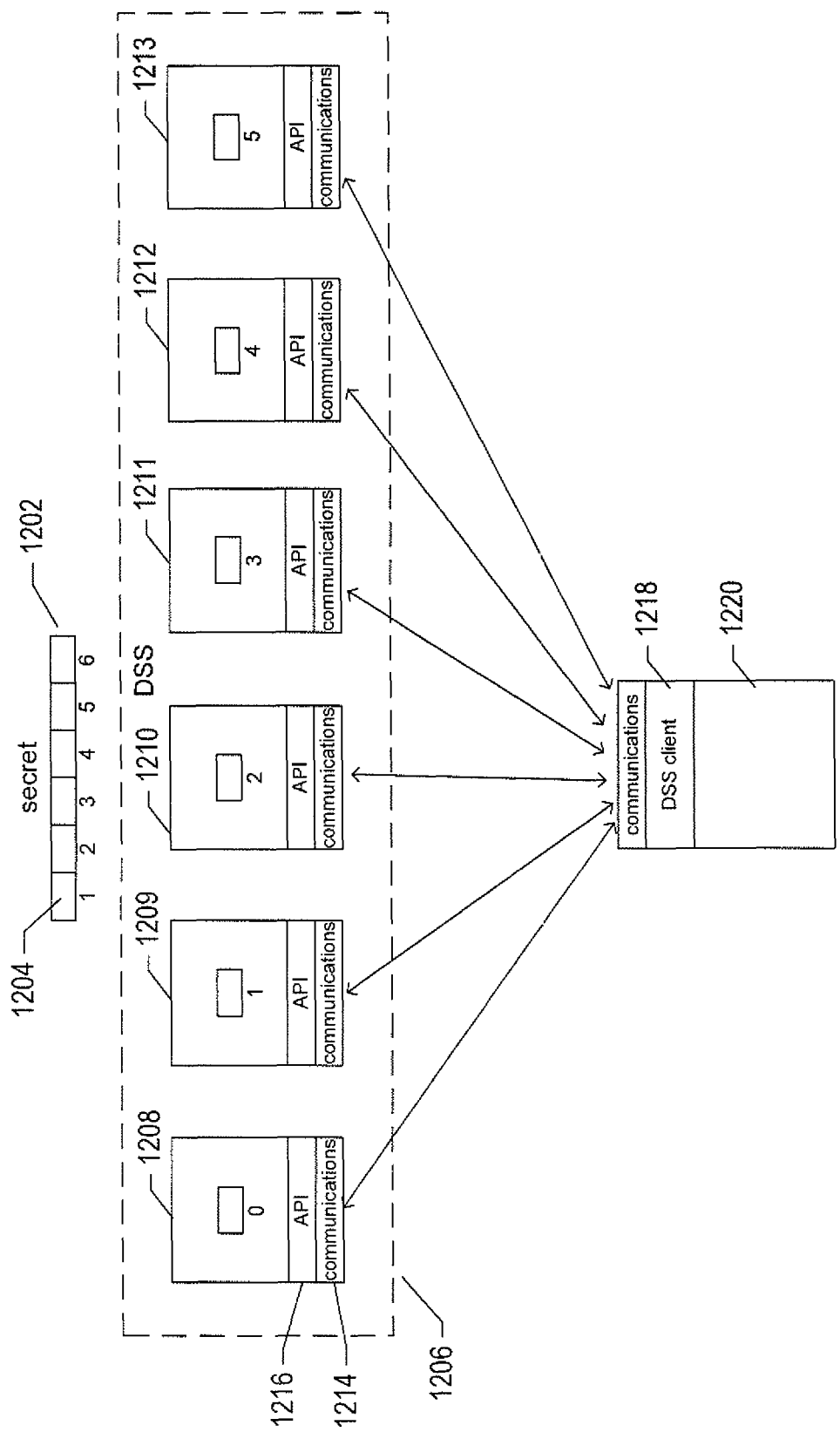
FIG. 12 illustrates the alternative approach for secure storage of secrets disclosed in the current document.

The current document is directed to an alternative approach for secure storage of secrets, such as private encryption keys, that is implemented in distributed computing systems without relying on specialized secure-storage hardware devices, such as HSMs, although specialized secure-storage hardware devices may be used, in certain implementations, to provide an extra level of security. FIG. 12 illustrates the alternative approach for secure storage of secrets disclosed in the current document. Each secret, such as secret 1202, is partitioned into multiple shares. In the example shown in FIG. 12, the secret 1202 is partitioned into 6 shares, including a first share 1204. The secret shares are distributed among a set of control-cluster ("CC") nodes 1206 of a distributed-secure-storage ("DSS") system. In the example shown in FIG. 12, there are six CC nodes 1208-1213 in the set of control-cluster nodes. The CC nodes are generally servers that include secure-storage-system modules. The servers may be traditional physical servers, in which the secure-storage-system modules run above an operating system that interfaces to physical hardware, may be virtual servers, in which the secure-storage-system modules run above a guest operating system that, in turn, runs in an environment provided by a virtualization later that runs above physical hardware, may be server functionality running within containers executing within a physical server, or may be alternatively implemented. The CC nodes each includes a communications interface and an application-programming interface ("API"), such as the communications interface 1214 and the API 1216 shown within CC node 1208. A DSS-client agent 1218 is a virtual security layer included in client computer systems, such as client system 1220, that interfaces through electronic communications to the APIs of the CC nodes. Any particular secret enters the DSS system through a security manager ("SM"), discussed below, and resides in SM memory transiently, for only the time needed to partition the secret into secret shares. Following partitioning, the secret is deleted from memory and never again reconstructed within the SM or CC nodes. When a client system needs to access a service based on a securely stored secret or, in certain implementations, the secret itself, the client system directs the DSS-client agent 1218 to request secret shares or derived-data shares from the CC nodes and reconstructs the secret or the derived data in client memory controlled by the DSS-client agent. In most cases, when a secret is reconstructed by the DSS-client agent, the secret is used by the DSS-client agent to perform a task or service on behalf of the client system, such as using a secret private encryption key to establish a secure communications channel with a remote computer system, and is not stored in mass storage or directly accessibly to the system layers or application layers within the client computer. More often, the secret shares are used within the CC nodes to generate derived-data shares, and the derived-data shares are transmitted to requesting DSS-client agents, which reconstruct the derived data from the derived-data shares. Thus, secrets are partitioned into secret shares, with each secret share stored in a different CC node within the DSS system.

Figure 13:
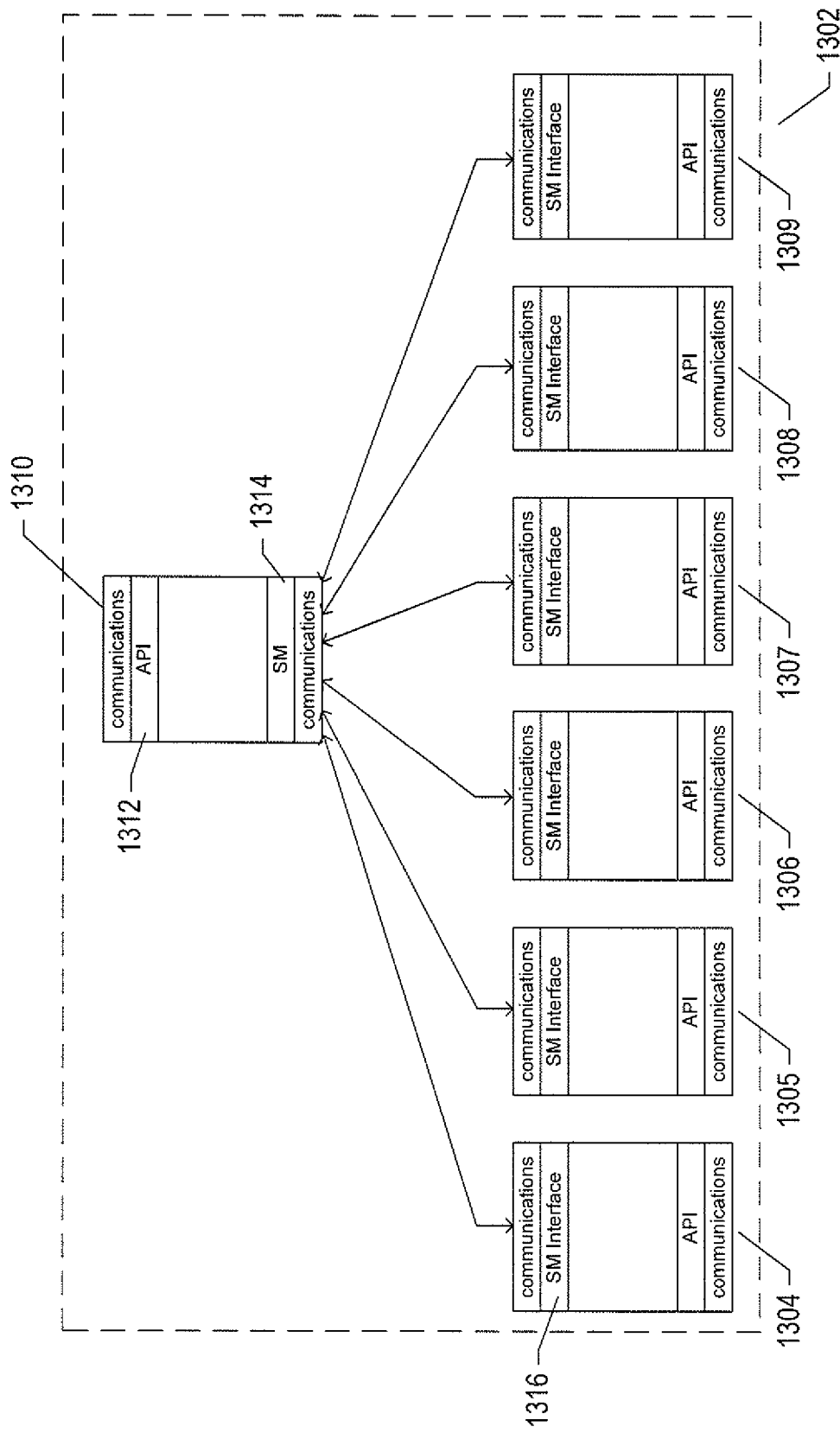
FIG. 13 illustrates the DSS system.

FIG. 13 illustrates the DSS system. The DSS system 1302 includes multiple CC nodes, such as CC nodes 1304-1309 shown in FIG. 13, and an SM 1310. The SM includes an API 1312 through which the SM provides services to SM clients, which may include personal computers and other processor-controlled devices used by system administrators and other privileged DSS users as well as non-privileged client computers. The SM includes an SM interface 1314 through which SM functionalities are accessed by the CC nodes. The CC nodes, such as CC node 1304, additionally include an SM interface, such as SM interface 1316 in CC node 1304, through which the SM accesses certain CC-node functionalities and services. The SM is a trusted and secure server that often resides within a private data center or in other secure environments. By contrast, the CC nodes may be distributed across multiple different data centers, including public cloud-computing facilities, may be implemented above different hardware and systems platforms, and a preferably managed by different administrators.

Figure 14:
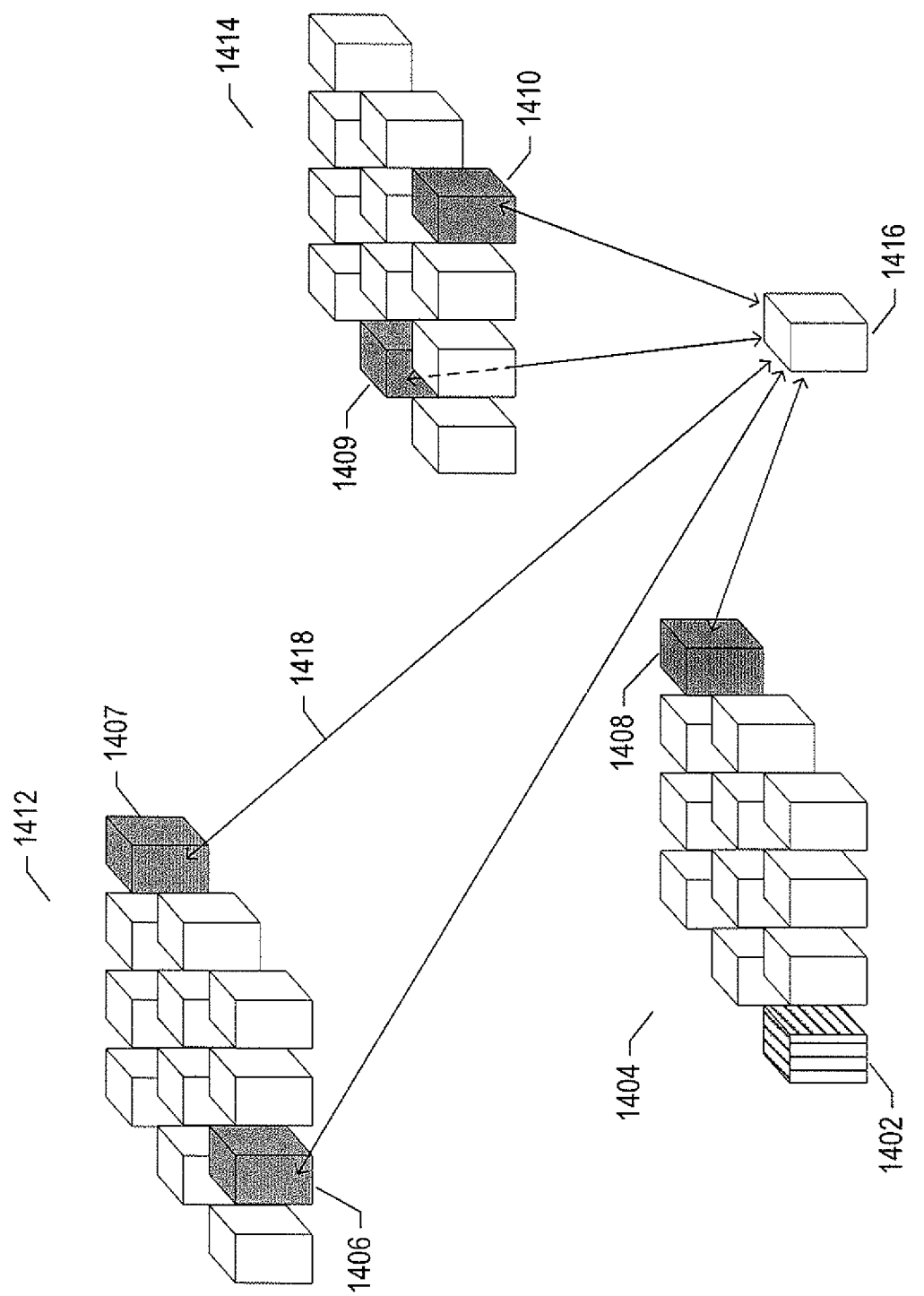
FIG. 14 illustrates a DSS system and a DSS-system client.

FIG. 14 illustrates a DSS system and a DSS-system client. The DSS system includes an SM 1402 in a first private data center 1404 and five CC nodes 1406-1410 distributed among the private data center 1404 and two cloud-computing facilities 1412 and 1414. The DSS-system client 1416 obtains a secret from the DSS system by requesting secret shares from CC nodes, as indicated by arrows in FIG. 14, including arrow 1418. The DSS-system client may be a physical or virtual server within the private data center 1404, may be a physical or virtual server within another data center or cloud-computing facility, or may be a personal computer, smart phone, or other processor-controlled device used by a human client of the DSS system.

Figure 15:
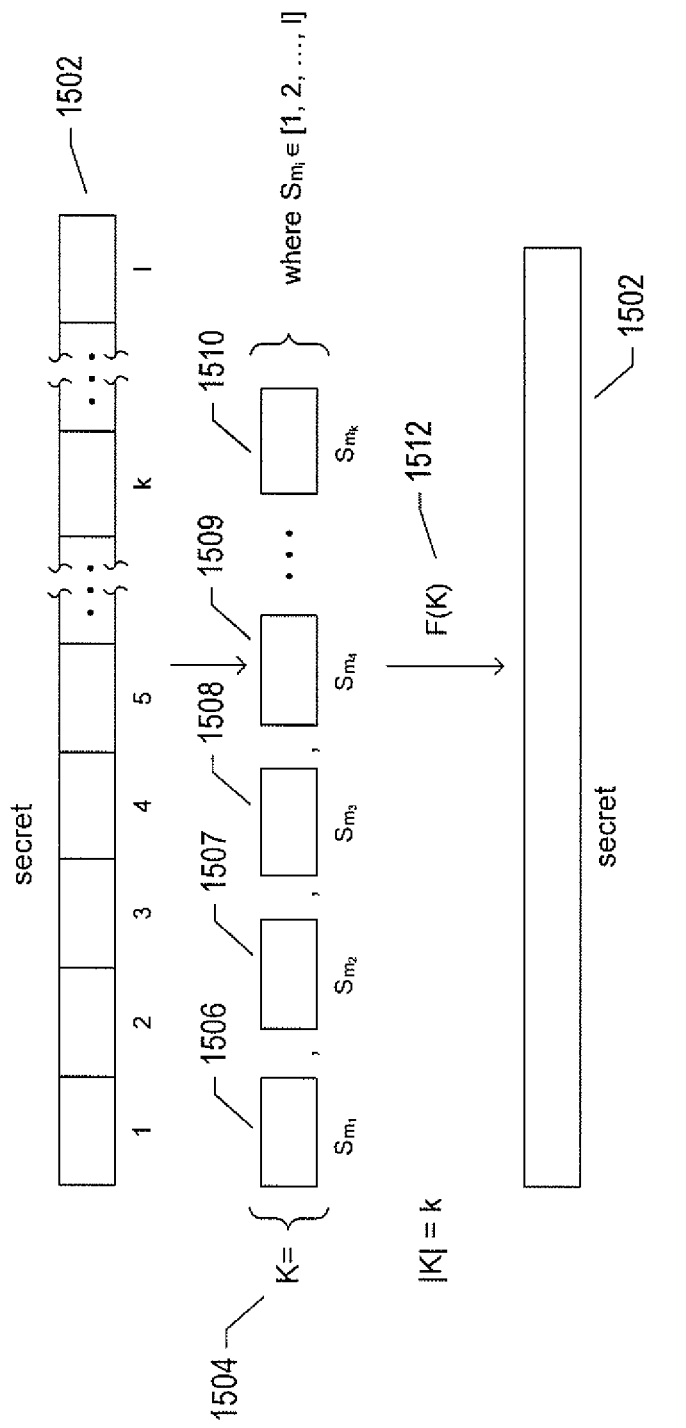
FIG. 15 provides additional details about secrets and secret shares.

FIG. 15 provides additional details about secrets and secret shares. As discussed above, with reference to FIG. 1, the secret 1502 is a number, string, or other numeric or alphanumeric data encoded in a series of bytes. The secret is divided into l portions, or secret shares, each labeled with an integer. Only k secret shares are needed to reconstruct the original secret. A set K 1504 of k secret shares 1506-1510 is shown in the middle of FIG. 15. There is a function F(K) 1512 that receives a set of K secret shares and returns the original secret 1502. The fact that only k out of l secret shares are needed to reconstruct the original secret provides resilience to failure or corruption of up to l–k CC nodes.

Figure 16:
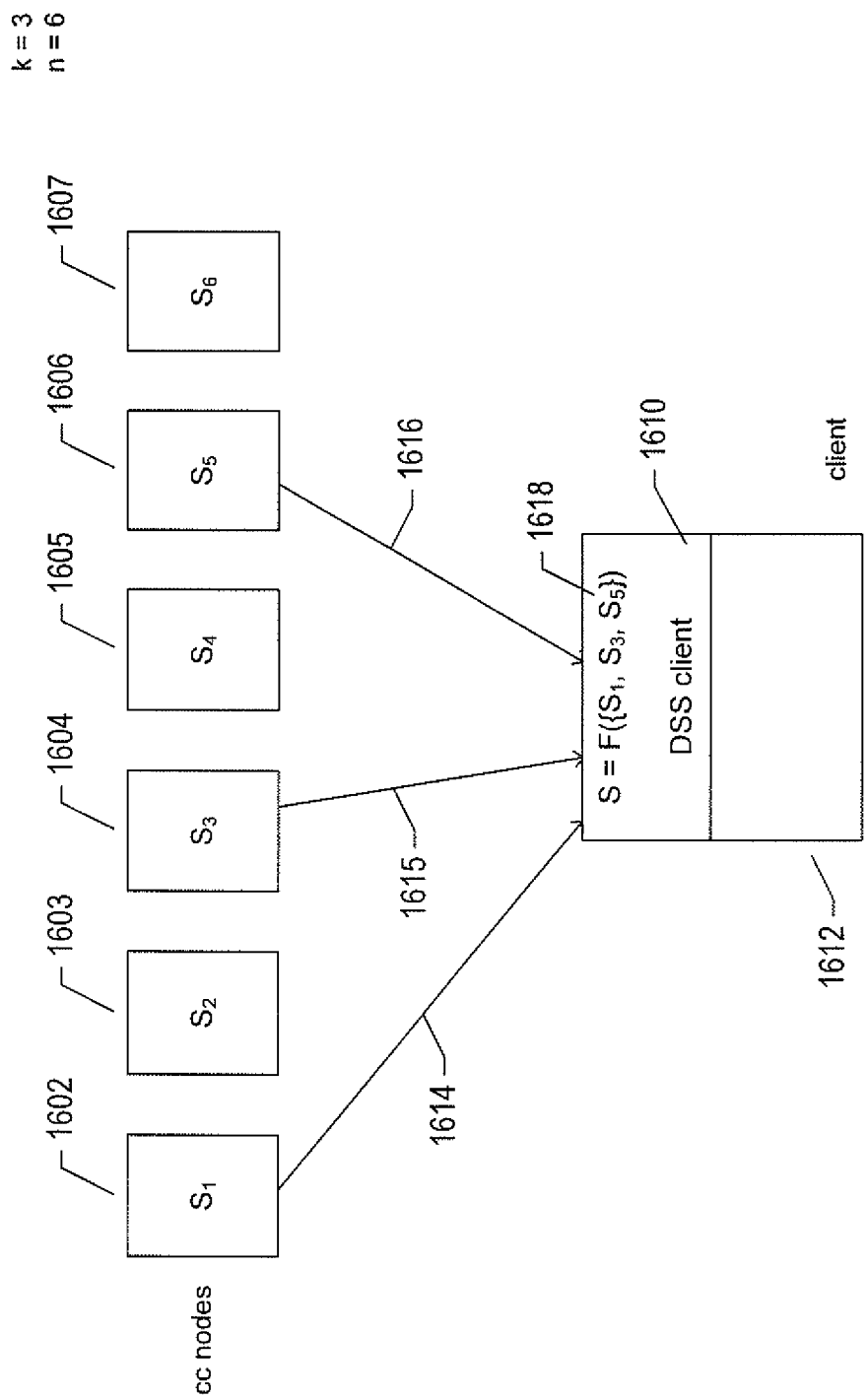
FIG. 16 illustrates secret reconstruction by a DSS-client agent.

FIG. 16 illustrates secret reconstruction by a DSS-client agent. In the example shown in FIG. 16, there are 6 CC nodes 1602-1607. The DSS-client agent 1610 within a client system 1612 receives secret shares from the first, third, and fifth CC nodes, represented by arrows 1614-1616 in FIG. 16, and applies the above-discussed function F(K) to the set of secret shares $\{S_1, S_3, S_5\}$ to recover the secret S 1618.

In order to provide secure secret storage, the DSS system employs secure communications between DSS-client agents, CC nodes, the SM, and administrative clients of the SM. Secure communications includes both data encryption and two-way authentication of each pair of communicating entities. Furthermore, as discussed above, secrets are not stored in mass storage within the CC nodes, only transiently reside in SM memory prior to distribution of secret shares to CC nodes, and, when reconstructed in DSS clients, are reconstructed by DSS-client agents for temporary, in-memory use. Other types of data maintained by the SM and CC nodes, discussed below, are encrypted before storage in mass storage devices within the DSS system.

Figure 17:
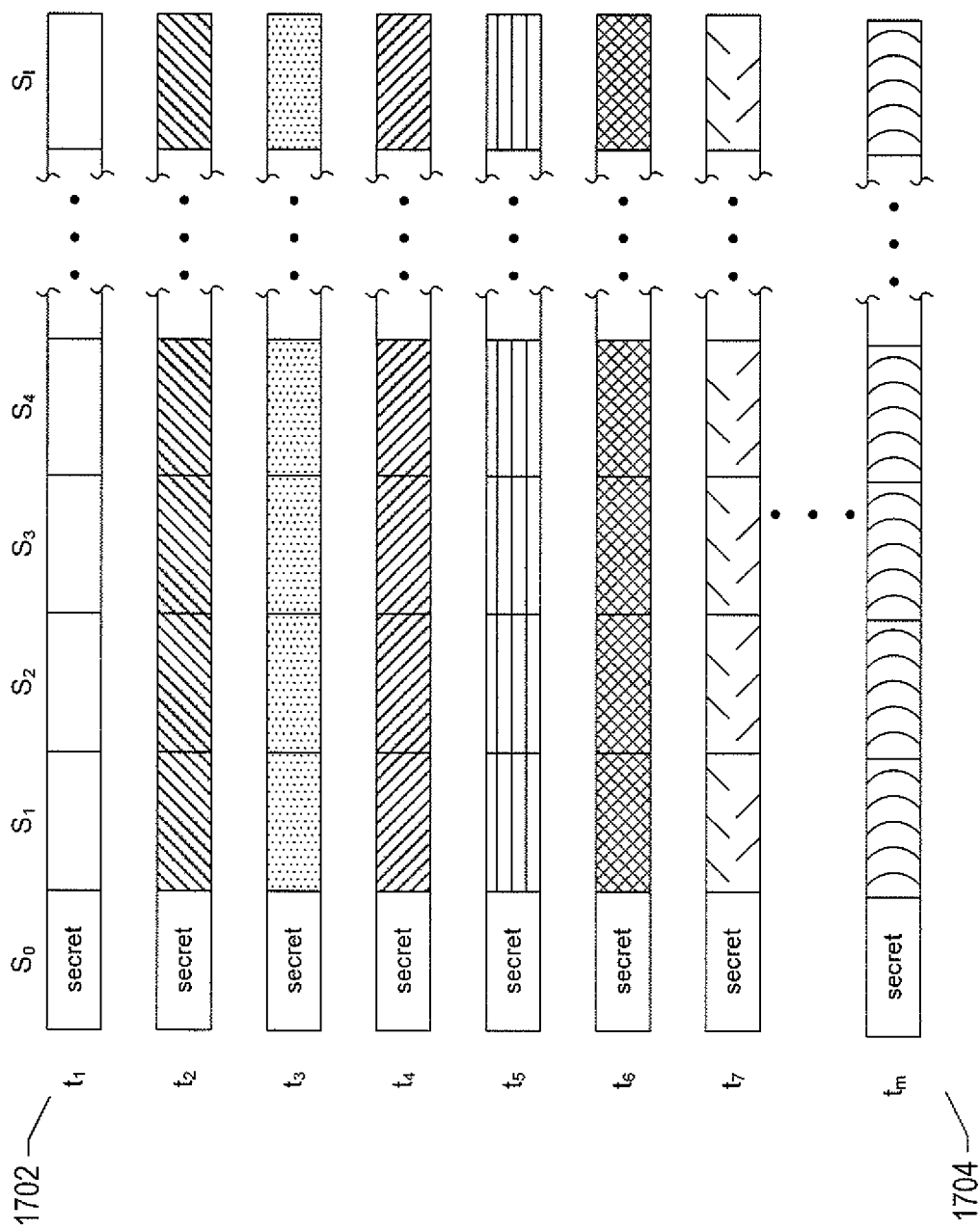
FIG. 17 illustrates an additional security technique played by the DSS system and additional details about secrets stored by the DSS system.

FIG. 17 illustrates an additional security technique employed by the DSS system and additional details about secrets stored by the DSS system. In FIG. 17, a given secret is illustrated at different points in time starting with time $t_i$ 1702 and ending with time $t_m$ 1704. At each point in time, the secret conceptually consists of l+1 secret shares, with data encodings of the secret shares $S_1, S_2, \ldots, S_l$ distributed across a set of l CC nodes. The secret share $S_0$ is never encoded, never stored in memory, and is not distributed, but may be recovered, by the DSS-client agent, using an interpolation process represented by the above-discussed function F(K). In other words, the secret share $S_0$ is the original secret, but is only reconstructed or recovered, in certain cases, by the DSS system within the DSS-client agent. Viewing the representation of the secret at each of the time points shown in FIG. 17, it can be seen that the secret share $S_0$ does not change, over time, but the secret shares $S_1$, $S_2, \ldots, S_l$ change from one time point to another, as represented by the crosshatching, dotting, and other patterns shown within the secret shares $S_1, S_2, \ldots S_l$ at the different time points. Each of the time-point-associated changes in the secret shares $S_1, S_2, \ldots, S_l$ is referred to as a "secret-share refresh." In order to reconstruct the underlying secret, at least k secret shares within the same refresh period are needed. Secret shares from different refresh periods are not compatible with one another. Altering the secret shares periodically or intermittently frustrates various types of attempts by malicious actors to acquire a sufficient number of secret shares to reconstruct the secret. For example, even were a malicious entity aware of the IP addresses of the CC nodes and able to surmount the many security features that protect the memory and mass-storage resources of the CC nodes from remote access, the refresh interval can be configured to be sufficiently short to prevent the malicious entity from accessing k secret shares corresponding to a particular secret within k different CC nodes prior to the next secret-share refresh.

Figure 18:
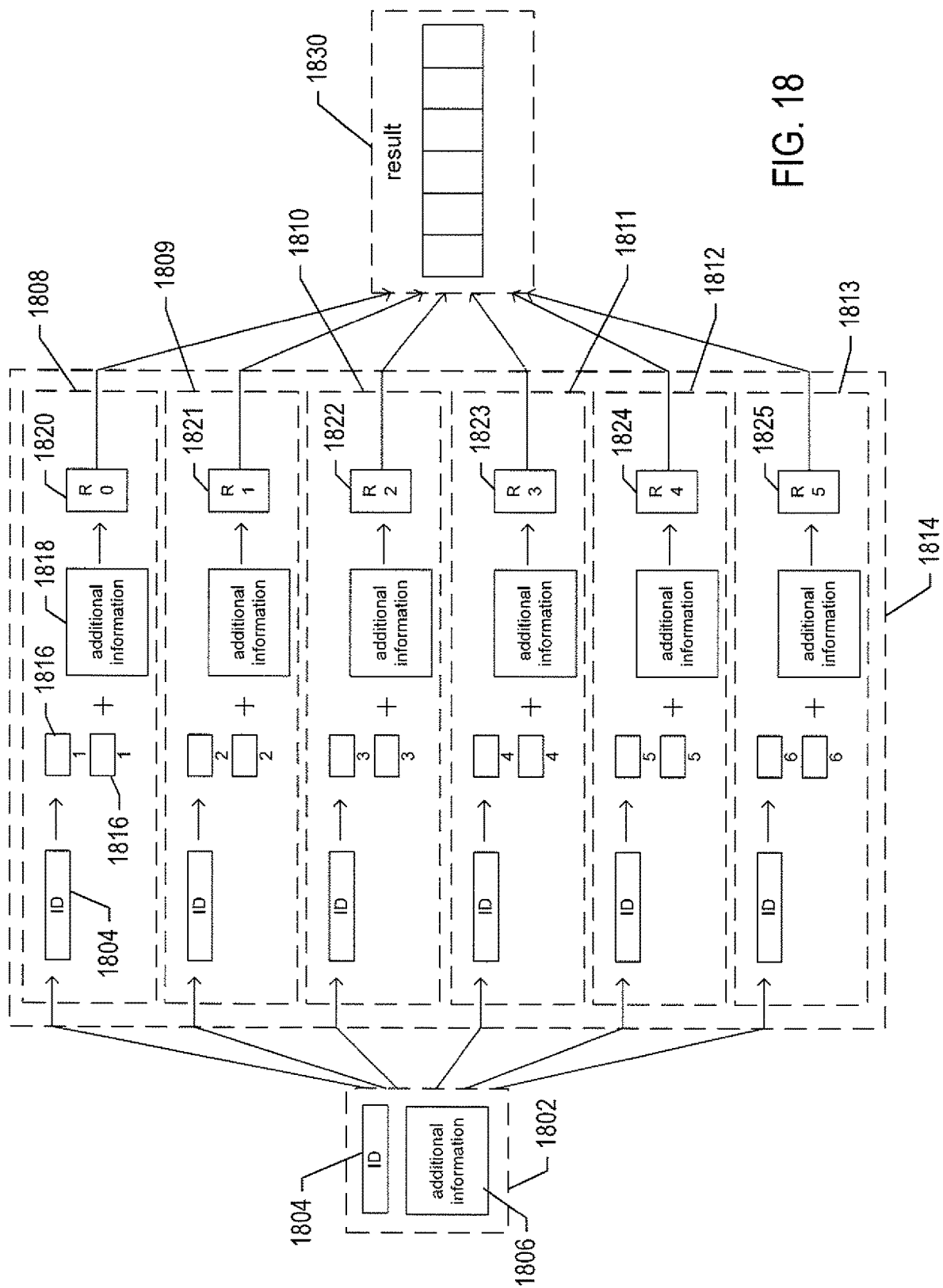
FIGS. 18-19 illustrates an example of how securely stored secrets may be employed for providing a service or result without ever being reconstructed from the distributed secret shares in memory.
Figure 19:
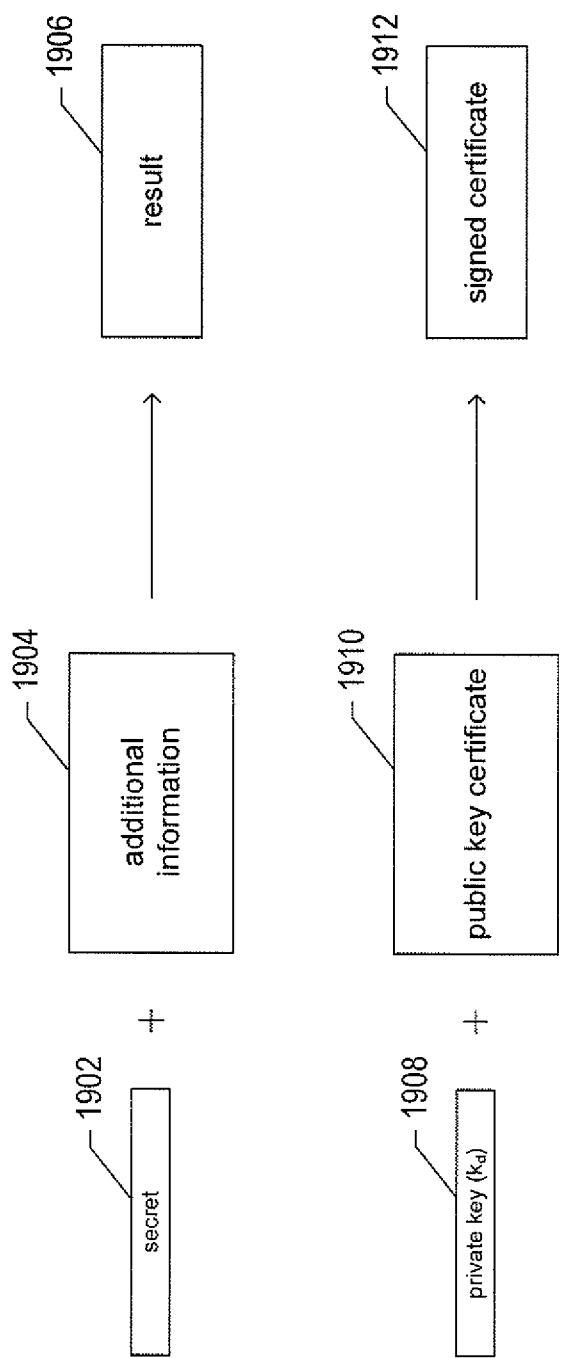

In many implementation, in order to increase resilience of secure secret storage to various types of malicious attacks and to prevent inadvertent exposure of secrets by client computers, secrets are never reconstructed by the DSS-client agents. FIGS. 18-19 illustrates an example of how securely stored secrets may be employed for providing a service or result without ever being reconstructed from the distributed secret shares in memory. In FIG. 18, a service request 1802 transmitted by a DSS-client agent is illustrated as a dashed rectangle that contains an identifier 1804 as well as additional information 1806. The service request 1802 is forwarded to each of 6 CC nodes, represented by dashed rectangles 1808-1813, which together comprise the secure secret storage components of the DSS system, represented by the enclosing dashed rectangle 1814. Within each CC node, such as in CC node 1808, the service request is processed by using the identifier 1804 to access a secret share 1816 stored by the CC node of the secret identified by the identifier. The secret share is then used, along with the additional information 1818 extracted from the service request, to generate a corresponding result share 1820. Each CC node generates a different result share 1820-1825. These results shares are returned to the DSS-client agent within the service-requesting client, which then reconstructs a result 1830 from the individual result shares. As shown in FIG. 19, this process can be conceptualized as employing a securely stored secret 1902 along with additional information 1904 to generate a result 1906, but, as shown in FIG. 18, the result is generated piecewise by multiple CC nodes and only instantiated within the DSS-client agent. One example is the use of a private encryption key 1908 associated with a client, securely stored as a secret within the DSS system, and a public-key digital certificate 1910, to produce a signed digital certificate 1912 that provides verification, to a recipient, that the public key contained in the certificate corresponds to the client's private key. In this case, the client's private key is never reconstructed within the DSS system or within the client, so that the client's private key is never vulnerable to exposure to, or theft by, remote computer systems or other processor-controlled devices. Thus, by using securely stored secrets within the DSS system to produce results shares that are transmitted to service-requesting clients, the DSS system ensures that secrets are, in fact, securely stored and invulnerable to most, if not all, types of external attacks. When each of the CC nodes is administered and controlled by a different entity, distributed among different data centers and/or cloud-computing facilities, and implemented on different types of hardware and system platforms, the possibility of an internal security breach is extremely small.

Next, a computational framework for secure secret storage is provided using mathematical notation. It should be emphasized, at the onset, that the computational framework is neither abstract nor mathematical, but is instead a computational process carried out by physical components of one or more computer systems. The various quantities expressed in the mathematical notation, such as secrets, may be encoded within many sequential bytes of memory, and the various arithmetic and finite-field-arithmetic operations described by the mathematical notation generally require implementation by computational processes rather than implementation by execution of single hardware-level and hardware-provided instructions.

A secret, regardless of whether the secret is interpreted as a number, a string of symbols, or any of many different complex data types, it is considered in the following discussion to be a positive integer:

$$\text{Secret } S \in \mathbb{N}. \tag{1}$$

As discussed above, l distributable secret shares can be generated from a given secret:

$$S \rightarrow S_1, S_2, S_3, \ldots, S_l. \tag{2}$$

As also discussed above, a secret S conceptually comprises a set of l+1 secret shares:

$$S \equiv \{S_0, S_1, S_2, S_3, \ldots, S_l\} \tag{3}$$

The first component $S_0$ is the secret. The remaining l components $\{S_1, S_2, S_3, \ldots, S_l\}$ are distributed to CC nodes. A subset K of the remaining l components of cardinality k can be used to recover the secret $S_0$ (or S) via a function F( ) applied to the subset K:

$$K \subset S, S_0 \notin K, \tag{4}$$

$$|K| = k, \tag{5}$$

$$1 < k \leq l, \tag{6}$$

$$S_0 = F(K). \tag{7}$$

In one implementation, a secret S is initially encoded as a finite-field polynomial by the SM in order to partition the secret S into secret shares in a way that allows the secret S to be recovered from a subset of the secret shares. First, a number N is selected and a number P is computed from N, as follows:

$$N \in \mathbb{N}, N \gg S_0, \tag{8}$$

$$P = \phi(N), \text{ where } \phi(\ ) \text{ is Euler's totient function}, \tag{9}$$

$$\phi(N) = |x : x \in [1, 2, \ldots, N-1] \wedge \gcd(x, N) = 1|. \tag{10}$$

The number P is the number of positive integers less than N that are coprime to N. A finite-field polynomial is then generated, as follows:

$$f(x) = (a_0 + a_1 x^1 + a_2 x^2 + \ldots + a_{k-1} x^{k-1}) \bmod P,$$

$$\text{where } \forall a_1, a_1 < P \wedge a_1 \text{ is randomly chosen.} \tag{11}$$

The secret shares are generated from the finite-field polynomial, as follows:

$$S_1 = f(m(1)), S_2 = f(m(2)), \ldots, S_l = f(m(l)),$$

$$\text{where } m(i) \in [1, 2, \ldots, l] \text{ AND } \forall i, j \in [1, 2, \ldots, l] i \neq j \Rightarrow m(i) \neq m(j). \tag{12}$$

The function m( ) is a map from the ordered positive integers $\{1, 2, \ldots, l\}$ corresponding to l CC nodes to numeric identifiers of the shares distributed to each of the CC nodes. This mapping provides for assigning shares to CC nodes independently of an ordering of the CC nodes. However, for simplicity of description, the following discussion assumes that the ordering of the secret shares matches the ordering of the CC nodes:

$$S_1 = f(1), S_2 = f(2), \ldots, S_l = f(l). \tag{13}$$

An index function returns the index of the secret share in a set of secret shares K with respect to a sequential ordering of the secret shares:

$$\text{index}(K, i) = \text{index of } K_i \text{ in the ordered set } S. \tag{14}$$

A DSS-client agent uses a Lagrangian-multipliers interpolation method to recover a value $S_0'$ related to the original secret $S_0 = f(0)$ from a set of k secret shares K:

$$s_0' = \tag{15}$$

$$F(K) = \frac{1}{\Delta} \cdot \sum_{j=1}^{k} \left( K_j \cdot \Delta \cdot \frac{\prod_{i=1, i \neq j}^{k} \text{index}(K, i)}{\prod_{i=1, i \neq j}^{k} \text{index}(K, i) - \text{index}(K, j)} \right) \bmod N,$$

where $\Delta = l!$, $$s_0' = F(K) = \frac{1}{\Delta} \cdot \sum_{j=1}^{k} C_j K_j \bmod N, \tag{16}$$

where $C_j = \sum_{j=1}^{k} \Delta \cdot \frac{\prod_{i=1, i \neq j}^{k} \text{index}(K, i)}{\prod_{i=1, i \neq j}^{k} \text{index}(K, i) - \text{index}(K, j)}$ Essentially, this method relies on the fact that, for a k-order polynomial, k+1 distinct points are needed to determine an expression for the polynomial.

The value S is:

$$S_0' = (a_0) \bmod P = a_0 + jP. \tag{17}$$

According to Euler's Theorem, $$x = y \bmod \phi(N) \wedge \gcd(b, N) = 1 \rightarrow b^x = b^y \bmod N. \tag{18}$$

Therefore, $$b^{S_n a_0} = b^{a_n} (\bmod N), \tag{19}$$

$$a_0 < P \wedge a_0 \in \mathbb{N} \rightarrow a_0 \text{ is minimum positive value for which } b^{a_n} = b^{N_a'} \bmod N. \tag{20}$$

Thus, a secret S is initially encoded, when received by the SM, as a finite-field polynomial, using which the SM generates secret shares for distribution to the CC nodes. A DSS-client agent, upon receiving at least k of l secret shares from the CC nodes can then use Lagrangian-multiplayer interpolation and Euler's Theorem to recover the secret S.

FIGS. 20A-C provide numeric examples of a polynomial encoding of a secret, generation of secret shares, recovery of the secret from k secret shares, and secret-share verification. FIGS. 20A-B provided numeric example of the process described above in mathematical notation. In this example, the secret is the positive integer 124 (2002 in FIG. 20A). The integer N is selected to be 1739 and the integer P is computed to be 1656 (2004 in FIG. 20A). For this example, there are l=6 CC nodes and at least k=4 secret shares are needed to recover the original secret (2006 in FIG. 20A). A finite-field polynomial is selected (2008 in FIG. 20A), from which six secret shares are generated (2010 in FIG. 20A). Given the set K={S2, S4, S5, and S6} (2012 in FIG. 20A), with corresponding share-index values 2014, the coefficients for the function F(K), shown above as expression (16), are computed as shown 2016 in the lower portion of FIG. 20A. Then, as shown in the top portion of FIG. 20B, the value $S_0'$ is computed using the function F(K) 2018. As discussed above with reference to expression (19), the integer 3 raised to the value $S_0'$ is equal to the integer 3 raised to the value $S_0'$ modulo N 2019. This allows for the original secret $S=S_0'$ to be computed 2020 as discussed above with reference to equations (19-20). Of course, there are systematic computational methods for evaluating finite-field exponentials and, as discussed above, while small numerical examples are shown in FIGS. 20A-C, secrets are generally treated as very large positive integers stored in many successive bytes, as a result of which computational processes for evaluating the values expressed in mathematical notation, above, are used in place of simple, single arithmetic operations corresponding to processor instructions.

In order to securely store secrets, the DSS system employs numerous internal security methods, as discussed above. An additional set of security methods, not yet mentioned, relates to designing the DSS system to be resilient to malicious entities assuming control of a subset of the CC nodes as well as to be resilient to intentional or inadvertent secret-share corruption. To address these issues, secret shares are designed to be verifiable, with the verification procedure not requiring reconstruction of the underlying secret to verify any particular secret share generated from the underlying secret.

In order to describe the secret-share verification process, cyclic multiplicative groups are first described. An example of a cyclic multiplicative group is the set of positive integers from 1 to an integer q−1, where q is a prime number:

$$q \in \mathbb{P} \Rightarrow Q=\{1,2,\ldots,q-1\} \text{ is a cyclic multipicative group.} \quad (21)$$

Multiplication of any two members of a cyclic multiplicative group produces a value corresponding to another member of the cyclic multiplicative group. Furthermore, the cyclic multiplicative group includes the generator from which all other members of the cyclic multiplicative group are generated by multiplying the generator by itself. For example, a cyclic multiplicative group Q with generator g can be constructed as follows:

$$q=5, Q=\{1,2,3,4\}, g=2. \quad (22)$$

The following products illustrate generation of the members of the cyclic multiplicative group Q by generator g:

$g^0=1$ $g^1=2$ $g_2=g \cdot g \bmod q=4$ $g^3=g^2 \cdot g \bmod q=8 \bmod q=3$ $g^4=g^2 \cdot g^2 \bmod q=1$ $g^5=g^3 \cdot g^2 \bmod q=2$ $g^6=g^3 \cdot g^3 \bmod q=4$ $g^7=g^4 \cdot g^3 \bmod q=3$ As discussed above, the finite-field polynomial that is used by the SM to encode a secret has the form:

$$S_i=(a_0+a_1 i^1+a_2 i^2+\ldots+a_{k-1} i^{k-1}) \bmod P. \quad (23)$$

When i has the value 0, the value of the polynomial is $S_0$, the original secret encoded by the polynomial. When i has a value selected from the values $\{1, 2, \ldots, l\}$, the value of the polynomial is the $i^{th}$ secret share $S_1$. The integers N and P are generally not prime, but a multiplicative group Q can be defined as:

$$Q=\{1,2,\ldots,P-1\}. \quad (24)$$

$$g \in Q \setminus \{1\} \wedge gcd(g,N)=1. \quad (25)$$

The generator g raised to the value of a secret share $S_1$ can be expressed as:

$$g^{S_i} = g^{(a_0+a_1 i^j+a_2 i^2+\ldots+a_{k-1} i^{k-1})} \bmod P, \quad (26)$$

$$= g^{a_0+jP+a_1 i^1+a_2 i^2+\ldots+a_{k-1} i^{k-1}}. \quad (27)$$

The resulting value modulo N is therefore:

$$g^{S_1} \bmod N = g^{a_0+jP+a_1 1^1+a_2 1^2+\ldots+a_{k-1} 1^{k-1}} \bmod N. \quad (28)$$

Using Euler's Theorem:

$$a_0=a_0+jP \bmod P \wedge gcd(g,N)=1 \rightarrow g^{a_0}=g^{a_0+jP} (\bmod N). \quad (29)$$

Therefore, the generator g raised to the value of a secret share $S_1$ modulo N can be expressed as:

$$g^{S_i} \bmod N = g^{a_0+a_1 i^1+a_2 i^2+\ldots+a_{k-1} i^{k-1}} \bmod N, \quad (30)$$

$$= g^{a_0} \cdot g^{a_1 i^1} \cdot g^{a_2 i^2} \cdot \ldots \cdot g^{a_{k-1} i^{k-1}} \bmod N, \quad (31)$$

$$= g^{a_0} \cdot (g^{a_1})^{i^1} \cdot (g^{a_2})^{i^2} \cdot \ldots \cdot (g^{a_{k-1}})^{i^{k-1}} \bmod N, \quad (32)$$

$$= \prod_{0 \le j < k} (g^{a_j})^{i^j} \bmod N. \quad (33)$$

Thus, the generator g raised to the value of a secret share $S_i$ modulo N is equal to the product of the values $(g^{a_1})^{1'}$, where j takes on the values of the indices of the polynomial coefficients. The verification set G can then be constructed as:

$$G=\{g^{a_0}, g^{a_1}, \ldots, g^{a_{k-1}}\} \bmod N. \quad (34)$$

This verification set is generated by the SM along with the secret shares. A verification function V can then be defined for use by entities, such as CC nodes, which receive secret shares to allow the entities to verify that the secret share was, in fact, generated from a polynomial:

$$B = \{true, false\}, \quad (35)$$

$$V(G, i, S_i, g) \rightarrow B \equiv g^{N_i} \bmod N = \prod_{g^{a_j} \in G} (g^{a_j})^{i^j} \bmod N. \quad (36)$$

FIG. 20C illustrates the verification set G and application of the verification function for the numeric example begun in FIGS. 20A-B. The set G is constructed at the top of FIG. 20C 2022. Verification of the first and second shares is illustrated in the sets of equations 2024 and 2026.

Next, the refresh operation is discussed. Again, the discussion begins with the finite-field polynomial secret encoding:

$$S_1 = (a_0 + a_1 i^1 + a_2 i^2 + \ldots + a_{k-1} i^{k-1}) \bmod P, \quad (37)$$

$$S_1 = a_0 + jP + a_1 i^1 + a_2 i^2 + \ldots + a_{k-1} i^{k-1}. \quad (38)$$

To refresh the secret shares, each CC node j generates a new polynomial over the integers $S_{i,j}^*$ and a corresponding verification set $G_1^*$:

$$S_{i,1}^* = b_{1,1} i^1 + b_{1,2} i^2 + \ldots + b_{1,k-1} i^{k-1} \quad (39)$$

$$g^{S_{i,1}^*} \bmod N = g^{b_{1,1} i^1 + b_{1,2} i^2 + \ldots + b_{1,k-1} i^{k-1}} \bmod N \quad (40)$$

$$g^{S_{i,1}^*} \bmod N = g^{b_{1,1} i^1} \cdot g^{b_{1,2} i^2} \cdot \ldots \cdot g^{b_{1,k-1} i^{k-1}} \bmod N \quad (41)$$

$$G_1^* = \left\{ g^{b_{1,1}}, g^{b_{1,2}}, \ldots, g^{b_{1,k-1} i^{k-1}} \right\} \quad (42)$$

$$S_{i,2}^* = b_{2,1} i^1 + b_{2,2} i^2 + \ldots + b_{2,k-1} i^{k-1} \quad (43)$$

$$g^{S_{i,2}^*} \bmod N = g^{b_{2,1} i^1 + b_{2,2} i^2 + \ldots + b_{2,k-1} i^{k-1}} \bmod N \quad (44)$$

$$g^{S_{i,2}^*} \bmod N = g^{b_{2,1} i^1} \cdot g^{b_{2,2} i^2} \cdot \ldots \cdot g^{b_{2,k-1} i^{k-1}} \bmod N \quad (45)$$

$$G_2^* = \left\{ g^{b_{2,1}}, g^{b_{2,2}}, \ldots, g^{b_{2,k-1} i^{k-1}} \right\} \quad (46)$$

$$S_{i,l}^* = b_{l,1} i^1 + b_{l,2} i^2 + \ldots + b_{l,k-1} i^{k-1} \quad (47)$$

$$g^{S_{i,1}^*} \bmod N = g^{b_{l,1} i^1 + b_{l,2} i^2 + \ldots + b_{l,k-1} i^{k-1}} \bmod N \quad (48)$$

$$g^{S_{i,2}^*} \bmod N = g^{b_{l,1} i^1} \cdot g^{b_{l,2} i^2} \cdot \ldots \cdot g^{b_{l,k-1} i^{k-1}} \bmod N \quad (49)$$

$$G_l^* = \left\{ g^{b_{l,1}}, g^{b_{l,2}}, \ldots, g^{b_{l,k-1} i^{k-1}} \right\} \quad (50)$$

The process of generating the new polynomial over the integers by each CC node can be summarized as:

$$S_{t,1 \le r \le l}^* = b_{r,1} i^1 + b_{r,2} i^2 + \ldots + b_{r,k-1} i^{k-1}. \quad (51)$$

Each CC node then generates a set of shares from the new polynomial over the integers and transmits a share to each of the other CC nodes, along with the corresponding verification set. Each CC node verifies the new share received from each of the other CC nodes. Finally, each CC node adds together all of the received new shares to produce a sum that is then added to the CC node's current share to produce a new, refreshed share and a new corresponding verification set:

$$S_i^* = S_i + \sum_{1 \le r < l} S_{i,j}^* = a_0 + jP + \left(a_1 + \sum_{1 \le r < l} b_{r,1}\right) i^1 + \quad (52)$$

$$\left(a_2 + \sum_{1 \le r < l} b_{r,2}\right) i^2 + \ldots + \left(a_{k-1} + \sum_{1 \le r < l} b_{r,k-1}\right) i^{k-1},$$

$$g^{S_i^*} = g^{S_i} \cdot g^{\sum_{1 \le r < l} S_{i,j}^*}, \quad (53)$$

$$= g^{a_0} \cdot (g^{a_1})^{i^1} \cdot (g^{a_2})^{i^2} \cdot \ldots \cdot (g^{a_{k-1}})^{i^{k-1}} \cdot (g^{b_{1,1}})^{i^1} \cdot \ldots \quad (54)$$

$$\left(g^{b_{1,k-1} i^{k-1}}\right)^{i^{k-1}} \cdot \ldots \cdot (g^{b_{1,1}})^{i^1} \cdot \ldots \cdot \left(g^{b_{1,k-1} i^{k-1}}\right)^{i^{k-1}},$$

$$= g^{a_0} \cdot (g^{a_1} \cdot g^{b_{1,1}} \cdot \ldots \cdot g^{b_{1,l}})^{i^1} \cdot \quad (55)$$
$$(g^{a_2} \cdot g^{b_{2,1}} \cdot \ldots \cdot g^{b_{2,l}})^{i^2} \cdot \ldots \cdot (g^{a_{k-1}} \cdot g^{b_{1,k-1}} \cdot \ldots \cdot g^{b_{1,1,k-1}})^{i^{k-1}},$$

$$= g^{a_0} \cdot (g^{a_1^*})^{i^1} \cdot (g^{a_2^*})^{i^2} \cdot \ldots \cdot (g^{a_{k-1}^*})^{i^{k-1}}, \quad (56)$$

$$\text{where } g^{a_j^*} = g^{a_j} \cdot \prod_{r=1}^{l} g^{a_{r,1}},$$

$$G^* = \{g^{a_0}, g^{a_1^*}, g^{a_2^*}, \ldots, g^{a_{k-1}^*}\}. \quad (57)$$

Because the new polynomials do not include an $a_0$ coefficient, the sum of the new secret shares corresponds to a value for a new polynomial that has the value 0 for i=0. This new polynomial, when added to the current polynomial encoding of the secret, produces a new polynomial encoding of the secret. In other words, adding the new polynomials together produces a result polynomial that has the value 0 when i=0. Adding this result polynomial to a polynomial that produces the secret when i=0 results in a polynomial that also produces the secret when i=0. The refresh process can be repeatedly carried out, generating a series of new encodings for a given secret. It is important to note that the new polynomials generated by the CC nodes during the refresh operation are not finite-field polynomials, as in the original secret encoding carried out by the SM, but are instead computed over the integers $\mathbb{Z}$. This is important because, in many cases, the value P cannot be revealed by the SM to the CC nodes. Furthermore, because the refresh operations are frequently carried out for each stored secret, it is significantly more efficient to compute new polynomials over the integers $\mathbb{Z}$ rather than over a finite field during the refresh process.

In addition, a slightly modified refresh process can be used for adding a new CC node or recovering a failed CC node. In this process, the existing CC nodes generate new polynomials over the integers which produce 0-valued values for the new or recovering CC node. The existing CC nodes add together all the shares they receive from other CC nodes along with their current share to produce a new share and corresponding verification set, while the new or recovering CC node interpolates its share from the new shares of the other CC nodes using a Lagrangian-multiplier-interpolation function L(K). The process for adding a new CC node or recovering a failed CC node as described, in mathematical notation, as follows:

$$S_i = (a_0 + a_1 i^1 + a_2 i^2 + \ldots + a_{k-1} i^{k-1}) \bmod P, \quad (58)$$

$$S_i = a_0 + jP + a_1 i^1 + a_2 i^2 + \ldots + a_{k-1} i^{k-1}, \quad (59)$$

$$S_{i,j}^{**} = b_{j,1} i^1 + b_{j,2} i^2 + \ldots + b_{j,k-1} i^{k-1}, \quad (60)$$

$$c_j = S_{l+1,j}^{**}, \quad (61)$$

$$S_{i,j}^* = S_{l+1,j}^{**} - c_j, \quad (62)$$

$$S_{l+1,1}^* = 0, \quad (63)$$

$$S_{j,i}' = S_{i,j}^* = b_{j,1} i^1 + b_{j,2} i^2 + \ldots + b_{j,k-1} i^{k-1} - c_j, \quad (64)$$

$$G_j^* = \quad (65)$$

$$\left\{g^{b_{j,1}}, g^{b_{j,2}}, \ldots, g^{b_{j,k-1} i^{k-1}}, g^{-c_j}\right\} = \{g_{j,1}^*, g_{j,2}^*, \ldots, g_{j,k-1}^*, g_{j,k}^*\},$$

-continued $$V(G_j^*, i, S'_{j,i}, g) \rightarrow \tag{66}$$

$$B \equiv \begin{cases} i \neq l+1, & g^{S'_{j,i}} \bmod N = (g_{j,k}^*)^{-1} \cdot \prod_{g_{j,l\leq m>k}^*} (g_{j,m}^*)^{i^m} \bmod N \\ i = l+1, & g^{S'_{j,i}} \bmod N = 1 \end{cases},$$

$$S^* = S_i + \sum_j S_{i,j}^*, \tag{67}$$

$$g^{S_i^*} = g^{S_i} \cdot g^{\sum_j S_{i,j}^*} \tag{68}$$

$$= g^{a_0} \cdot \prod_j (g_{j,k}^*)^{-1} \cdot \left(g^{a_1} \prod_j g_{j,1}^*\right)^{i^1} \cdot \left(g^{a_2} \prod_j g_{j,2}^*\right)^{i^2} \cdots$$

$$\left(g^{a_{k-1}} \prod_j g_{j,k-1}^*\right)^{i^{k-1}},$$

$$G^* = \{g_0^*, g_1^*, \ldots, g_k^*\}, \tag{69}$$

$$S_{l+1}^* = L(K) = \frac{1}{\Delta} \cdot \sum_{j=1}^k C_j K_j \bmod N, \tag{70}$$

$$\text{where } C_j = \sum_{j=1}^k \Delta \cdot \frac{\prod_{i=1,i\neq j}^k \text{index}(K,i) - (l+1)}{\prod_{i=1,i\neq j}^k \text{index}(K,i) - \text{index}(K,j)}$$

$$b^{N_{l+1}^*} = b^{N_{l+1}^*} (\bmod N) \tag{71}$$

Figure 21A:
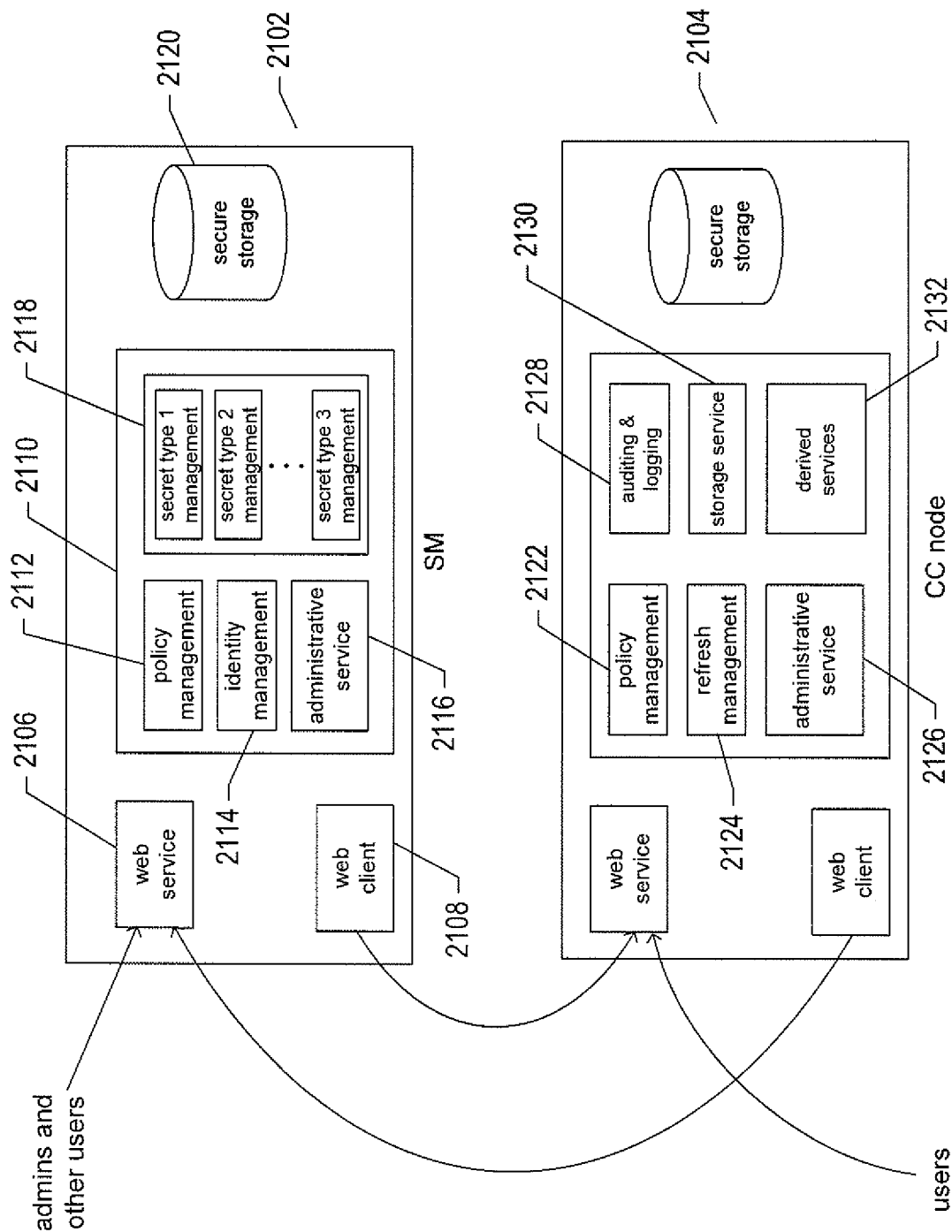
FIGS. 21A-B illustrate, at a relatively high level, one family of implementations.
Figure 21B:
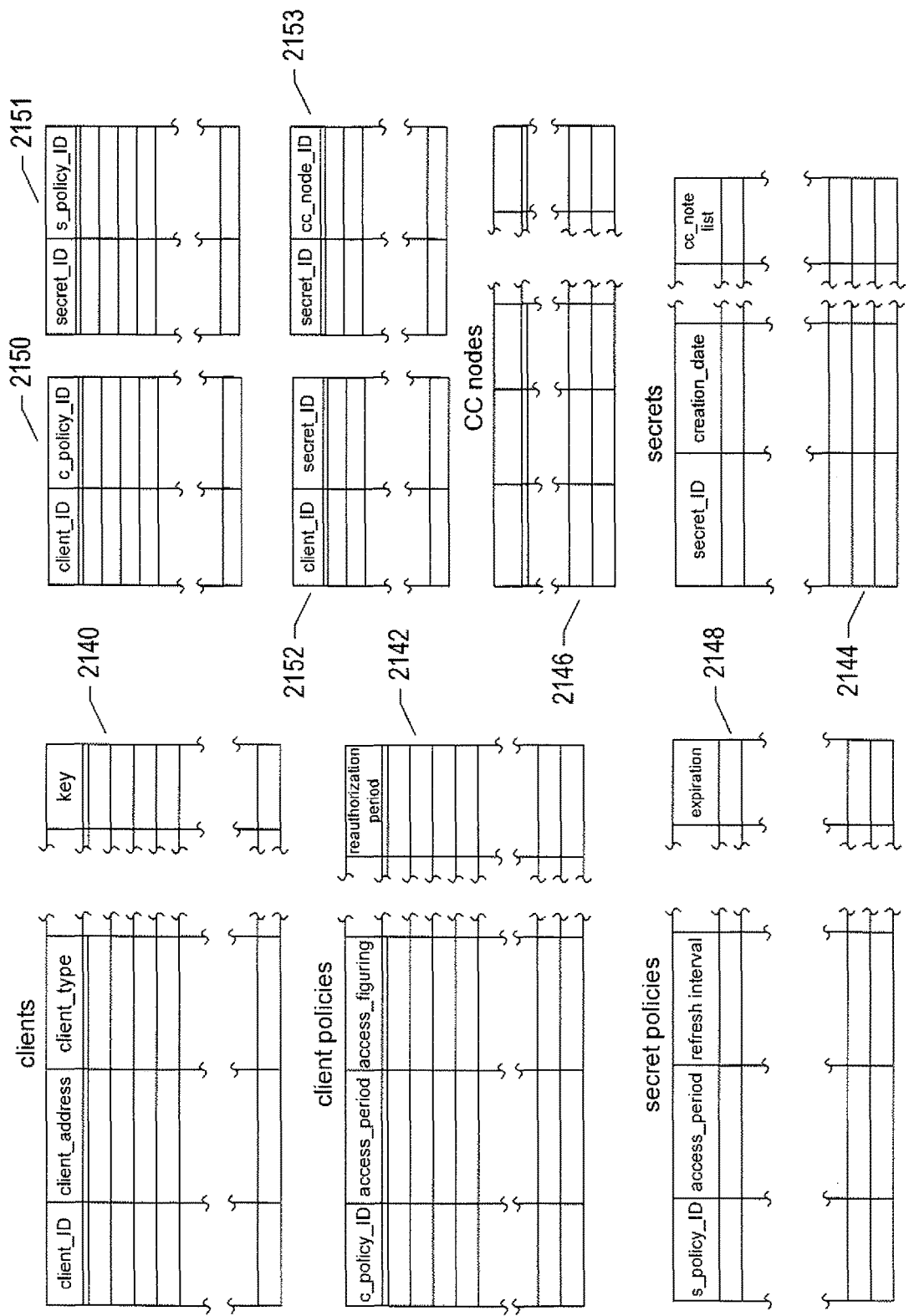

There are a variety of possible implementations of the DSS system. FIGS. 21A-B illustrate, at a relatively high level, one family of implementations. FIG. 21A shows high-level architecture diagrams for the SM 2102 and the CC nodes 2104. The SM 2102 may be implemented as an application server with a web interface and secure storage. The SM includes a web-service interface and module 2106 through which administrators and other users request various services provided by the SM and through which CC nodes access a different set of services provided by the SM. The SM also includes a web-client module 2108 that requests services provided by CC nodes. The SM includes various application modules 2110 that define the SM functionality, including a policy-management module 2112, an identity-management module 2114, an administration-service module 2116, and a set of secret-management modules 2118 that each manages secrets of particular predefined types. An encrypted storage device 2120 stores public keys used for communications, SM private keys, and additional information related to the DSS configuration, DSS-client agents, and DSS CC nodes. In certain implementations of the DSS system, clients, stored secrets, and CC nodes are associated with policies that include rules and parameter values to control operation of the DSS system. For example, clients may be restricted with respect to which stored secrets they can access, may be restricted to certain times and frequencies of access to particular stored secrets, and may be permitted to access only a subset of various additional services provided by the DSS system to DSS-client agents. Secret policies may specify refresh rates for stored secrets, the lifetime for stored secrets, types of access allowed for particular stored secrets, and other such constraints and parameters. The identity-management module 2114 is concerned with management of DSS-client agent identities used in mutual authentication that is a precondition for establishing secure connections between DSS-client agents and CC nodes. In addition. CC-node identities may also be managed by the SM. The administrative-service module 2116 provides a suite of administrative services to administrators, system managers, and other privileged users. These services include configuration services, auditing services, tools for analyzing computational loads and DSS-system performance, policy creation and update, and many other such services. The secret-management modules 2118 are concerned with configuring and managing secret storage, monitoring secret access, configuring derivative services associated with particular types of secret, and other such tasks and operations. The CC-node architecture 2104 is similar to the SM architecture, with each CC node including application modules that implement policy management 2122, refresh management 2124, administrative services 2126, auditing and logging 2128, secret-storage services 2130, and various services associated with particular types of secrets 2132. Again, it should be emphasized that secrets exist for only a short, initial period of time within the DSS system, specifically in SM memory. Once the SM has encoded a secret in a finite-field polynomial, the secret is deleted from SM memory and deletion of the secret is verified. From then on, the secret can only be reconstructed by a DSS-client agent from multiple secret shares obtained from multiple CC nodes, in certain implementations, and, in other implementations, may never again be reconstructed.

FIG. 21B illustrates the types of data that may be stored within the DSS system. FIG. 21B shows a number of relational-database tables to illustrate the internally stored data. This data may be partly distributed across multiple entities. For example, the SM may contain comprehensive data with regard to clients and client policies, a portion of which may be distributed among CC nodes that clients associated with the client policies are authorized to access. The internally stored data may include client data, represented by a clients table 2140, client policies, represented by a client-policies table 2142, data related to stored secrets, represented by a stored-secret table 2144, CC nodes, represented by a CC-node table 2146, and secret policies, represented by a secret-policies table 2148. In addition, a number of tables 2150-2153 store associations between particular clients and particular client policies, particular clients and particular stored secrets, particular secrets and secret policies, and particular secrets and CC nodes that store shares generated from the secrets. In certain embodiments, each DSS client, each client policy, each secret policy, and each stored secret is associated with an identifier, which allows these various data items to be referenced from other data items and in service requests. Client data may include one or more IP addresses for each client, an indication of the type of client, client public keys used for establishing secure communications, and much additional information. Client policies may specify access periods, access frequencies, reauthorization frequencies, subsets of the various types of DSS services that may be accessed by particular clients and groups of clients, and other such information. Secret policies may specify access periods, access frequencies, refresh intervals, lifetimes, expiration dates, and types of associated services that may be performed in association with secret access. Secret data may include creation dates, lists of CC nodes authorized for share storage, refresh intervals, expiration dates, and other such information. CC-node data may include IP addresses, indications of the data centers or cloud-computing facilities in which a CC node resides, resource capacities, operating-system, hardware type, and other such information.

Figure 22A:
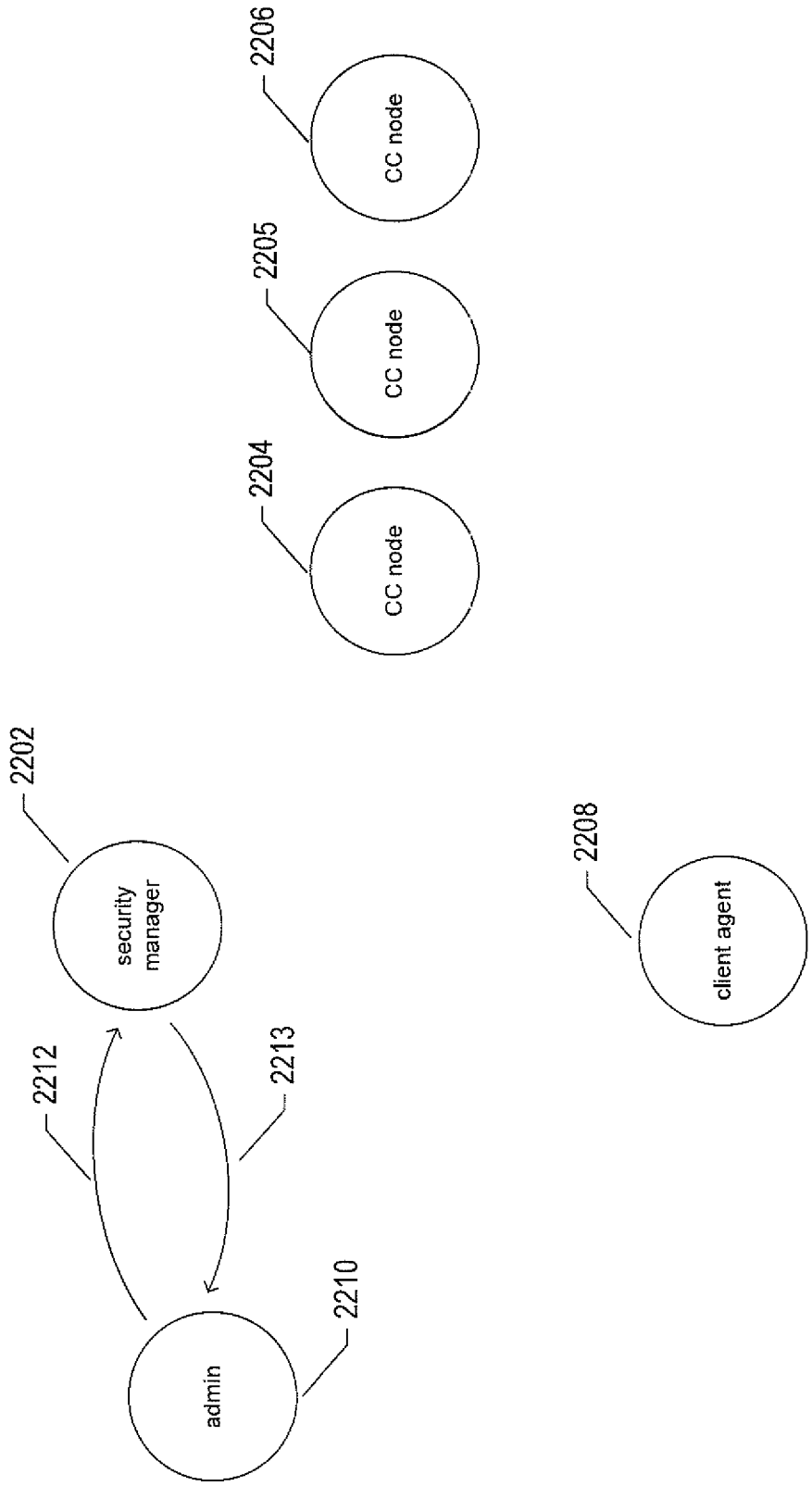
FIGS. 22A-D illustrate the various types of communications and interactions between DSS-system entities and components.

FIGS. 22A-D illustrate the various types of communications and interactions between DSS-system entities and components. FIGS. 22A-D all use the same illustration conventions, next discussed with reference to FIG. 22A. The SM 22, CC nodes 2204-2206, a DSS-client agent 2208, and an administrator or other privileged user 2210 are represented by discs. Interactions between two or more of these entities are represented by pairs of arrows. For example, FIG. 22A illustrates interactions between a privileged user and the SM via arrows 2212-2213. In all cases, secure communications channels are established prior to exchange of sensitive and confidential information and data. Privileged users access a variety of different types of administration and management services provided by the SM. A privileged user may transmit a secret for secure storage by the DSS system, configure CC nodes, authorize particular clients to access secrets, establish various types of policies and associate those policies with particular secrets and DSS-client agents, request and access audits, review logs and performance data, add new CC nodes and terminate existing CC nodes, and carry out the variety of additional types of administration-and-management-related tasks and operations.

Figure 22B:
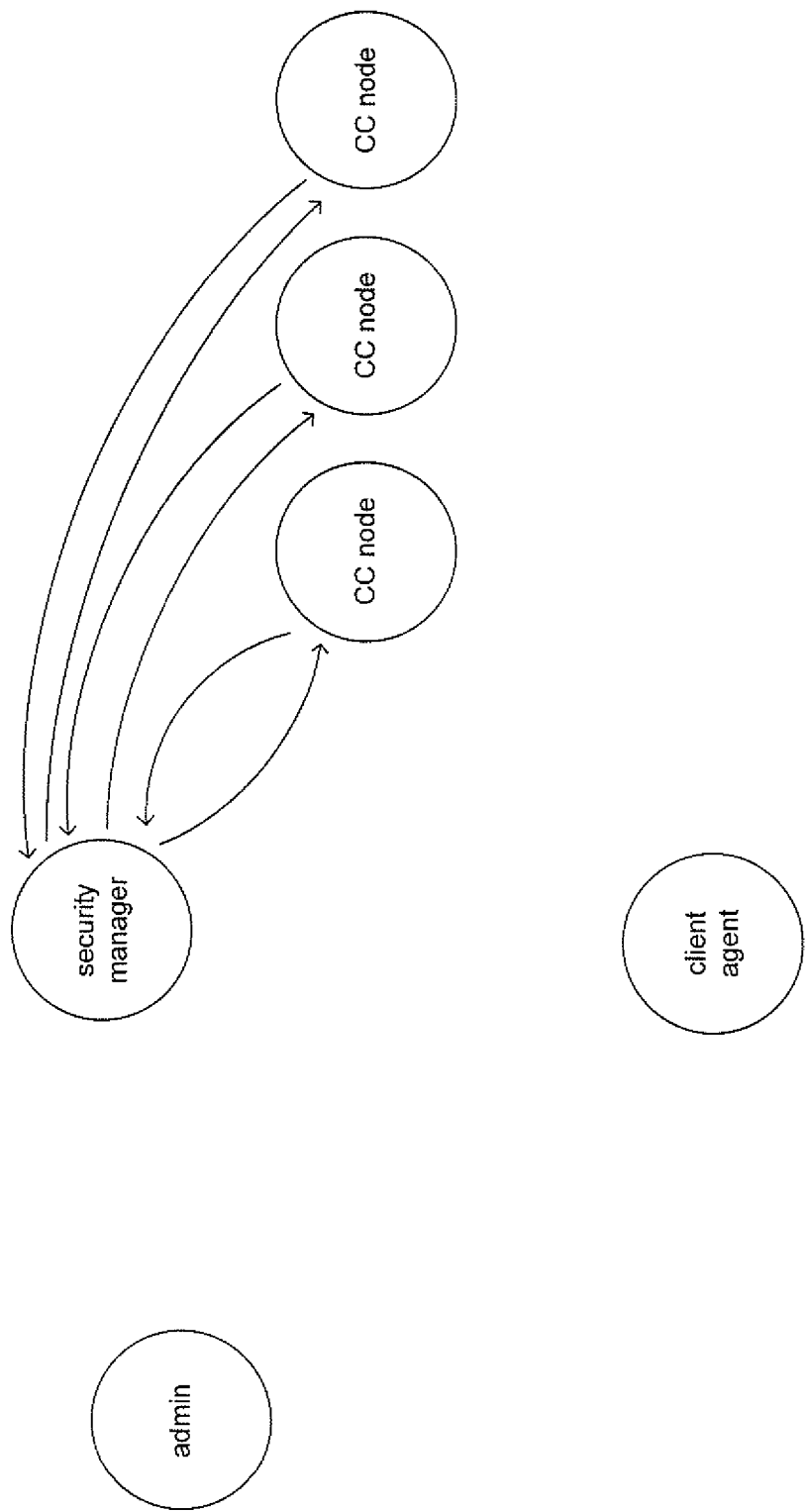
Figure 22C:
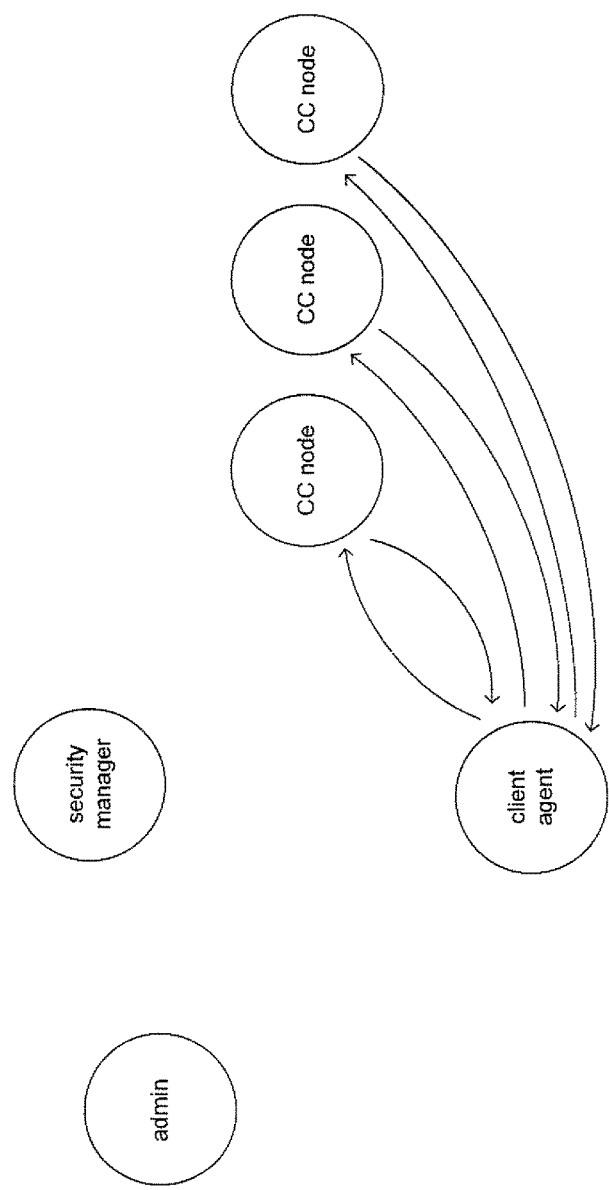
Figure 22D:
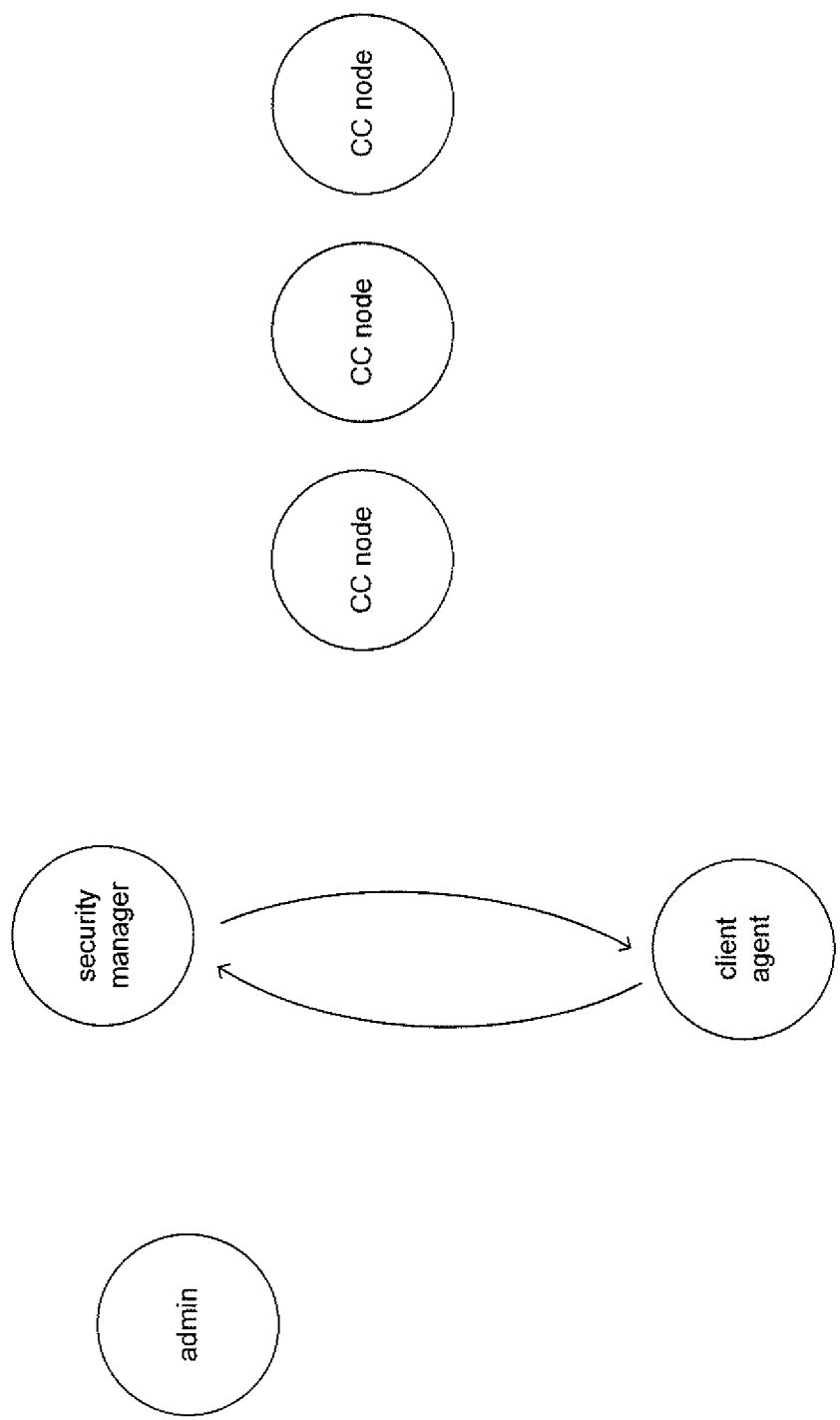

As shown in FIG. 22B, the SM communicates with the CC nodes for a variety of reasons. As discussed above, the SM initially distributes secret shares to CC nodes. In addition, the SM may download CC-node application modules to CC nodes, manage association of policies within CC nodes, configure and reconfigure CC nodes, control generation of audits and logging activities of CC nodes, and carry out many additional such activities and operations with respect to CC nodes. CC nodes may request particular services from the SM, including services related to DSS-client authorization, error reporting, error and anomalies management, and other services. As shown in FIG. 22C, DSS-client agents interact with CC-nodes to request secret shares and other stored-secret-related services. As one example, in certain implementations, a DSS-client agent may forward a public-key digital certificate from a client to the CC nodes that store secret shares for a client private encryption key in order to access a digital-certificate signing service provided by the DSS system. Finally, as shown in FIG. 22D, in certain implementations, a DSS-client agent may directly contact the SM for particular services provided by the SM. For example, in certain implementations, a DSS-client agent may request a current set of CC-node addresses corresponding to a particular stored-secret identifier. In addition, the SM may download DSS-client-agent executables to client computers.

Figure 23A:
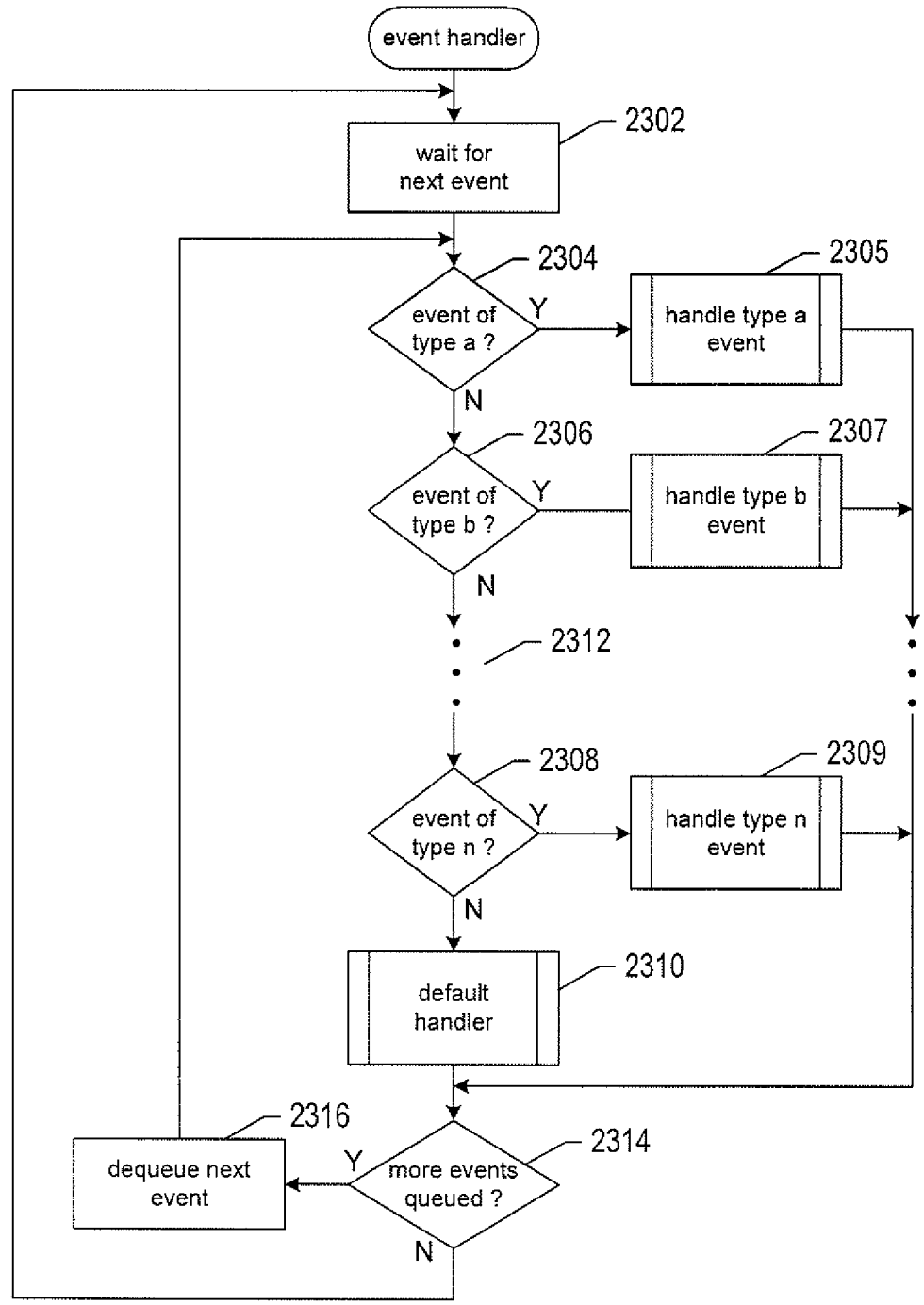
FIGS. 23A-B provide control-flow diagrams that illustrate several features common to multiple DSS-system entity types and components.
Figure 23B:
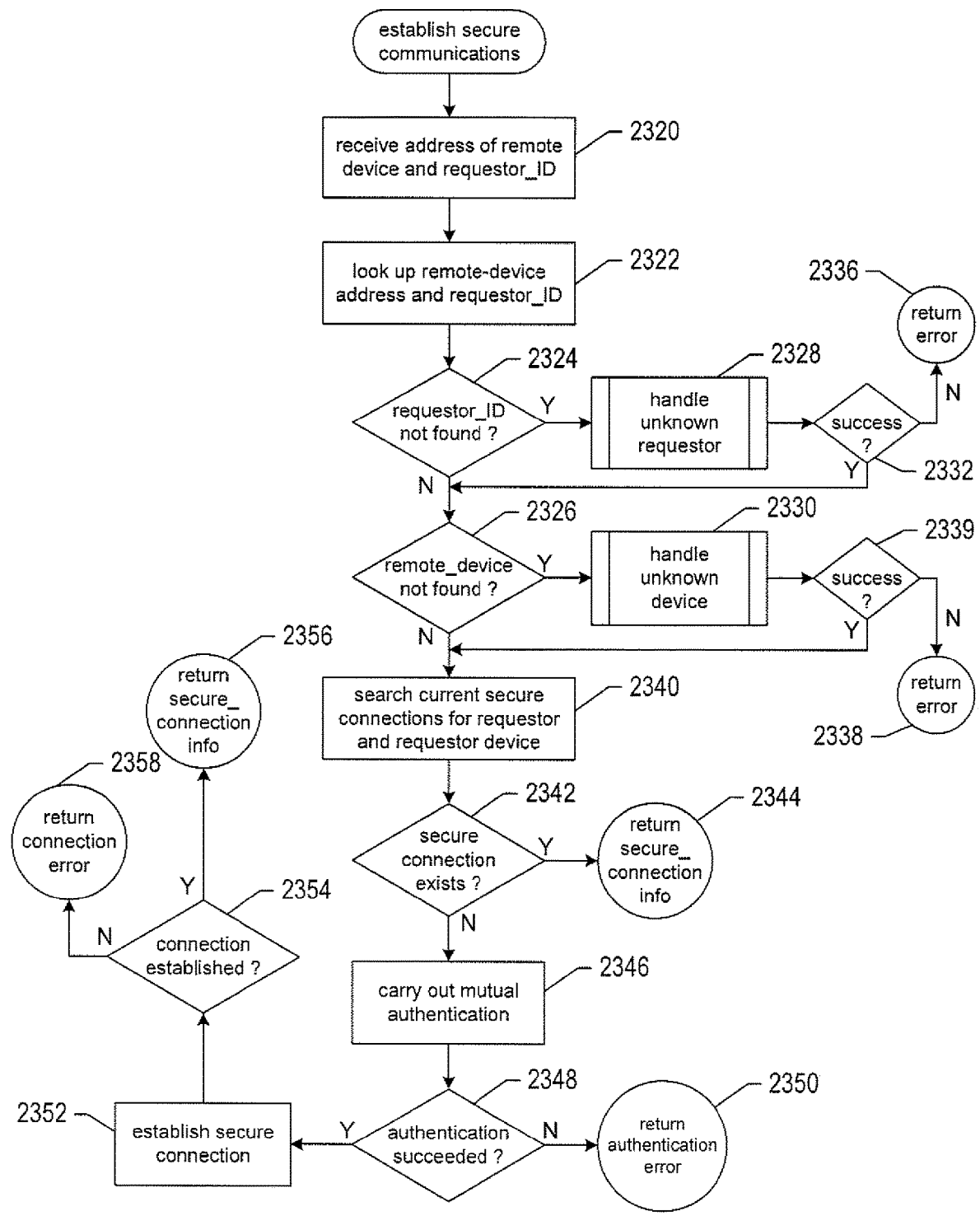

FIGS. 23A-B provide control-flow diagrams that illustrate several features common to multiple DSS-system entity types and components. FIG. 23A provides a control-flow diagram for a generalized event handler that underlies SM, CC-node, and DSS-client-agent implementations. The event handler waits for a next event to occur, in step 2302. When a next event occurs, a particular type of handler for that event is invoked in a series of conditional-step/handler-call-step pairs 2304-2305, 2306-2307, and 2308-2309. Typically, a default handler 2310 handles unexpected or rare events. Ellipses 2312 indicates that many additional types of events may be handled by a particular event handler. When there are more events that have occurred and that have been queued during handling of a recently occurred event, as detected in step 2314, a next event is dequeued, in step 2316, and control returns to step 2304. Otherwise, control returns to step 2302, where the event handler waits for a next event to occur. Events may include reception of service requests through a web-service interface, incoming messages from secure communications channels, timer expirations, error conditions, asynchronous calls and call completions, and many other types of events.

FIG. 23B provides a control-flow diagram for secure-communications-establishment logic. As discussed above, the various DSS-system entities generally establish secure-communications channels for secure transmission and reception of data among one another. In step 2320, the routine "establish secure communications" receives the address of a remote device and an identifier that identifies a remote entity, such as a service requester. In step 2322, the DSS entity looks up the remote-device address and requester identifier to determine whether the DSS entity is authorized to establish secure communications with the entity. When either the requester identifier is not found, as determined in step 2324, or the remote-device address is not found, as determined in step 2326, a handler is called, in steps 2328 or 2332, to handle the failures. This may involve carrying out additional checks and communications with the SM, initiating a dialogue with the remote entity, or making a determination to reject the request. When the handler returns a success indication, as determined in steps 2332 and 2334, the routine "establish secure communications" resumes. Otherwise, in steps 2336 and 2338, the request is rejected. In step 2340, the routine "establish secure communications" searches the currently established secure communications channels to determine whether a secure communications channel is already in place for communicating with the remote entity. If so, as determined in step 2342, information related to the existing secure-connection is returned in step 2344. Otherwise, a mutual authentication protocol is initiated, in step 2346. When mutual authentication fails, as determined in step 2348, an error is returned in step 2350. Otherwise, a secure communications connection is established within the remote entity, in step 2352, and, when establishment of the secure communications channel succeeds, as determined in step 2354, information related to the secure-connection is returned in step 2356. When no secure connection is established, a connection error is returned in step 2358.

Figure 24:
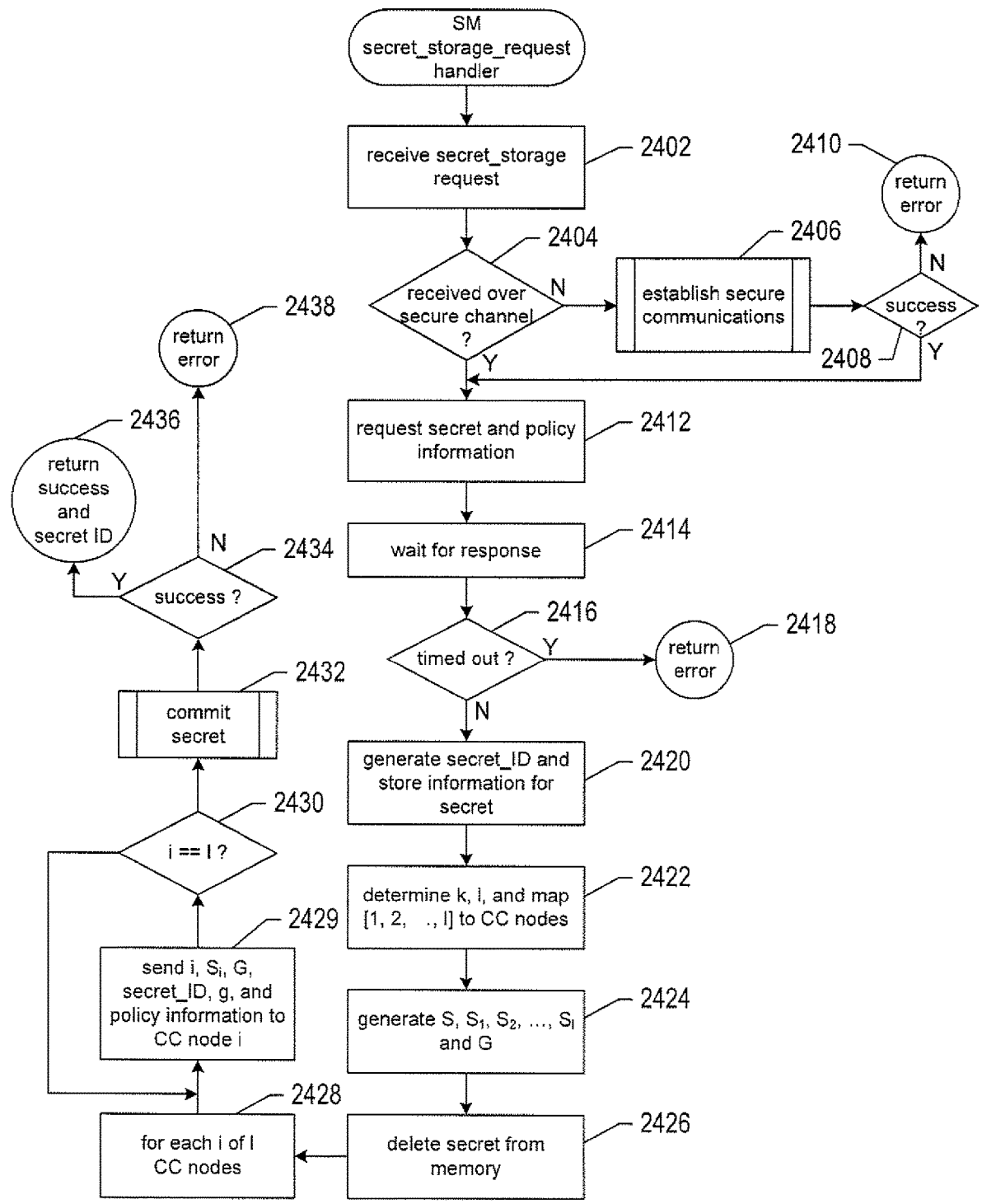
FIG. 24 provides a control-flow diagram for an SM handler.

FIG. 24 provides a control-flow diagram for an SM handler. This handler handles secret-storage requests received through the web-service interface by the SM or through an existing secure channel. In step 2402, the handler receives a secret-storage request. When the request has not been received over a secure channel, as determined in step 2404, a call is made to establish secure communications in step 2406. When establishment of a secure communications channel fails, as determined in step 2408, an error is returned in step 2410. Otherwise, in step 2412, the SM requests the secret and policy information for the secret through the secure communications channel. In step 2414, the SM waits for a response. When the wait times out without response reception, as determined in step 2416, an error is returned in step 2418. Otherwise, an identifier for the secret is generated and additional information related to the secret is stored, in step 2420. In step 2422, the values k and 1, discussed above, are selected for the secret and a map of secret shares to CC nodes is determined. In step 2424, the SM generates the secret shares for the secret and then, in step 2426, deletes the secret from memory. In the for-loop of steps 2428-2430, the SM sends the secret-share index, the secret share, the verification set, a corresponding secret identifier, and a generator to each CC node that will store a secret share for the secret. Then, in step 2432, a commit-secret routine is called to coordinate committing the secret within the DSS system, which may involve determining that the CC nodes receive their shares and coordinating commitment of those shares and additional secret-related information by all of the CC nodes and the SM. When the secret shares are committed successfully, as determined in step 2434, the handler returns a success indication and the identifier for the secret in step 2436. Otherwise, an error is returned in step 2438.

Figure 25A:
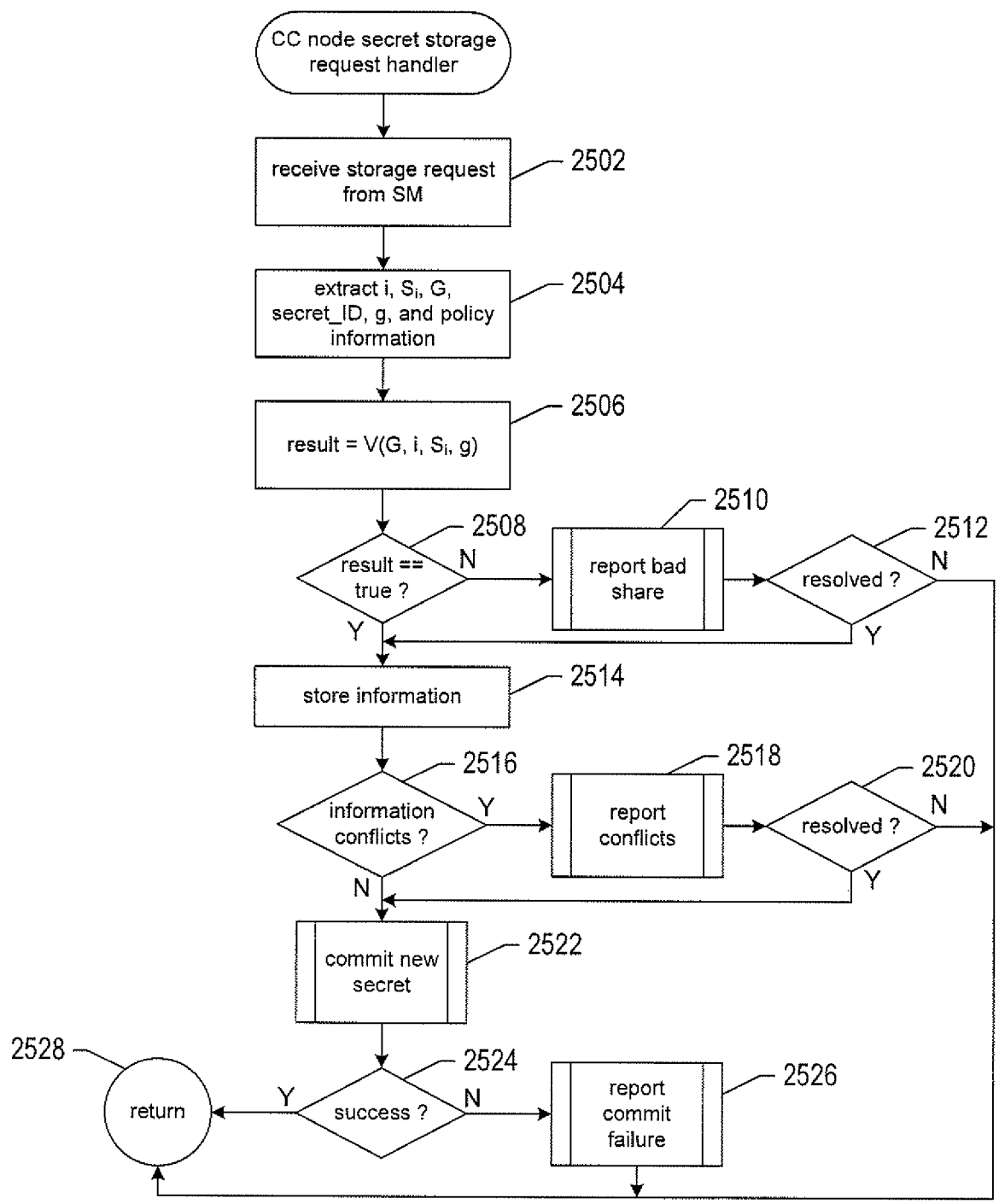
FIGS. 25A-E provide control-flow diagrams for a number of CC-node event handlers.

FIGS. 25A-E provide control-flow diagrams for a number of CC-node event handlers. FIG. 25A shows a control-flow diagram for a CC-node secret-storage-request handler. In step 2502, the handler receives a storage request from the SM. In step 2504, the handler extracts the share index i, the share $S_i$, the verification set G, a secret identifier, and a generator g from the received secret-storage request, along with additional information, such as policy information. In step 2506, the handler applies the verification function 1, discussed above with reference to equation (36), to the extracted secret information to verify the secret share $S_i$. When the verification fails, as determined in step 2508, a bad-share-report call is made, in step 2510, to report the bad share to the other CC nodes and, in certain implementations, to the SM. In certain implementations, a collective attempt to resolve reception of the bad share is made among the CC nodes. When reception of the bad share is resolved, as determined in step 2512, the handler continues executing at step 2514. Otherwise, the handler returns. In step 2514, the received share information is stored by the CC node. When an attempt to store the information reveals conflicts with information already maintained by the CC node, as determined in step 2516, such as, for example, determination that secret information for a secret with the same secret identifier already resides within the CC node, a call to a report-conflicts routine is made in step 2518. Conflicts may be reported, in certain implementations, to the SM node as well as to additional CC nodes and various steps may be taken to ameliorate the conflict. If the conflict is resolved, as determined in step 2520, then a commit-new-secret routine is called, in step 2522, to coordinate with other CC nodes to commit the new secret shares within the DSS system. When the commit fails, as determined in step 2524, a report-commit-failure routine is called in step 2526 to report the commit failure to other CC nodes as well as to the SM and to remove information related to the received secret share from the CC node. Otherwise, the handler returns in step 2528.

Figure 25B:
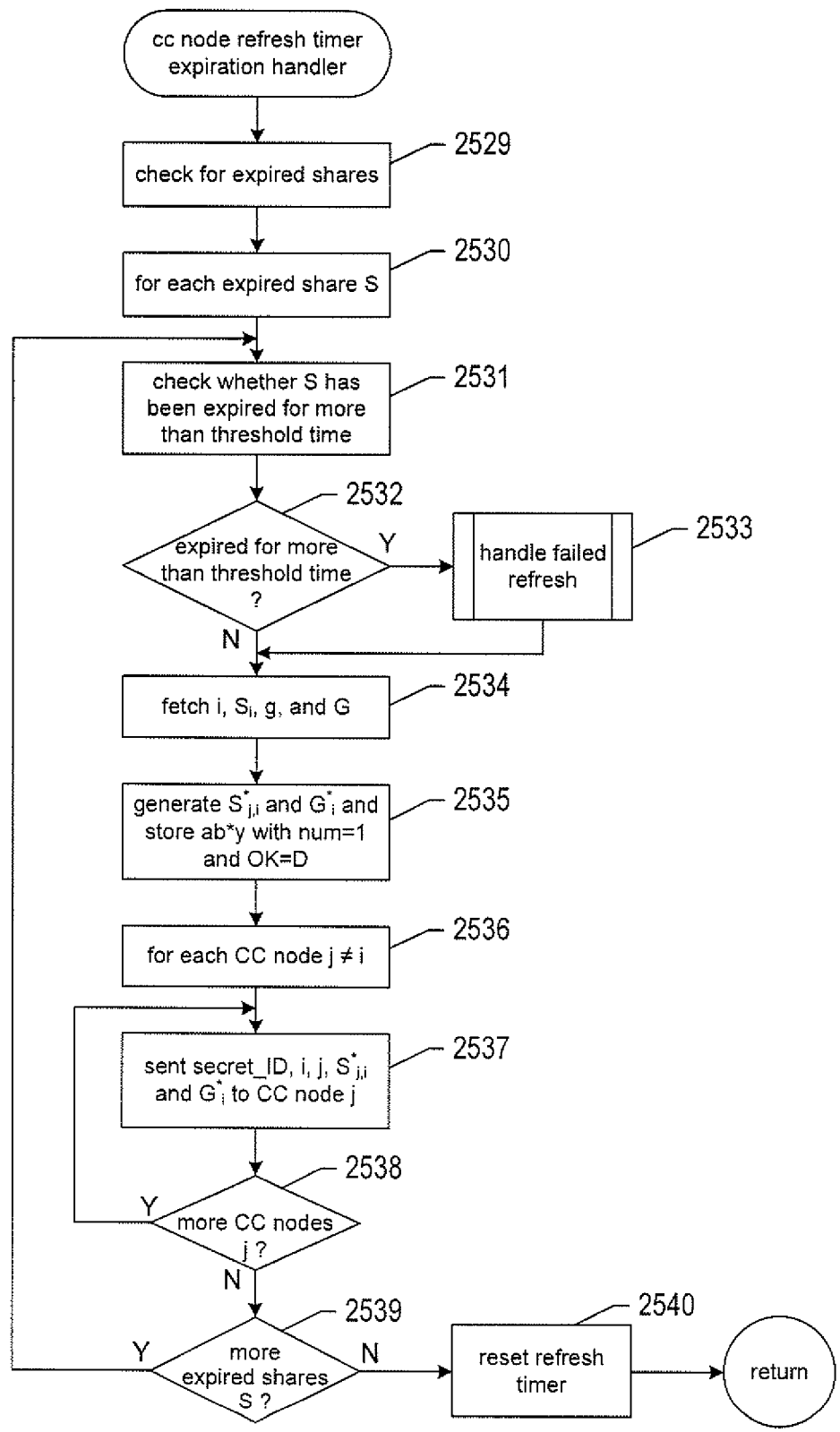

FIG. 25B shows a control-flow diagram for a CC-node refresh-timer-expiration handler. This handler is called with a refresh timer expires, signaling initiation of a next round of share-refresh operations. In step 2529, the handler checks stored information to determine whether or not there are expired shares for which a refresh operation needs to be undertaken. The outer for-loop of steps 2530-2539 iterates over each of the expired shares S. In step 2531, the handler checks whether the expired share as has been expired for more than a threshold amount of time. If so, as determined in step 2532, a handle-failed-refresh routine is called, in step 2533, to ameliorate a failed refresh operation for the expired share. In certain cases, the DSS system may elect to continue to use the existing shares within the CC nodes until a next set of refresh operations is undertaken. In other cases, the refresh operation may be retried after coordination among the CC-nodes involved in the failed refresh operation to clean up any remaining information regarding the failed refresh operation. In step 2534, the share index, current share, generator, and verification set are retrieved from storage and used, in step 2535, to generate a new polynomial over the integers $S_{1,r}^*$ and to construct a new verification set $G_r^*$, as discussed above with reference to equations (47-50). These data items are stored, a variable num is initialized to 1, and a variable OK is initialized to 0, with the data and variables associated with an identifier for the secret. Then, in the inner for-loop of steps 2536-2538, the handler computes a new share from the new polynomial and sends the new share, along with the verification set and other information related to the new share, to each of the other CC nodes that store shares for the expired secret S. Following termination of the outer for-loop, the refresh timer is reset, in step 2540.

Figure 25C:
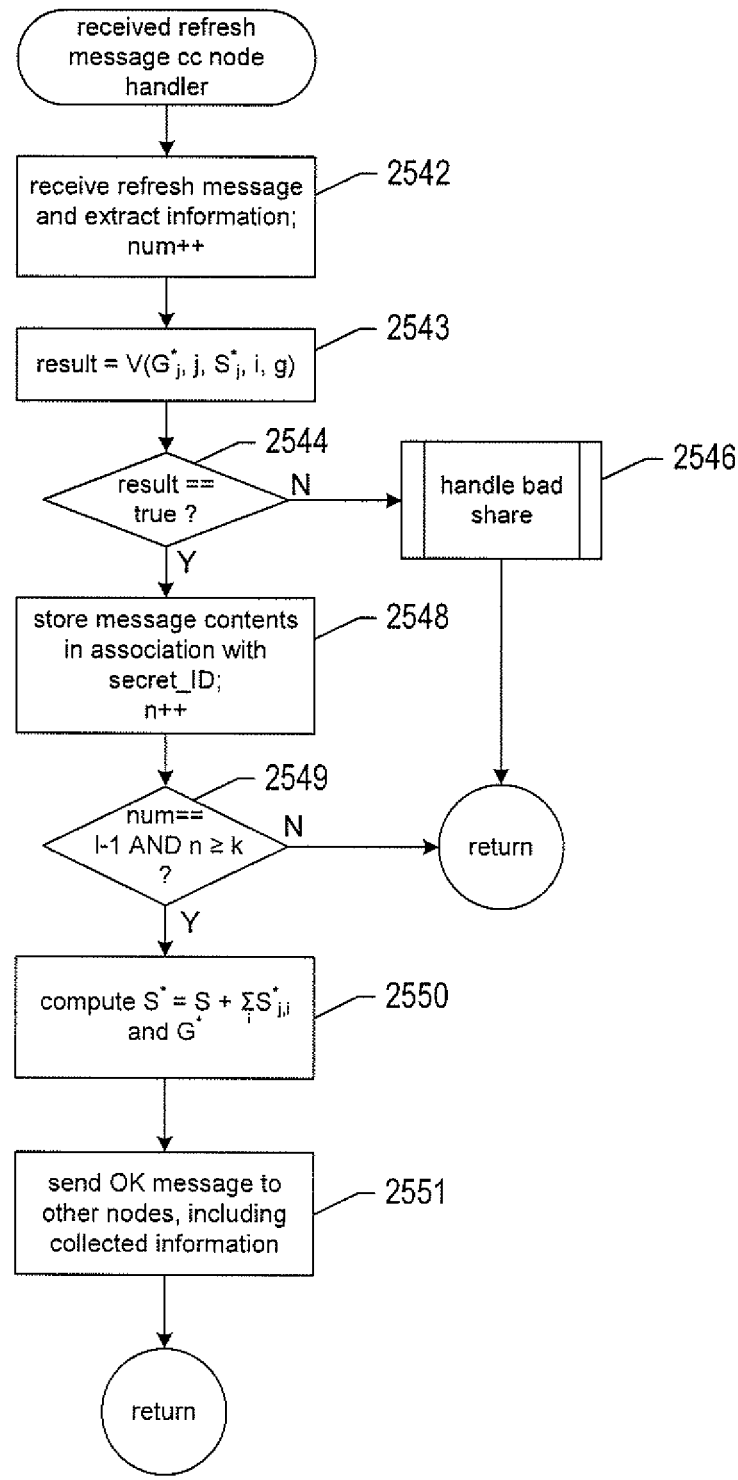

FIG. 25C shows a control-flow diagram for a CC-node refresh-message-reception handler. In step 2542, the handler receives a refresh message from another CC node and increments the variable num. In step 2543, the handler applies the verification function V to the information related to the secret share received in the refresh message. When the received secret share fails to verify, as determined in step 2544, a call is made to a handle-bad-share routine 2546, after which the handler returns. The handle-bad-share routine reports reception of the bad share to the other CC nodes and, in certain implementations, may invoke a collaborative effort within the DSS system to remedy the situation. In many cases, this may involve isolating or terminating the CC node which sent the bad share and updating the DSS system to use the surviving CC nodes, when more than k CC nodes continue to operate correctly, for continued storage of the secret share. Alternatively, a new CC node may be configured to replace the terminated CC node. Otherwise, the contents of the received refresh message are stored in association with the identifier of the secret for which the new share has been sent and the variable n, which indicates the number of verified received shares, is incremented in step 2548. When refresh messages have been received from the other 1-1 CC nodes storing shares for the secret associated with the secret identifier, where the variable num contains an indication of the number of relevant refresh messages received, and the number of verified shares is greater than or equal to k, as determined in step 2549, a new secret share for the secret and a new verification set are computed, in step 2550, as discussed above with reference to equations (52-57). Finally, in step 2551, an OK message is sent to the other CC nodes storing shares for the secret. The OK message generally includes various information collected during the refresh operation, such as indications of any bad shares that were received.

Figure 25D:
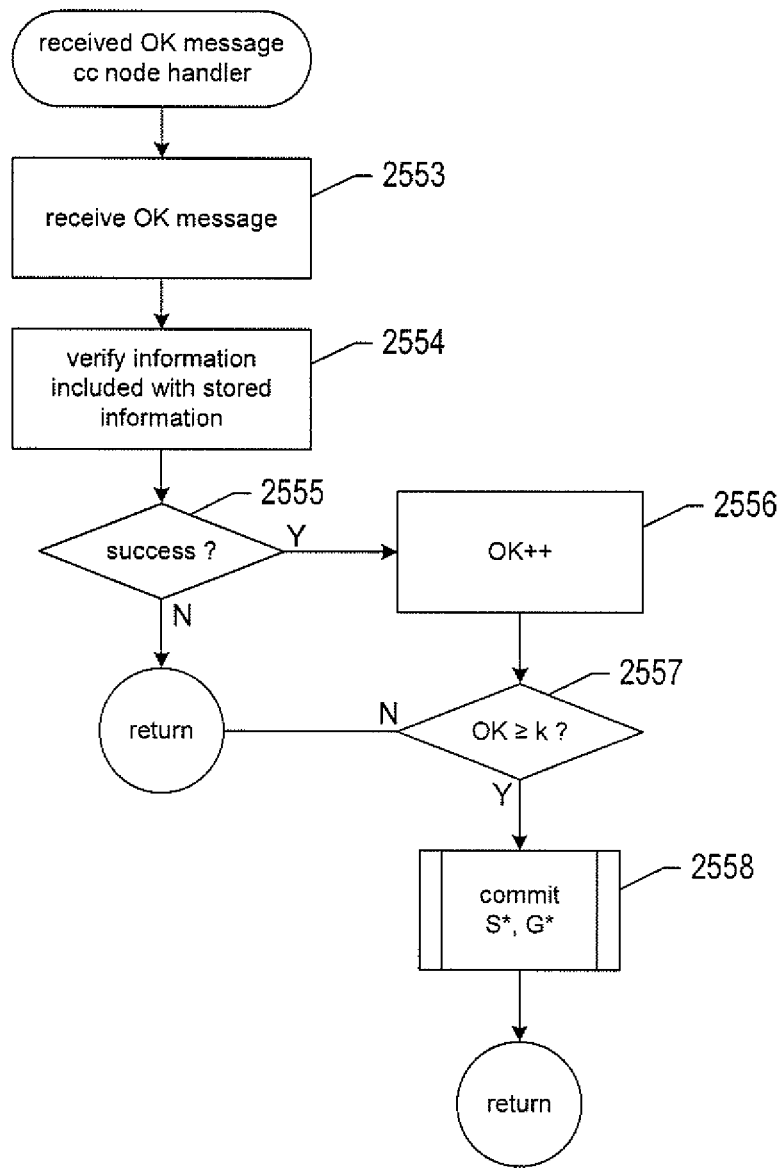

FIG. 25D shows a control-flow diagram for a CC-node received-OK-message handler. In step 2553, the handler receives an OK message from another CC note. In step 2554, the contents of this message are verified with respect to other information stored about the refresh operation for the secret share for which the refresh operation was initially undertaken. When the verification succeeds, as determined in step 2555, a variable OK associated with the secret is incremented, in step 2556. When the value in the variable OK is greater than or equal to k, as determined in step 2557, a commit routine is called, in step 2558, to commit the new refreshed secret share and verification set across all of the CC nodes that store shares for the secret.

Figure 25E:
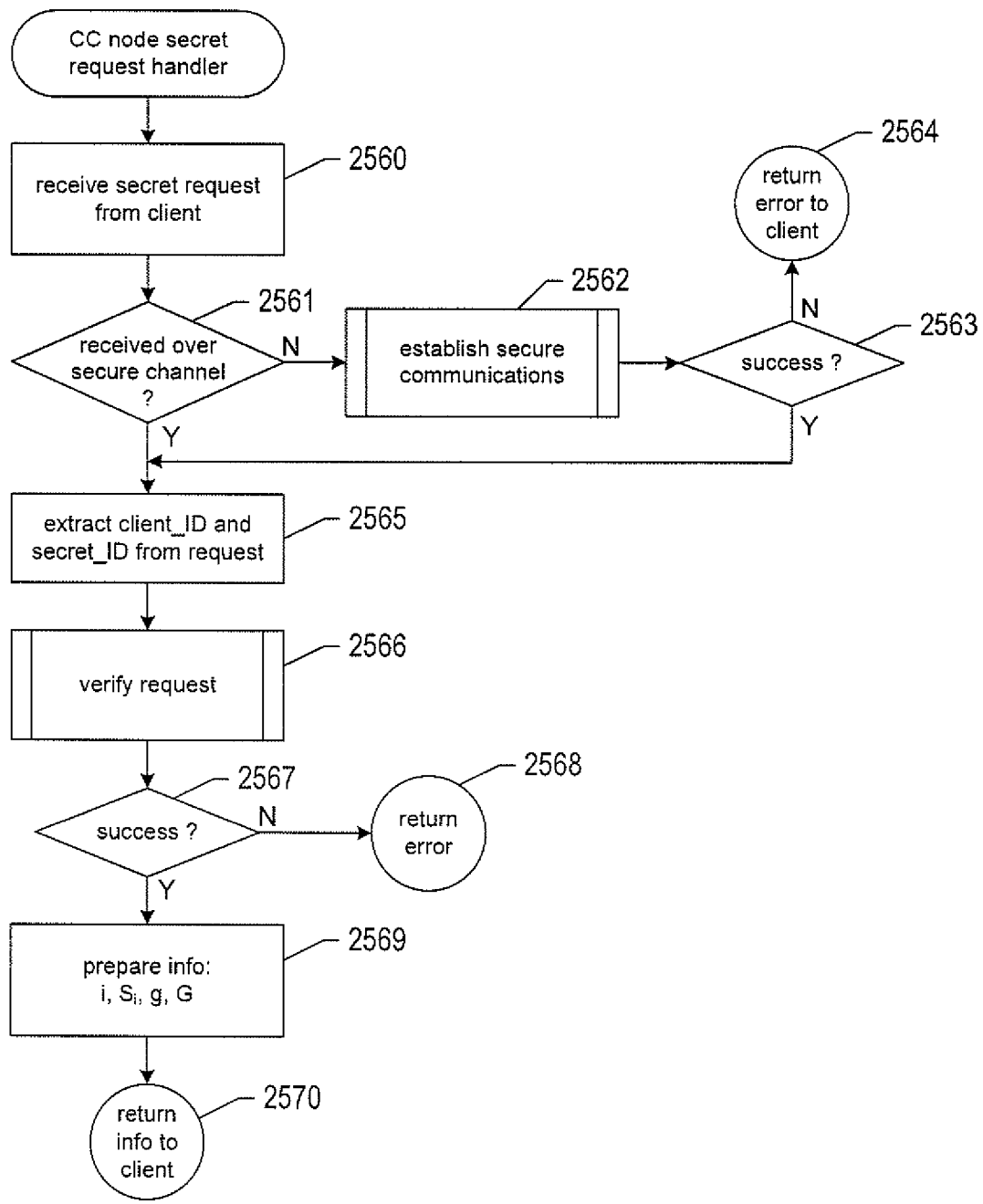

FIG. 25E shows a control-flow diagram for a CC-node secret-request handler. In step 2560, the handler receives a secret request from a DSS-client agent. When the secret request has not been received through a secure channel, as determined in step 2561, an establish-secure-communications routine is called, in step 2562, to establish a secure channel with the DSS-client agent. When a secure channel has failed to be established, as determined in step 2563, an error is returned in step 2564. Otherwise, in step 2565, the handler extracts a client ID and secret ID from the secret request message. In step 2566, a verify-request routine is called to verify the existence of the client and secret as well as to determine whether or not the client is authorized to access the secret at the current time. When verification fails, as determined in step 2567, an error is returned in step 2568. Otherwise, the CC node retrieves a secret share and additional information for the requested secret, in step 2569, and returns information to the client step 2570.

Figure 26A:
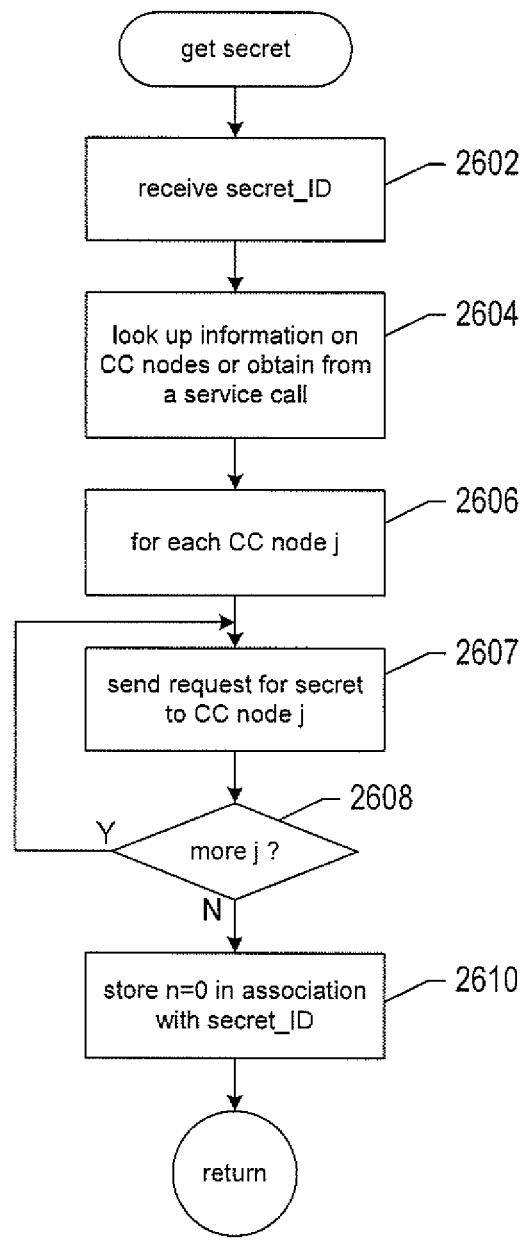
FIG. 26A provides a control-flow diagram for a DSS-client-agent get-secret routine.

FIG. 26A provides a control-flow diagram for a DSS-client-agent get-secret routine. This routine requests secret shares from the CC nodes in order to reconstruct a secret within the DSS-client agent. Secret reconstruction may be carried out by the DSS-client agent in the course of providing any of various different requested services to client applications, such as digital-certificate signing or secure-connection establishment. In step 2602, the routine "get secret" receives a secret identifier or other information that allows the DSS-client agent to determine the secret identifier for the desired secret. In step 2604, the routine "get secret" looks up additional information, or obtains additional information via a service call to other DSS-system entities, needed to request the secret shares, including indications of the CC nodes that store secret shares for the desired secret and their network addresses. Then, in the for-loop of steps 2606-2608, the routine "get secret" sends out secret-share request messages to each of the CC nodes that store shares for the secret. In step 2610, the routine "get secret" initializes a variable n, stored in association with the secret identifier, to store the value 0.

Figure 26B:
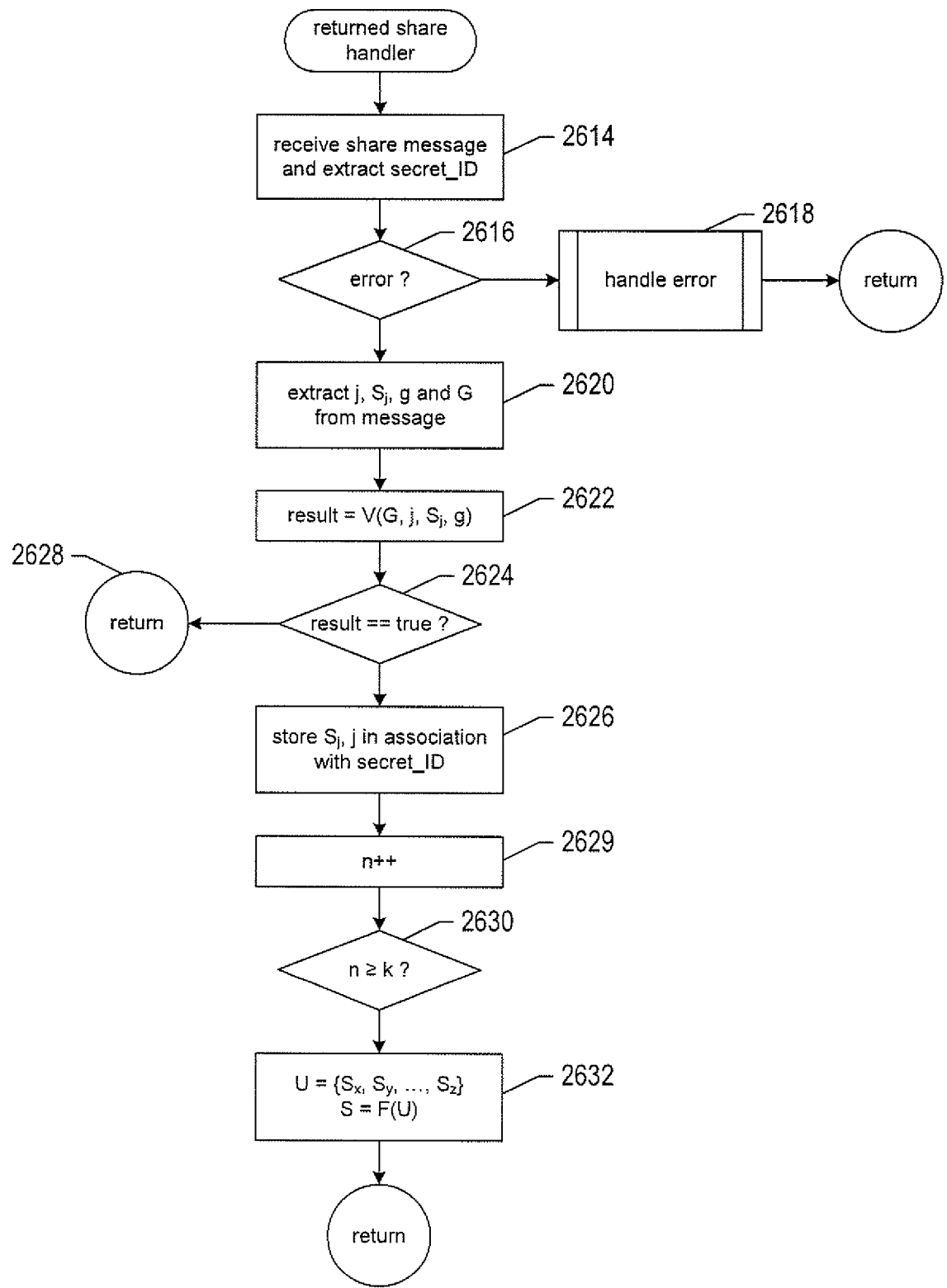
FIG. 26B shows a control-flow diagram for a DSS-client-agent return-share handler.

FIG. 26B shows a control-flow diagram for a DSS-client-agent return-share handler. This routine receives responses to get-secret requests. In step 2614, the handler receives a share message returned by a CC node and extracts the secret identifier from this message. When the message indicates an error, as determined in step 2616, a handle-error routine is called, in step 2618, to handle the error condition. In certain cases, for example when at least k CC nodes have responded or eventually respond to the DSS-client agent's get-secret request, the error may be handled by simply reporting the error condition. In other cases, various steps may be undertaken to retry the get-secret request to ameliorate the conditions within the DSS system that led to the error. Otherwise, the handler extracts the secret-share index, secret share, generator, and verification set from the message, in step 2620. In step 2622, the handler verifies the secret share using the verification function V, discussed above with reference to equation (36). When verification succeeds, as determined in step 2624, the secret share is stored in association with the secret ID, in step 2626. In step 2627, the variable n is incremented. Otherwise, when verification fails, the handler returns, in step 2628. When the value stored in the variable n is greater than or equal to k, as determined in step 2630, the secret is reconstructed by applying the interpolation function F( ), discussed above with reference to equations (15-16).

Figure 27:
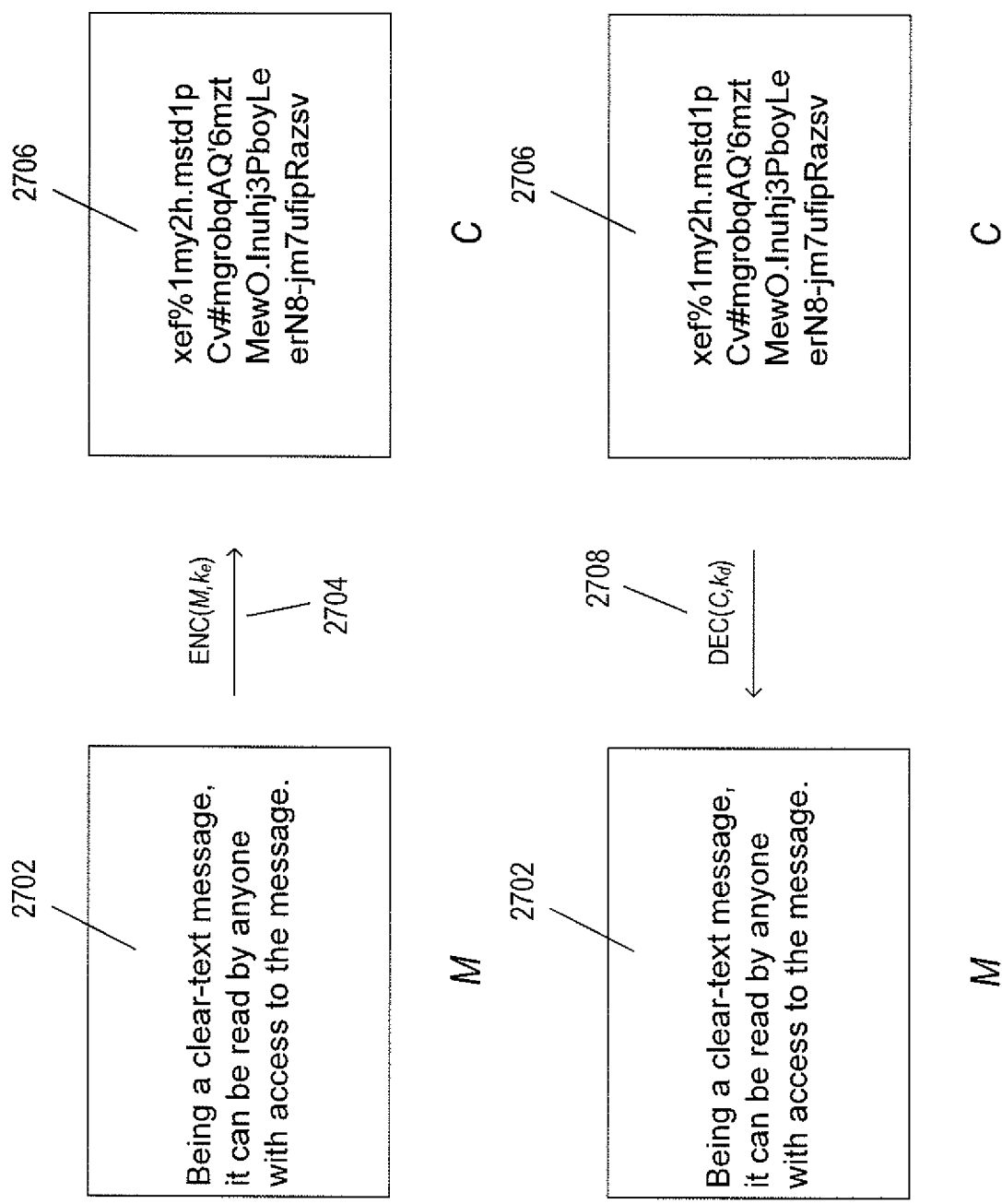
FIG. 27 illustrates encryption and decryption processes.

Application of the Currently Disclosed DSS System to Client Encryption-Key Management Encryption, Decryption and Digital Certificate Encryption methods transform a digitally encoded sequence of symbols, including text and numerical data, into a corresponding encrypted symbol sequence that cannot be straightforwardly read or interpreted, in general, but that contains the same information that is contained in the original symbol sequence that was encrypted to produce the encrypted symbol sequence. A party possessing a decryption key or other decryption-facilitating information can carry out an inverse transformation to regenerate the original symbol sequence. FIG. 27 illustrates encryption and decryption processes. As mentioned above, encryption is used to transform a clear-text message or symbol string into encrypted form that cannot be interpreted by normal symbol-string interpretation algorithms, such as by reading natural-language statements. Decryption is the inverse process by which encrypted symbol strings are transformed back to clear-text form. In FIG. 27, an initial natural-language message M 2702 is transformed, by encryption 2704, to an encrypted message C 2706. In the current discussion, the expression "ENC(M, $k_e$)" stands for encryption of message M using encryption key $k_e$. By comparing clear-text message M with encrypted message C, it is clear that the meaning of encrypted message C cannot be extracted by normal text-processing means. Instead, an encrypted message C needs to be first reverse-transformed back to a clear-text message by the decryption process 2708. The expression "DEC(C, $k_d$)" stands for decryption of encrypted message C using decryption key $k_d$. This can be alternatively expressed as "$ENC^{-1}$ (C, $k_d$)."

FIG. 28 summarizes three different encryption-based techniques referred to in the following discussions. Public-key/private-key encryption is widely used in commercial transactions and information-exchange protocols. One commercially successful public-key/private-key cryptosystem, also referred to as an "asymmetric" cryptosystem because different keys are used by the sender and the receiver, is named the "RSA" cryptosystem. The name RSA comprises the first letters of the last names of the inventors of the method: Ron Rivest, Adi Shamir, and Leonard Adleman. In this asymmetric cryptosystem, pairs of encryption/decryption keys are generated. In general, one member of the encryption-key pair is publicly distributed, and is referred to as the "public key," while the other member of the encryption-key pair is held in secret by the key-pair-owning party and is referred to as the "private key" or "secret key." In normal usage, anyone can access the public key and encrypt a message using the public key, but only the party in possession of the private key can decrypt and read the encrypted message.

For certain types of secure communications, two parties exchange their public encryption keys so that each party can encrypt a message and transmit the encrypted message to the other party for decryption and reading by the other party. However, because of the relatively high computational overhead for asymmetric cryptography, protocols such as the transport layer security ("TLS") protocol, the secure socket layer ("SSL") protocol, and the SSH protocol usually begin a session with a handshake step in which public/private cryptography is used initially to establish a symmetric key that can be subsequently used more computationally efficiently for message encryption and decryption. Both parties use the symmetric key for the remainder of the session. The symmetric key is referred to as a "session key."

To generate an encryption/decryption key pair for the RSA cryptosystem, two different prime numbers p and q are first selected, and the product n=pq is computed and saved. Next, the Euler totient function V(n) is computed, as discussed above, which has the value (p−1)(q−1) since p and q are both prime. Then, an integer e in the range (1, φ(n)) is selected such that the greatest common divisor of e and φ(n) is 1. A corresponding integer d is computed such that (d·e) mod φ(n)=1. The public encryption key $k_e$ is the pair of integers (e,n) and the private, or secret, decryption key $k_d$ can be the four-tuple (d, n, p, q), the three-tuple (d, p, q), or the pair (d,n). To encrypt a message M, M is first transformed to an integer i in the range (0,n), the integer m is then subjected to the Optimal Asymmetric Encryption Padding (OAEP) randomized padding scheme, and the result is then raised to the power e modulo n or, as shown in FIG. 28:

$$C=(OAEP(m))^e \bmod n.$$

To decrypt the encrypted message C, the integer m is recovered by applying the inverse of the randomized padding scheme to the result of decrypting the message C by raising C to the power d modulo n, as shown in FIG. 28:

$$m=OAEP^{-1}(C^d \bmod n)$$

Finally, the integer m is transformed back into message M by the inverse of the forward transformation of M to m, performed as the first step of the encryption method. In certain cases, the initial transformation and final inverse transformations are omitted. As discussed above, because the number m is generally large, the above described operations need to be carried out byte sequences programmatically, rather than by using single hardware arithmetic operations. In addition, encryption generally carried out on sequential blocks of data into which the message is partitioned.

The RSA encryption/decryption method can also be used to digitally sign a message to provide authentication of the integrity of a transmitted message. Digital signing relies on the fact that, for a given initial value less than n, encryption is the inverse operation of the decryption operation, and vice versa. Digital signing proceeds as follows. First, a one-way cryptographic hash function is applied to the message M to produce a hash value mHash, referred to as a "hash digest" of the message. Then, an optional transform may be applied to mHash to generate a further encoded message EM. Alternatively, the hash digest can be directly used as EM. Next, a signature for the message is generated by raising EM to the power d modulo n, equivalent to applying the RSA decryption method to EM using secret key $k_d$. This signature is appended to message M, along with the public encryption key, $k_e$, to be used to recover EM from the signature. A recipient of the message can verify the message by first generating mHash by applying the same one-way cryptographic hash function to the message M. The recipient next applies the RSA encryption method to the signature to generate a value EM' or, as expressed in FIG. 28:

$$EM'=signature^e(\bmod n)=ENC(signature,k_e).$$

Next, in the case that the optional transform was applied to generate the signature, a corresponding reverse transform is applied to EM to generate mHash'. When mHash' is equal to mHash, the hash value initially generated by applying the one-way cryptographic hash function to message M, the signature is verified. Note that the signer of the message uses the signer's private key, while the message can be verified by anyone with access to the signer's corresponding public key. Verification proves that the text of a received message M is identical to the text in the original message M that was signed by a party possessing the secret key $k_d$. A digitally signed message generally comprises three elements: message contents M, a signature, and a public key used to recover a hash digest from the signature that is compared to a hash digest computed for M in order to verify M by a recipient of the message.

Finally, other types of encryption/decryption methods employ a single key for both encryption and decryption. These methods are referred to as "symmetric key" cryptosystems. In this case:

$$C \leftarrow ENC(M,k)$$

$$M \leftarrow DEC(C,k).$$

Symmetric-key encryption uses a single key k for both encryption and decryption. There are many different cryptosystems for symmetric key encryption. One example is the Advanced Encryption Standard ("AES"). In general, symmetric-key encryption employs a series of deterministic operations for encryption that can be inverted for decryption. For symmetric-key encryption, the encryption key k is held in secret by both communicating parties since, once revealed, a message encrypted using the key k can be readily decrypted when k becomes known and when the particular symmetric-key-encryption method is also known.

Figure 29:
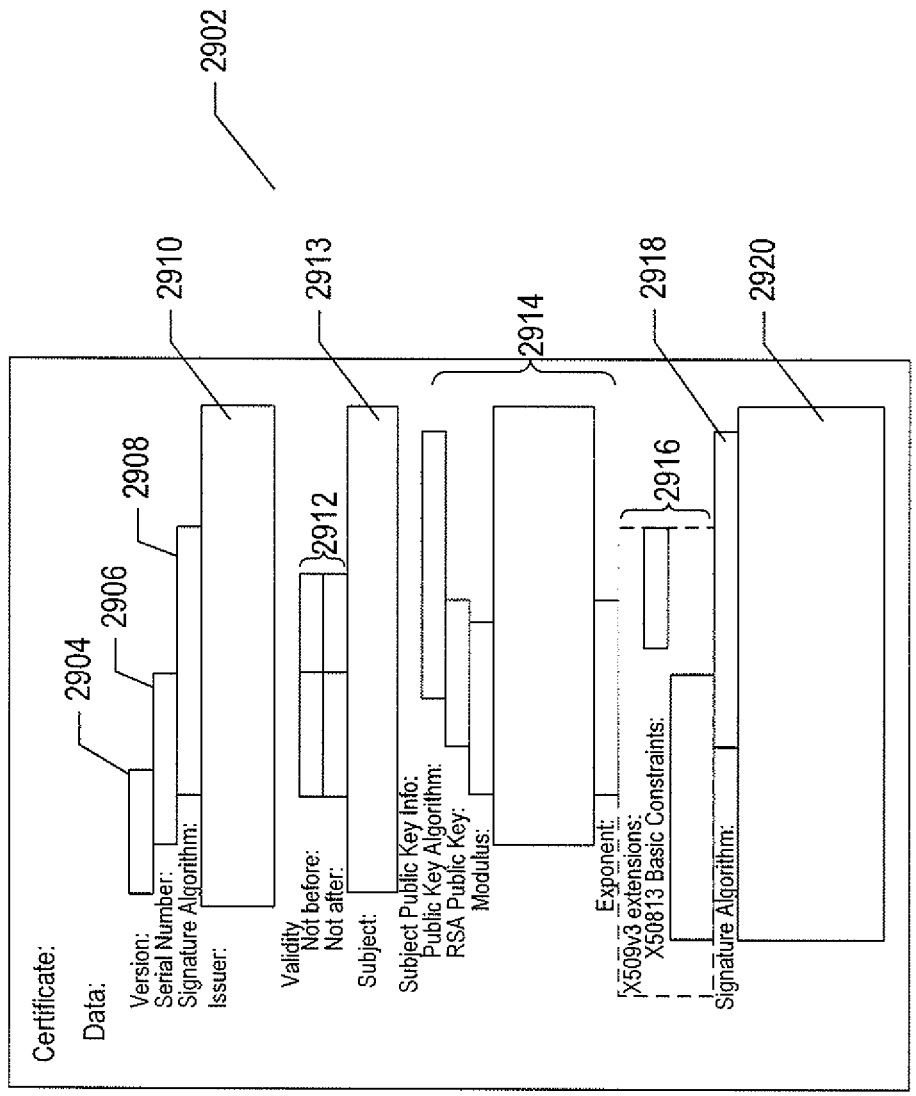
FIG. 29 illustrates the structure of an RSA X.509 public-key certificate.

Public-key certificates, including certificates that follow the X.509 ITU-T standard, are frequently used in secure communications for verifiably binding a public key to a name or identifier, such as a business entity name or a business or personal email address. FIG. 29 illustrates the structure of an X.509 public-key certificate. The X.509 certificate 2902 is essentially a data record that contains a sequence of standard fields that contain information needed to employ the certificate for verifying the binding, or association, of a user identifier or system identifier with a public key. These fields include a certificate version number 2904, a serial number 2906 that is unique with respect to a particular certificate authority that issues public-key certificates, an encoding of an identifier for the cryptographic method used to compute a signature over the certificate 2908, information that identifies the issuer of the certificate 2910, two date and time values 2912 that indicate the beginning date and time at which the certificate becomes valid and the ending date and time at which the validity of the certificate ends, identifying information for the user or system that is bound by the certificate to a public key 2913, a group of fields that indicate the cryptographic algorithm for which the public key is used and that include the public key 2914, optional fields 2916, referred to as extensions, that include additional information, an indication of the signature algorithm 2918, and the signature, computed by the issuing entity over the remaining fields of the certificate 2920. In some cases, the additional information section can contain indications of a security protocol to be used when establishing a secure connection.

In general, public-key certificates are issued by trusted computer systems within entrusted organizations known as "Certificate Authorities" ("CAs"). CAs are well-known certificate-issuing organizations that issue public/private key pairs, including corresponding public-key certificates, as a commercial service. These organizations employ various due-diligence information-gathering techniques to verify the identity of a requesting entity prior to issuing a key pair and public-key certificate. Large organizations, such as universities or big companies, may perform the function of a CA in order to generate public-key certificates for their use, referred to as "self-signing."

A public-key certificate is transmitted, by a first entity possessing the public-key certificate and the corresponding private key, to other entities in order to enable the other entities to securely transmit information to the first entity and to enable the first entity to digitally sign information that can then be verified by use of the public key by the other entities. For email, a sender transmits the sender's public key to other entities by signing emails transmitted to the other entities. The public key component of the digital signature can be saved for further use by those who receive the emails. Public-key distribution by this method generally involves public-key management, including procedures for public-key revocation, expiration, and replacement. Public-key management may be a burdensome overhead, often resulting in complexity that hinders use of encryption for communications.

SSH Protocol

Figure 30:
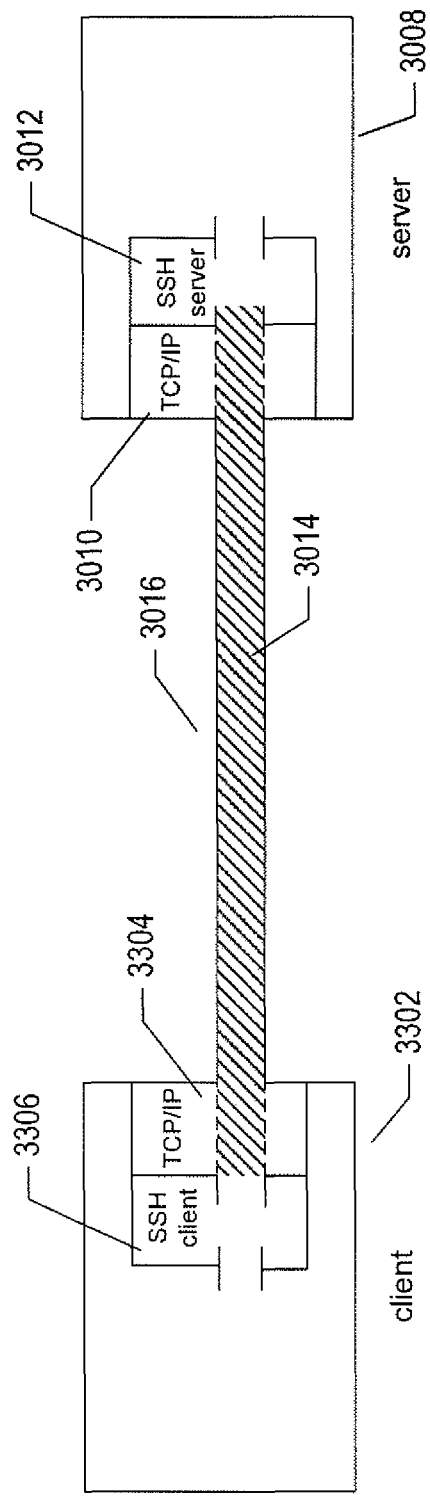
FIG. 30 illustrates SSH-protocol-based communications between a client and a server computer.

The SSH protocol is a protocol for secure network communications. It is used for remote login, file transfer, email, and for many other types of data transfer. FIG. 30 illustrates SSH-protocol-based communications between a client and a server computer. The client computer 3002 includes a TCP/IP protocol stack 3004 to which an SSH-client-protocol layer 3006 interfaces. The server computer 3008 also includes a TCP/IP protocol stack 3010 to which an SSH-server-protocol layer 3012 interfaces. The data contents of SSH packets exchanged between the client and server computers are secured from eavesdropping or interception by entities other than the communicating client and server computers, as represented by crosshatching 3014 within the communications channel 3016, and are secured even within the TCP/IP protocol stacks 3004 and 3010 by encryption and decryption carried out by the client SSH-protocol layer and the server SSH-protocol layer.

Figure 31:
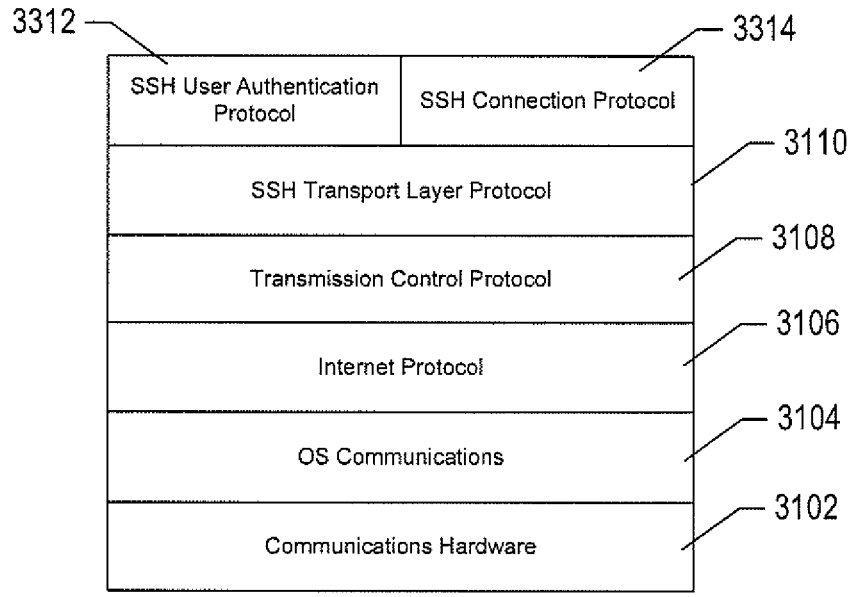
FIG. 31 illustrates a communications protocol stack including an SSH layer.

FIG. 31 illustrates a communications protocol stack including an SSH layer. The lowest-level layer 3102 includes communications hardware and communications-hardware interfaces. Generally, the hardware-layer interface is indirectly accessed through an operating-system interface and operating-system functionality 3104. An IP layer 3106 and a TCP layer 3108 together comprise a TCP/IP layer, which provides for connections between two communicating entities, reliable delivery of packets, packet routing, and other such functionality. The SSH transport layer 3110 provides server authentication, encryption, data integrity, and may additionally provide for data compression. An SSH user-authentication protocol 3112 provides authentication of the client to the server and the SSH connection protocol 3114 multiplexes an encrypted SSH connection, or tunnel, into multiple logical channels.

Figure 32:
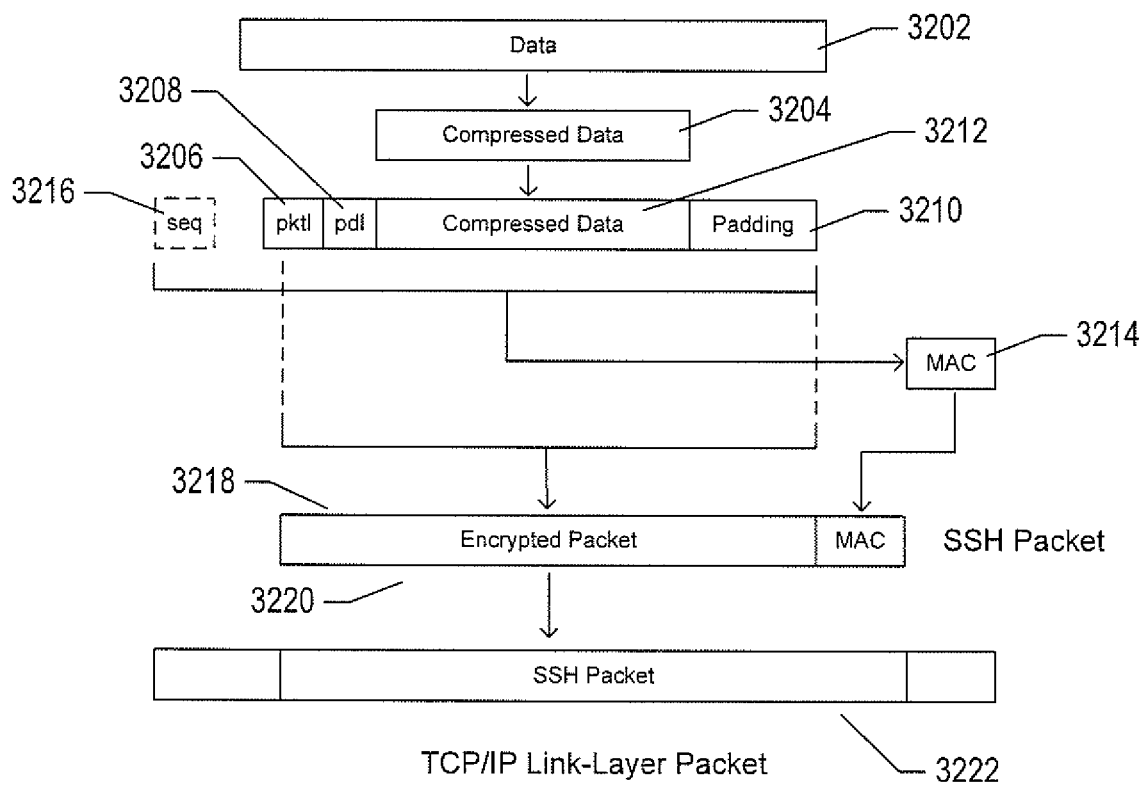
FIG. 32 illustrates construction of an SSH packet.

FIG. 32 illustrates construction of an SSH packet. Each SSH packet includes a sequence of bytes 3202 that encode data to be transmitted between 2 communicating computers. In certain implementations, the data is compressed to generate corresponding compressed data 3204, generally encoded in a fewer number of bytes than the original uncompressed data 3202. A packet-length field 3206 and a padding-length field 3208 are prepended to the compressed data and randomly generated padding bytes 3210 are appended to the data to form a nascent packet 3212. A message-authentication code ("MAC") 3214 is computed from the nascent packet and a sequence number 3216 that is not included in the nascent packet but that is maintained an updated by the SSH transport layer. The nascent packet is then encrypted to generate an encrypted packet 3218 to which the MAC is appended to generate a complete SSH packet 3220. The SSH packet is then embedded within a TCP/IP link-layer packet 3222 to form the communications packet that is sent through the communications medium.

Figure 33:
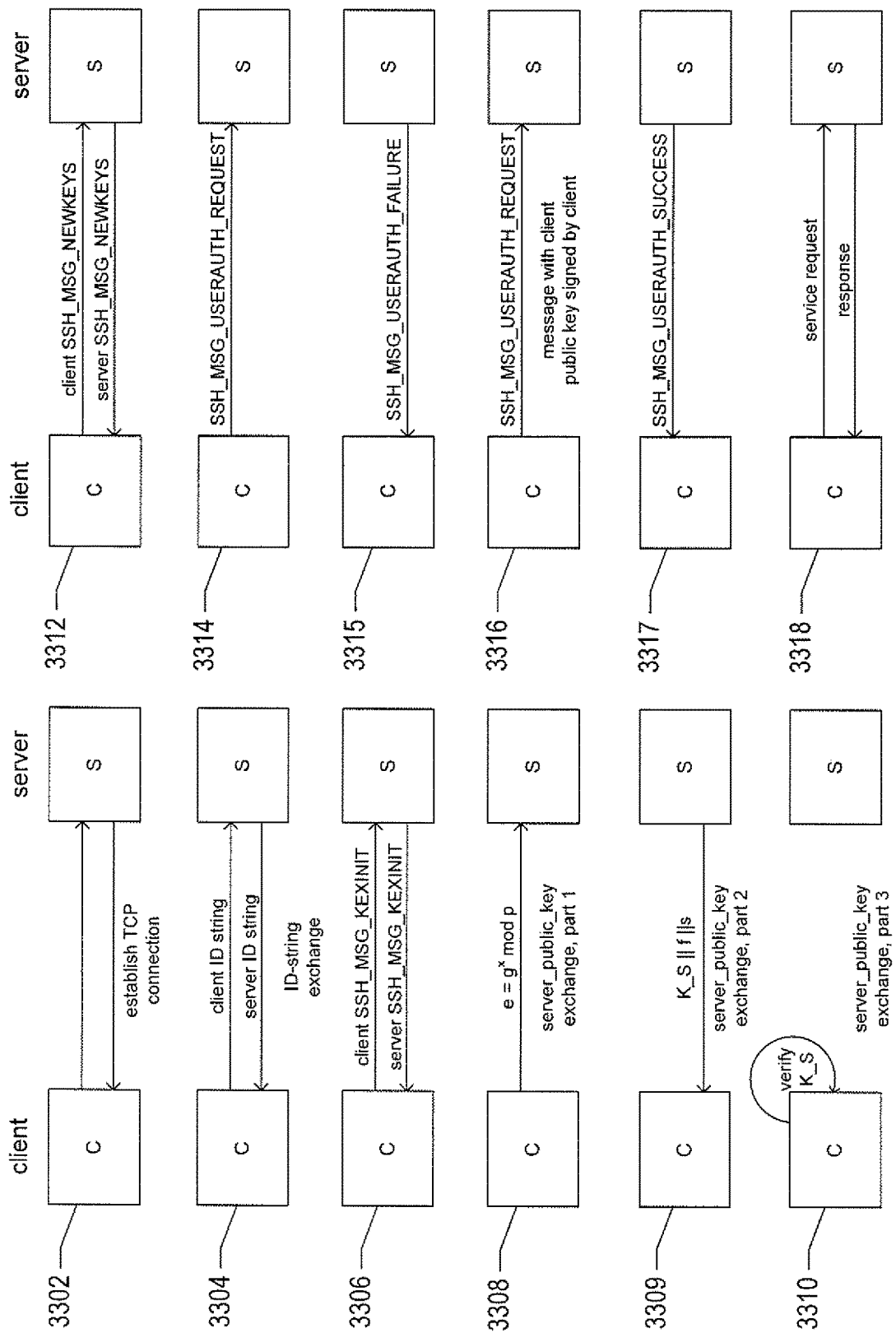
FIG. 33 illustrates establishment of an SSH connection.

FIG. 33 illustrates establishment of an SSH connection. The connection-establishment process is illustrated as a series of steps, each step illustrated by rectangles representing the client and the server and by directed arrows between the client and server representing information transfer. In a first step 3302, the client and server establish a TCP connection via the TCP protocol. In a second step 3304, the client transmits a client-identifier string to the server and the server transmits a server-identifier string to the client. The identifier strings are formatted strings that include version numbers and other information. In a next algorithm-negotiation step 3306, the client and server transmit SSH_MSG_KEXINIT messages to one another. These messages contain lists of supported methods in preference order. The highest-preference methods common to both the client and server are selected, with the methods including a key-exchange method, an encryption method, a MAC method, and a compression method. The next three substeps 3308-3310 together comprise a key-exchange. In substep 3308, the client generates a random number x and uses the random number to generate a value e which the client transmits to the server. The value e is computed as:

$$e = g^x \bmod p,$$

where g is a generator for a subgroup of the Galois field GF(p), p is a prime number, and $1 < x < q$, where q is the order of the subgroup of GF(p). Upon receiving e, the server computes the value f by:

$$e = g^y \bmod p,$$

where y is a random number such that $0 < y < q$. The server additionally computes a value K by:

$$K = e^y \bmod p$$

and a value H which is a hash value of the information exchanged between the client and server in the preceding substeps 3304 and 3306 along with the server's public key and the computed values e, f, and K. The server then signs the computed hash value H with a signature s computed using the server's private key, and sends the server's public key K_S, f, and s to the client, in substep 3309. In substep 3310, the client verifies that the public key returned by the server actually belongs to the server, using a digital certificate obtained from a certification authority or information contained in a database. The client then computes the value K by:

$$K = f^x \bmod p,$$

computes the value H in the same way that the server computed the value H, and verifies the signature s on H generated by the server computer. At the completion of the key-exchange step comprising substeps 3308-3310, the client and server share a master key K from which a set of encryption keys are generated for use in encrypting subsequent communications. The generated encryption keys are exchanged between the client and server in step 3312. In the next four substeps 3314-3317, the client is authenticated to the server. In substep 3314, the client sends a user-authentication-request message to the server. In substep 3315, the server responds with a user-authentication-request-failure message in order to request additional information from the user. Different types of information may be returned. In one approach, the client returns, in substep 3316, a signed digital certificate containing the client's public key. The server verifies the digital certificate and, when the signature matches the certificate and the certificate is valid, returns a success message in step 3317. At this point, the client can begin to make service requests to the server, such as an initial service request shown in step 3318.

It is the client-authentication substep 3316, in which the client furnishes a signed digital certificate to the server, that presents numerous problems in large distributed computing facilities. There may be hundreds, thousands, or more client key pairs stored within servers and other processor-controlled devices in a distributed computing system that are used for client authentication during establishment of SSH connections. Quite often, many of the stored client key pairs are out of date. More worrisome, the client key pairs may not be securely stored, as a result of which the distributed computing system may be vulnerable to various types of security breaches and attacks. A potential solution is to centralize client-key-pair storage within the distributed computing system, but centralization is associated with additional problems, including various additional types of security vulnerabilities. It is to this problem to which the above-described DSS system can be applied.

Application of the DSS System to the SSH-Protocol Client Key Pair Problem

Application of the above-described DSS system to the client key-pair problem is a specific instance of the derived-data-share service provided by CC nodes, as discussed above with reference to FIG. 18. Next, a mathematical-notation summary of the signature-share-based message-signing service provided by the DSS system is provided, using the same style of description used above in expressions (1)-(71), above. Because of the similarities in the following mathematical-notation description of the signature-share-based message-signing service and the previously discussed secret-share-based secret storage service provided by the DSS, the following discussion is somewhat abbreviated, relying on the previous discussion for details of various values and value-generating processes.

The SM server receives a key-generation request from a DSS-client agent and generates a public/private key pair for the requesting DSS-client agent, as follows. First, two large prime numbers p and q, the product of which is a number n, are chosen by the SM server:

$p, q \in \mathbb{P}$, $n = pq$.

The lengths of the digital encodings of p and q, in bits, is identical:

length(p)=length(q).

Next, the SM server chooses to additional prime numbers p' and q' with the following properties:

$p', q' \in \mathbb{P}$.

$m = p'q'$, $p = 2p'+1$.

$q = 2q'+1$.

The SM server then chooses a public key (e, n) and a private key (d,n), as follows:

$e \in \mathbb{P} \wedge e > l$, $d \in \mathbb{Z} \wedge de = 1 \bmod m$.

The SM server then encodes the private-key portion d as the first coefficient of a polynomial, as discussed above, and distributes shares of the private-key portion d to a set of CC nodes, as also discussed above:

$S_0 = a_0 = d$, $f(x) = (a_0 + a_1 x^1 + a_2 x^2 + \ldots + a_{k-1} x^{k-1})$, where $a_i \in \{0, 1, \ldots, m-1\}$.

$S_1 = f(i) \bmod m$.

The SM server next chooses a cyclic group $Q_n$, as follows:

$Q_n$ = subgroup of squares in $\mathbb{Z}_n^*$.

The SM server then selects a generator v for the cyclic group and computes a verification key $v_1$ for each CC node i, as follows:

$v \in Q_n$.

$\forall 1 \leq i \leq l, v_1 = v^N \in Q_n$, $VK = v$, $VK_1 = v_1$.

The SM server transmits the verification keys and public-encryption-key portion e to the requesting DSS-client agent. The DSS system maintains the private-encryption-key portion d as a set of secret shares distributed among CC nodes, as discussed above. As also discussed above, a secret share $S_1$ can be regenerated from a set of K secret shares that do not include $S_1$ by the Lagrange-multipliers method:

$$\Delta = l!, \qquad (72)$$

$$\lambda_{i,j}^K = \Delta \cdot \frac{\prod_{j' \in K \setminus \{j\}} i - j'}{\prod_{j' \in K \setminus \{j\}} j - j'},$$

$$\Delta \cdot f(i) = \sum_{j \in K} \lambda_{i,j}^K f(j) \bmod m.$$

The CC nodes use the secret shares that they receive to generate corresponding signature shares upon receiving a request, from a DSS-client agent, to generate a signature share for a particular message M, such as a digital certificate including the client public-encryption-key portion e. Generation of the signature share involves use of a hash value x for the message M:

M=message, x=H(M), where H( ) is a hash function that return a value $\in \mathbb{Z} Z_n^*$.

The final message signature y has the properties:

y=signature for M, $y \in \mathbb{Z}_n^* \wedge y^e = x$.

Each CC node generates a signature share for a message M as follows:

$x_1$=signature share of CC node $i = x^{2\Delta S_1} \bmod n$.

Upon receiving a set of k signature shares from k CC nodes, a DSS-client agent can construct a signature y for the message M, as follows:

$$x_i^2 = x^{4\Delta S_i}, \qquad (73)$$

$$w = \prod_{K_i \in K} x_{K_i}^{2\lambda_{0,K_i}^K}, \qquad (74)$$

$$w^e = x^{e'}, \text{ where } e' = 4\Delta^2, \qquad (75)$$

$$y = w^a x^b, \text{ where } a, b \in \mathbb{Z} \wedge \wedge e'a + eb = 1, \qquad (76)$$

$$e \in \mathbb{P} \wedge e' \bmod 2 = 0 \rightarrow \gcd(e, e^1) = 1, \qquad (77)$$

Euler's extended algorithm finds x,y such that
$ax + by = \gcd(a,b)$, $\qquad (78)$ use Euler's extended algorithm to find a,b such that
$e'a + eb = 1$. $\qquad (79)$ Note that the value $\lambda_{0,K}^K$, used in expression (74), is defined in expression (72), provided above. The verification-key values can be used by a client to verify signature shares by determining that the log of the square of the signature share to the base $(H(M))^{4\Delta}$ is equal to the discrete log of VK, to the base VK, where $(H(M))^{4\Delta}$ is defined below. Of course, during refresh operations, the verification-key values need to be refreshed along with the secret-representing polynomial coefficients $a_1, a_2, \ldots, a_{k-1}$.

Figure 34:
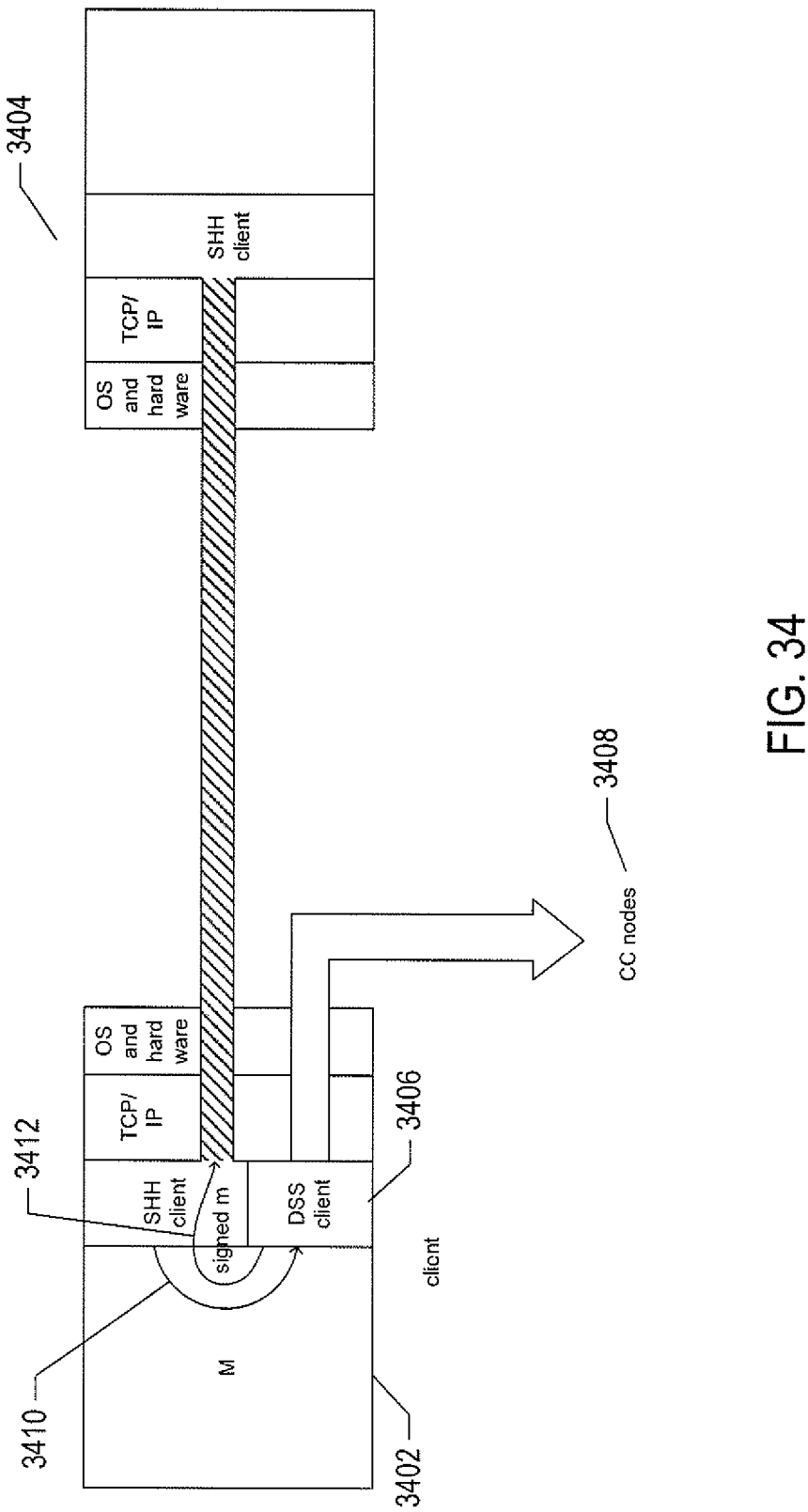
FIG. 34 illustrates application of the DSS system to the problem with client key pairs, identified above.

FIG. 34 illustrates application of the DSS system to the problem with client key pairs, identified above. FIG. 34 illustrates a client computer 3402 establishing a Secure Shell ("SHH") connection to a server computer 3404. FIG. 34 uses illustration conventions similar to those used in FIG. 30. However, a DSS-client agent 3406 is now included within the client computer. As discussed above, the DSS-client agent communicates with a set of CC nodes 3408 that store secret shares. In this case, the secret shares are generated by the SM server for the client's private key. The client computer therefore does not maintain the private key and storage, but instead relies on the CC nodes to generate signature shares from their stored secret shares and return the signature shares to the client computer, which uses the returned signature shares to assemble a signature for a digital certificate. Thus, arrow 3410 represents a call by the SHH client to the DSS client agent requesting that a signature be generated for a message M, which is the digital certificate that the client computer will furnish to the server computer for client authentication, and arrow 3412 represents returning, by the DSS-client agent, the signature or the signed digital certificate, depending on implementation particulars, which the SHH client then furnishes to the server computer 3404.

Figure 35:
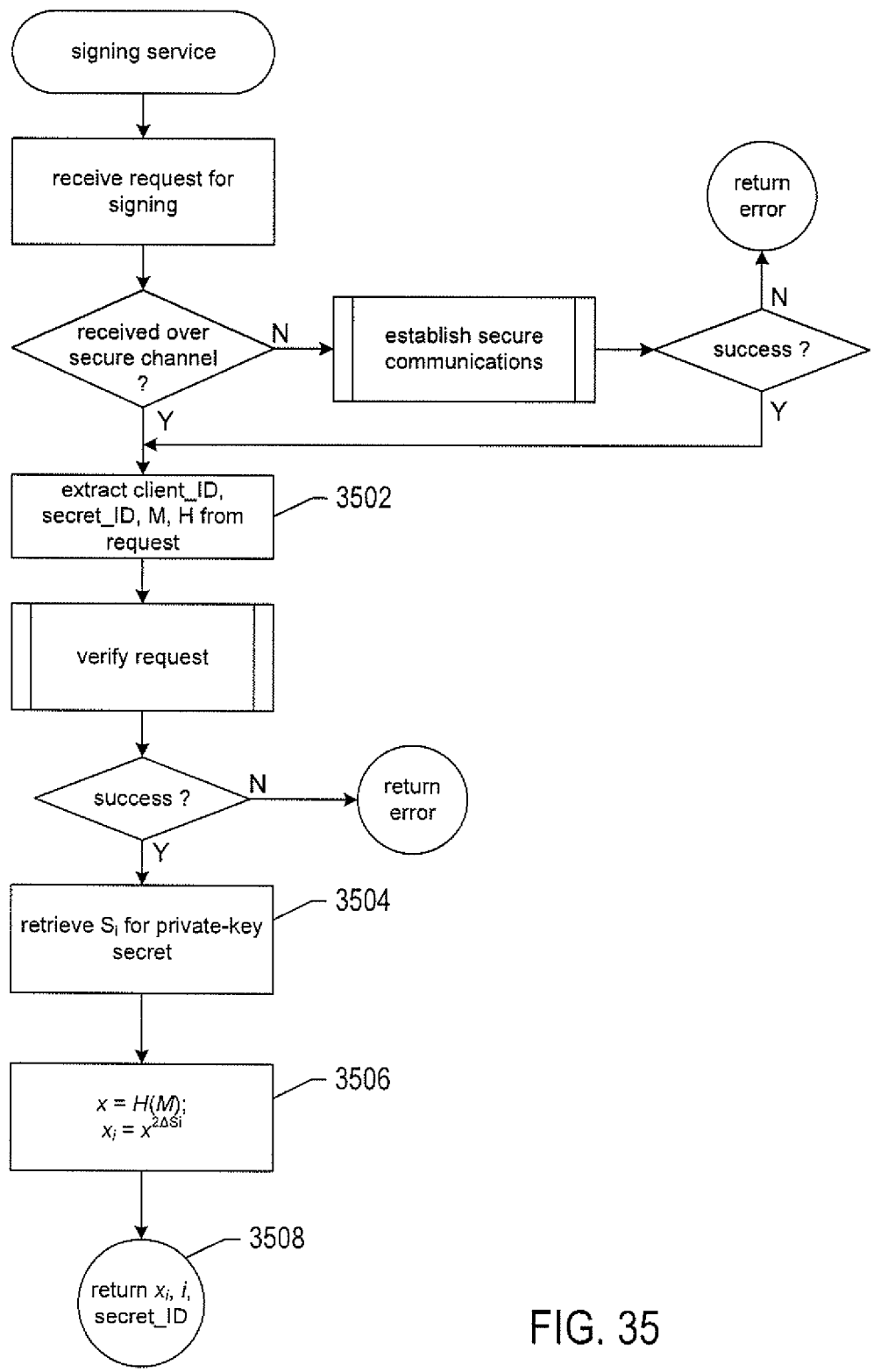
FIG. 35 provides a control-flow diagram for a signing-service handler within a CC note that handles digital-certificate-signing requests from DSS-client agents.

FIG. 35 provides a control-flow diagram for a signing-service handler within a CC note that handles digital-certificate-signing requests from DSS-client agents. The steps in FIG. 35 are similar to those for the secret-request handler shown in FIG. 25E, above. Therefore, only the steps in FIG. 35 that differ from steps shown in FIG. 25E are discussed, below. In step 3502, the signing-service handler extracts a client ID, a secret ID, a message M, and an indication of a hash function H from the request message. In step 3504, the signing-service handler retrieves the secret share $S_1$ corresponding to the secret ID from storage and, in step 3506, computes the hash of the message M, x, and the signature share $x_1$, as discussed above. The signature share and the signature-share-sequence number i are returned to the requesting DSS-client agent, along with the secret identifier, in step 3508.

Figure 36:
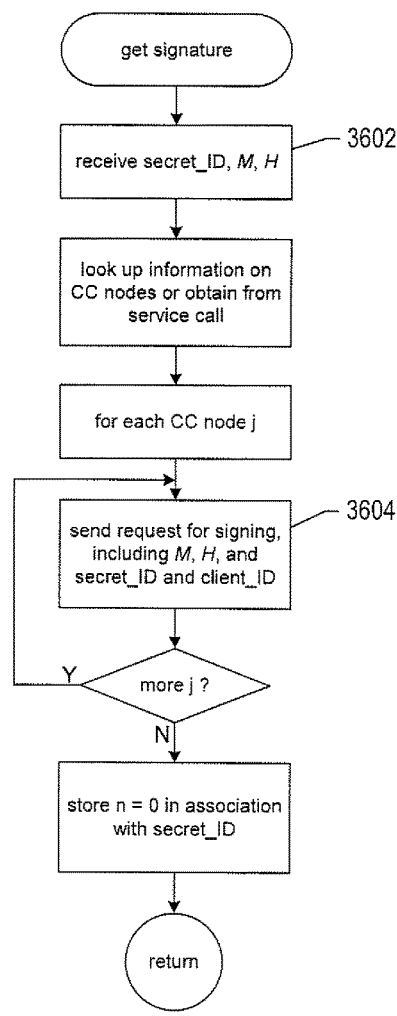
FIG. 36 provides a control-flow diagram for a get-signature routine provided by the DSS-client agent to the client computer.

FIG. 36 provides a control-flow diagram for a get-signature routine provided by the DSS-client agent to the client computer. FIG. 36 contains many steps that are identical to, or similar to, steps previously discussed in FIG. 26A. Only those steps in FIG. 36 that differ from steps shown in FIG. 26A are discussed below. In step 3602, the get-signature routine receives the secret identifier along with the message M and the hash function H. In step 3604, the get-signature routine sends a signing request to a currently considered CC node, including in the request the message M, an indication of a hash function H, a secret identifier, and a client identifier.

Figure 37:
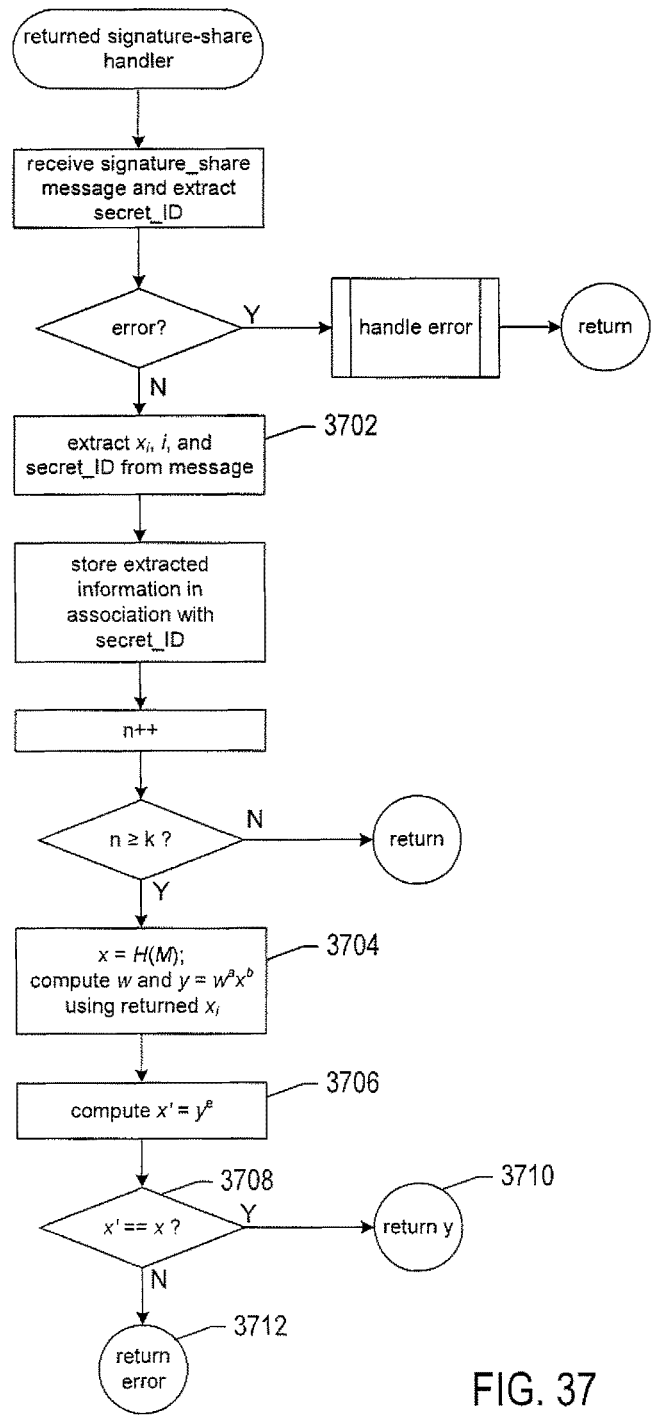
FIG. 37 provides a control-flow diagram for a returned signature-share handler executed by the DSS-client agent upon receiving a signature share returned by a CC node.

FIG. 37 provides a control-flow diagram for a returned signature-share handler executed by the DSS-client agent upon receiving a signature share returned by a CC node. FIG. 37 includes many of the steps previously discussed above with reference to FIG. 26B. Only those steps in FIG. 36 that differ from steps in FIG. 26B are discussed below. In step 3702, the signature-share handler extracts the signature share $x_i$, the share sequence number i, and the secret identifier from the received signature-share message. In step 3704, the signature-share-message handler computes the hash of the message and then computes w and the signature y using the returned signature shares, as illustrated in expressions (73)-(79), above. In step 3706, the signature-share-message handler computes a hash value x' from the computed signature Y. When the computed signature x' prime is equal to the hash value x, as determined in steps 3708, the signature-share handler returns the signature or, in alternative implementations, a signed message M, in step 3710. Otherwise, an error is returned in step 3712. In alternative implementations, the CC nodes may additionally return verification keys and the DSS-client agent uses those verification keys to verify the returned signature shares, similar to use of the verification sets for verifying secret shares discussed above.

The present invention has been described in terms of particular embodiments, it is not intended that the invention be limited to these embodiments. Modifications within the spirit of the invention will be apparent to those skilled in the art. For example, any of many different implementations can be obtained by varying various design and implementation parameters, including modular organization, control structures, data structures, hardware, operating system, and virtualization layers, and other such design and implementation parameters. A variety of additional approaches may be used to increase the resilience of the DSS system to external and internal security-compromising attacks, in the handling of various anomalies in error conditions may vary in different implementations. Many different types of information may be securely stored within the DSS in addition to private encryption keys, passwords, and other well-known types of critical information. As discussed above, secure storage of secrets may be accompanied by provision of many different types of services foundation on securely stored secrets.

The invention claimed is:

1. A distributed-secure-storage system within one or more distributed computer systems, the distributed-secure-storage system comprising:

multiple servers, each implemented within a computer system having one or more processors, one or more memories, and one or more mass-storage devices; and computer instructions, stored in the memories of the multiple servers and a client system, that, when executed by multiple processors, control the distributed-secure-storage system to generate an encryption-key pair including a private encryption key and a public encryption key;

partition the private encryption key into multiple secret shares using a finite-field polynomial, assign each secret share to a different server node;

store the secret share assigned to each server node within the server node;

iteratively refresh the stored secret shares using multiple polynomials with integer coefficients, use the stored secret share, within each server node, along with a received message to generate a message signature share for a message upon request from the client system for a message signature, and construct the message signature, within the client system, from a subset of the generated signature shares.

2. The distributed-secure-storage system of claim 1
wherein the private encryption key is partitioned, using a finite-field polynomial, into l secret shares;
wherein l>1; and
wherein the message signature is constructed from a subset K of the of the l signature shares that includes at least k signature shares, where k is less than l.

3. The distributed-secure-storage system of claim 2
wherein a verification set is constructed from the finite-field polynomial; and
wherein the verification set is used to verify, by each node, that the secret share assigned to the node was partitioned from the secret using the finite-field polynomial.

4. The distributed-secure-storage system of claim 3
wherein a verification key and server-node verification keys are constructed from a cyclic multiplication group;
wherein the verification key and a server-node verification key are distributed to each server node;
wherein each server node returns the server-node verification key received by the server node to the client system along with the signature share computed for the received message; and
wherein the client system uses the verification key and server-node verification key returned by a server node to verify the signature share returned by the server node.

5. The distributed-secure-storage system of claim 3 wherein the client system verifies the constructed message signature by regenerating a hash value using the public encryption key and comparing the regenerated hash value with a hash value computed by the client system from the message.

6. The distributed-secure-storage system of claim 3 wherein the stored secret shares are refreshed from at least k sets of new secret shares, each set of new secret shares generated from a new polynomial with integer coefficients within a different node.

7. The distributed-secure-storage system of claim 6
wherein the verification set is refreshed using the at least k sets of new secret shares and at least k new verification sets, each new verification set constructed from the new polynomial with integer coefficients generated within a different node.

8. The distributed-secure-storage system of claim 6 wherein each server node receives a new server-node verification key during each secret-share refresh operation.

9. The distributed-secure-storage system of claim 3 wherein a new node is added to the secure-storage system and provided a new secret share generated from at least k sets of new secret shares, each set of new secret shares generated from a new polynomial with integer coefficients within a different existing node.

10. The distributed-secure-storage system of claim 9
wherein the new node is provided a new verification set constructed from the at least k sets of new secret shares and at least k new verification sets, each new verification set constructed from the new polynomial with integer coefficients within a different existing node; and
wherein the new node is provided with a new server-node verification key.

11. The distributed-secure-storage system of claim 1 wherein distributed-secure-storage system includes a security-management server and the multiple server nodes.

12. The distributed-secure-storage system of claim 11 wherein the security-management server:
receives a request for an encryption-key pair;
generate an encryption-key pair including a private encryption key and a public encryption key;
stores the private encryption key temporarily in memory;
generates a finite-field polynomial;
partitions the private encryption key into multiple secret shares using the finite-field polynomial;
constructs a verification set for the private encryption key;
generates a set of server-node verification keys;
distributes each secret share, verification key, and the verification set to a different server node.

13. The distributed-secure-storage system of claim 12 wherein the security-management server additionally:
generates a secret identifier for the private encryption key;
receives policy information with respect to the private encryption key;
stores the policy information in association with the secret identifier; and
uses the policy information to manage access to the private encryption key by the client system.

14. The distributed-secure-storage system of claim 11 wherein the security-management server provides services and tools to privileged users of the distributed-secure-storage system, including:
configuration services;
auditing services;
tools for analyzing computational loads and DSS-system performance;
policy creation and update services; and
identity-management services.

15. The distributed-secure-storage system of claim 11 wherein the security-management server includes:
a web-service interface and module;
a web-client module;
a policy-management module;
an identity-management module;
an administration-service module;
a set of secret-management modules; and
encrypted storage.

16. The distributed-secure-storage system of claim 11 wherein each server node:
receives a secret share, verification set, verification key, and secret identifier from the security-management server;
verifies the secret share using the verification set; and
when the verification of the secret share succeeds, stores the secret share and verification set in association with the secret identifier.

17. The distributed-secure-storage system of claim 11 wherein each server node: receives a request for a message signature that includes a secret identifier, a message, and an indication of a hash function; verifies that a secret share is stored within the server node in association with the secret identifier and that the client system is authorized to access the secret; when the verification succeeds, generates a signature share and transmits the signature share and verification key to the client system.

18. The distributed-secure-storage system of claim 11 wherein each server node includes:
a web-service interface and module;
a web-client module;
a policy-management module;
a refresh-management module;
an administrative-services module;
an auditing and logging module; and
encrypted storage.

19. A method that generates and securely stores a private encryption key in a distributed-secure-storage system within one or more distributed computer systems, the distributed-secure-storage system including multiple server nodes, each implemented within a computer system having one or more processors, one or more memories, and one or more mass-storage devices, and a client system, the method comprising:
generating an encryption-key pair including the private encryption key and a public encryption key;
partitioning the private encryption key into multiple secret shares using a finite-field polynomial,
assigning each secret share to a different server node;
storing the secret share assigned to each server node within the server node;
iteratively refreshing the stored secret shares using multiple polynomials polynomial with integer coefficients,
using the stored secret share, within each server node, along with a received message to generate a signature share for a message upon request from the client system for a message signature, and
constructing the message signature, within the client system, from a subset of the generated signature shares.

20. A physical data-storage device that stores a sequence of computer instructions that, when executed by one or more processors within one or more computer systems that each includes one or more processors, one or more memories, and one or more data-storage devices, control the one or more computer systems to generate and securely store a private encryption key in a distributed-secure-storage system within one or more distributed computer systems, the distributed-secure-storage system including multiple server nodes, each implemented within a computer system having one or more processors, one or more memories, and one or more mass-storage devices, and a client system, the method comprising:
generating an encryption-key pair including the private encryption key and a public encryption key;
partitioning the private encryption key into multiple secret shares using a finite-field polynomial,
assigning each secret share to a different server node;
storing the secret share assigned to each server node within the server node;
iteratively refreshing the stored secret shares using multiple polynomials with integer coefficients,
using the stored secret share, within each server node, along with a received message to generate a signature share for a message upon request from the client system for a message signature, and
constructing the message signature, within the client system, from a subset of the generated signature shares.

* * * * *